(12) United States Patent
Fan et al.

(10) Patent No.: US 10,022,693 B2
(45) Date of Patent: Jul. 17, 2018

(54) SYSTEMS AND METHODS FOR PARTIAL OR COMPLETE OXIDATION OF FUELS

(71) Applicant: OHIO STATE INNOVATION FOUNDATION, Columbus, OH (US)

(72) Inventors: Liang-Shih Fan, Columbus, OH (US); Mandar Kathe, Columbus, OH (US); William Wang, Hilliard, OH (US); Elena Chung, Columbus, OH (US); Andrew Tong, Massillon, OH (US)

(73) Assignee: OHIO STATE INNOVATION FOUNDATION, Columbus, OH (US)

( * ) Notice: Subject to any disclaimer, the term of this patent is extended or adjusted under 35 U.S.C. 154(b) by 0 days.

(21) Appl. No.: 15/647,084

(22) Filed: Jul. 11, 2017

(65) Prior Publication Data

US 2018/0065101 A1    Mar. 8, 2018

Related U.S. Application Data

(63) Continuation of application No. 14/634,319, filed on Feb. 27, 2015.
(Continued)

(51) Int. Cl.
*B01J 8/02* (2006.01)
*C01B 3/34* (2006.01)
(Continued)

(52) U.S. Cl.
CPC .............. *B01J 8/0278* (2013.01); *C01B 3/344* (2013.01); *C10G 2/32* (2013.01); *C10J 3/725* (2013.01);
(Continued)

(58) Field of Classification Search
CPC ...................................................... C10J 3/725
See application file for complete search history.

(56) References Cited

U.S. PATENT DOCUMENTS

| 971,206 A | 9/1910 | Messerschmitt |
|---|---|---|
| 1,078,686 A | 11/1913 | Lane |

(Continued)

FOREIGN PATENT DOCUMENTS

| CN | 1329761 | 1/2001 |
|---|---|---|
| CN | 1454711 | 11/2003 |

(Continued)

OTHER PUBLICATIONS

United States Patent Office Notice of Allowance for U.S. Appl. No. 14/116,636 dated Nov. 7, 2017 (5 pages).
(Continued)

*Primary Examiner* — Matthew J Merkling
(74) *Attorney, Agent, or Firm* — Michael Best & Friedrich LLP

(57) ABSTRACT

A system used for converting multiple fuel feedstocks may include three reactors. The reactor system combination can be so chosen that one of the reactors completely or partially converts the fuel while the other generates the gaseous product required by utilizing the gaseous product from the second reactor. The metal-oxide composition and the reactor flow-patterns can be manipulated to provide the desired product. A method for optimizing the system efficiency where a pressurized gaseous fuel or a pressurized utility is used for applications downstream can be used to any system processing fuels and metal-oxide.

20 Claims, 55 Drawing Sheets

Related U.S. Application Data

(60) Provisional application No. 62/041,703, filed on Aug. 26, 2014, provisional application No. 61/945,257, filed on Feb. 27, 2014.

(51) Int. Cl.
*C10J 3/72* (2006.01)
*C10J 3/06* (2006.01)
*C10G 2/00* (2006.01)

(52) U.S. Cl.
CPC . *B01J 2208/023* (2013.01); *C01B 2203/0216* (2013.01); *C01B 2203/0222* (2013.01); *C10J 3/06* (2013.01); *C10J 2300/0916* (2013.01); *C10J 2300/0969* (2013.01); *C10J 2300/0986* (2013.01); *C10J 2300/1659* (2013.01); *C10J 2300/1665* (2013.01); *C10J 2300/1807* (2013.01); *F23C 2900/99008* (2013.01); *Y02E 20/346* (2013.01); *Y02E 50/18* (2013.01)

(56) References Cited

U.S. PATENT DOCUMENTS

| | | |
|---|---|---|
| 1,658,939 A | 2/1928 | Parsons |
| 2,182,747 A | 12/1939 | Marshall, Jr. |
| 2,198,560 A | 4/1940 | Marshall, Jr. |
| 2,449,635 A | 9/1948 | Barr |
| 2,614,067 A | 10/1952 | Reed et al. |
| 2,635,947 A | 4/1953 | Reed et al. |
| 2,686,819 A | 8/1954 | Johnson |
| 2,694,622 A | 11/1954 | Reed et al. |
| 2,697,686 A | 12/1954 | Leffer |
| 2,899,374 A | 8/1959 | Gomory |
| 3,027,238 A | 3/1962 | Watkins |
| 3,031,287 A * | 4/1962 | Benson .............. C01B 3/061 423/439 |
| 3,338,667 A | 8/1967 | Pundsack |
| 3,353,925 A | 11/1967 | Baumann et al. |
| 3,421,869 A | 1/1969 | Benson |
| 3,442,613 A | 5/1969 | Grotz, Jr. |
| 3,442,619 A * | 5/1969 | Schora, Jr. .............. C01B 3/061 423/658 |
| 3,442,620 A | 5/1969 | Huebler et al. |
| 3,494,858 A | 2/1970 | Luckenbach |
| 3,523,821 A | 8/1970 | Bryce et al. |
| 3,573,224 A | 3/1971 | Strelzoff et al. |
| 3,619,142 A | 11/1971 | Johnson et al. |
| 3,726,966 A | 4/1973 | Johnston |
| 4,017,270 A | 4/1977 | Funk et al. |
| 4,057,402 A | 11/1977 | Patel et al. |
| 4,075,079 A | 2/1978 | Lang |
| 4,108,732 A | 8/1978 | Nuttall, Jr. |
| 4,155,832 A | 5/1979 | Cox et al. |
| 4,272,399 A | 6/1981 | Davis et al. |
| 4,318,711 A * | 3/1982 | Smith .............. C10K 3/04 48/197 R |
| 4,325,833 A | 4/1982 | Scott |
| 4,334,959 A | 6/1982 | Green |
| 4,343,624 A | 8/1982 | Belke et al. |
| 4,348,487 A | 9/1982 | Goldstein et al. |
| 4,404,086 A | 9/1983 | Oltrogge |
| 4,420,332 A | 12/1983 | Mori et al. |
| 4,521,117 A | 6/1985 | Ouwerkerk et al. |
| 4,594,140 A | 6/1986 | Cheng |
| 4,778,585 A | 10/1988 | Graff |
| 4,842,777 A | 6/1989 | Lamort |
| 4,861,165 A | 8/1989 | Fredriksson et al. |
| 4,869,207 A | 9/1989 | Engstrom et al. |
| 4,895,821 A | 1/1990 | Kainer et al. |
| 4,902,586 A | 2/1990 | Wertheim |
| 5,130,106 A | 7/1992 | Koves et al. |
| 5,365,560 A | 11/1994 | Tam |
| 5,447,024 A | 9/1995 | Ishida et al. |
| 5,509,362 A | 4/1996 | Lyon |
| 5,518,187 A | 5/1996 | Bruno et al. |
| 5,529,599 A | 6/1996 | Calderon |
| 5,630,368 A | 5/1997 | Wagoner et al. |
| 5,730,763 A | 3/1998 | Manulescu et al. |
| 5,770,310 A | 6/1998 | Noguchi et al. |
| 5,827,496 A | 10/1998 | Lyon |
| 5,858,210 A | 1/1999 | Richardson |
| 6,007,699 A | 12/1999 | Cole |
| 6,143,203 A | 11/2000 | Zheng et al. |
| 6,143,253 A | 11/2000 | Radcliffe et al. |
| 6,180,354 B1 | 1/2001 | Singh et al. |
| 6,187,465 B1 | 2/2001 | Galloway |
| 6,361,757 B1 | 3/2002 | Shikada et al. |
| 6,395,944 B1 | 5/2002 | Griffiths |
| 6,412,559 B1 | 7/2002 | Gunter et al. |
| 6,444,712 B1 | 9/2002 | Janda |
| 6,494,153 B1 | 12/2002 | Lyon |
| 6,509,000 B1 | 1/2003 | Choudhary et al. |
| 6,517,631 B1 | 2/2003 | Bland |
| 6,631,698 B1 | 10/2003 | Hyppanen et al. |
| 6,642,174 B2 | 11/2003 | Gaffney et al. |
| 6,663,681 B2 | 12/2003 | Kinding et al. |
| 6,667,022 B2 | 12/2003 | Cole |
| 6,669,917 B2 | 12/2003 | Lyon |
| 6,682,714 B2 | 1/2004 | Kindig et al. |
| 6,685,754 B2 | 2/2004 | Kindig et al. |
| 6,703,343 B2 | 3/2004 | Park |
| 6,797,253 B2 | 9/2004 | Lyon |
| 6,834,623 B2 | 12/2004 | Cheng |
| 6,875,411 B2 | 4/2005 | Sanfilippo et al. |
| 6,880,635 B2 | 4/2005 | Vinegar et al. |
| 6,936,363 B2 | 8/2005 | Kordesch et al. |
| 7,001,579 B2 | 2/2006 | Metzger et al. |
| 7,244,399 B2 | 7/2007 | Myohanen et al. al. |
| 7,404,942 B2 | 7/2008 | Sanfilippo et al. |
| 7,496,450 B2 | 2/2009 | Ortiz Aleman et al. |
| 7,749,626 B2 | 7/2010 | Take |
| 7,767,191 B2 | 8/2010 | Thomas et al. |
| 7,837,975 B2 | 11/2010 | Iyer et al. |
| 7,840,053 B2 | 11/2010 | Liao |
| 8,116,430 B1 | 2/2012 | Shapiro et al. |
| 8,192,706 B2 | 6/2012 | Grochowski |
| 8,202,349 B2 | 6/2012 | Molaison |
| 8,419,813 B2 | 4/2013 | Hoteit et al. |
| 8,435,920 B2 | 5/2013 | White et al. |
| 8,508,238 B2 | 8/2013 | Mahalingam et al. |
| 8,761,943 B2 | 6/2014 | Lou et al. |
| 8,771,549 B2 | 7/2014 | Gauthier et al. |
| 8,814,963 B2 | 8/2014 | Apanel et al. |
| 8,877,147 B2 | 11/2014 | Fan et al. |
| 2001/0055559 A1 | 12/2001 | Sanfilippo et al. |
| 2002/0011428 A1 | 1/2002 | Scheuerman |
| 2002/0179887 A1 | 12/2002 | Zeng et al. |
| 2003/0006026 A1 | 1/2003 | Matsumoto et al. |
| 2003/0024388 A1 | 2/2003 | Scharpf |
| 2003/0031291 A1 | 2/2003 | Yamamoto et al. |
| 2003/0119658 A1 | 6/2003 | Allison et al. |
| 2003/0130360 A1 | 7/2003 | Kindig et al. |
| 2003/0180215 A1 | 9/2003 | Niu et al. |
| 2003/0188668 A1 | 10/2003 | Bland |
| 2004/0028181 A1 | 2/2004 | Charles, Jr. et al. |
| 2004/0030214 A1 | 2/2004 | Schindler et al. |
| 2004/0109800 A1 | 6/2004 | Pahlman et al. |
| 2004/0126293 A1 | 7/2004 | Geerlings et al. |
| 2004/0131531 A1 | 7/2004 | Geerlings et al. |
| 2004/0132833 A1 | 7/2004 | Espinoza et al. |
| 2004/0138060 A1 | 7/2004 | Rapier et al. |
| 2004/0152790 A1 | 8/2004 | Cornaro et al. |
| 2004/0154223 A1 | 8/2004 | Powell et al. |
| 2004/0197612 A1 | 10/2004 | Keefer et al. |
| 2004/0213705 A1 | 10/2004 | Blencoe et al. |
| 2004/0233191 A1 | 11/2004 | Mukherjee et al. |
| 2004/0244289 A1 | 12/2004 | Morozumi et al. |
| 2004/0265224 A1 | 12/2004 | Papavassiliou et al. |
| 2005/0002847 A1 | 1/2005 | Maroto-Valer et al. |
| 2005/0054880 A1 | 3/2005 | Dubois et al. |
| 2005/0175533 A1 | 8/2005 | Thomas et al. |
| 2005/0255037 A1 | 11/2005 | Otsuka et al. |
| 2005/0265912 A1 | 12/2005 | Alvarez, Jr. et al. |

(56) References Cited

U.S. PATENT DOCUMENTS

| | | |
|---|---|---|
| 2005/0274648 A1 | 12/2005 | Goldstein et al. |
| 2006/0021308 A1 | 2/2006 | Merkel |
| 2006/0042565 A1 | 3/2006 | Hu |
| 2006/0094593 A1 | 5/2006 | Beech, Jr. et al. |
| 2007/0010588 A1 | 1/2007 | Pearson |
| 2007/0049489 A1 | 3/2007 | Becue et al. |
| 2007/0157517 A1 | 7/2007 | Tsay et al. |
| 2007/0258878 A1 | 11/2007 | Sanfilippo et al. |
| 2008/0031809 A1 | 2/2008 | Norbeck et al. |
| 2008/0161624 A1 | 7/2008 | Glover et al. |
| 2008/0164443 A1 | 7/2008 | White et al. |
| 2008/0209807 A1 | 9/2008 | Tsangaris et al. |
| 2008/0314838 A1 | 12/2008 | Becker et al. |
| 2009/0000194 A1 | 1/2009 | Fan et al. |
| 2009/0042070 A1 | 2/2009 | Brown et al. |
| 2009/0160461 A1 | 6/2009 | Zangl et al. |
| 2010/0071262 A1 | 3/2010 | Robinson et al. |
| 2010/0184589 A1 | 7/2010 | Miyairi et al. |
| 2010/0187159 A1 | 7/2010 | Naunheimer |
| 2010/0258429 A1 | 10/2010 | Ugolin |
| 2010/0293845 A1 | 11/2010 | Zeman et al. |
| 2010/0332170 A1 | 12/2010 | Gao et al. |
| 2011/0005395 A1 | 1/2011 | Vimalchand et al. |
| 2011/0011720 A1 | 1/2011 | Rinker |
| 2011/0024687 A1 | 2/2011 | White et al. |
| 2011/0054049 A1 | 3/2011 | Lambert et al. |
| 2011/0094226 A1 | 4/2011 | McHugh et al. |
| 2011/0100274 A1 | 5/2011 | Kuske et al. |
| 2011/0146152 A1 | 6/2011 | Vimalchand et al. |
| 2011/0176968 A1 | 7/2011 | Fan et al. |
| 2011/0176988 A1 | 7/2011 | Okamura et al. |
| 2011/0206469 A1 | 8/2011 | Furuyama et al. |
| 2011/0289845 A1 | 12/2011 | Davis et al. |
| 2011/0291051 A1 | 12/2011 | Hershkowitz et al. |
| 2011/0300060 A1 | 12/2011 | Guillou et al. |
| 2011/0303875 A1 | 12/2011 | Hoteit et al. |
| 2012/0167585 A1 | 7/2012 | Wormser |
| 2012/0171588 A1 | 7/2012 | Fan et al. |
| 2012/0214106 A1 | 8/2012 | Sit et al. |
| 2013/0085365 A1 | 4/2013 | Marashdeh et al. |
| 2013/0149650 A1 | 6/2013 | Gauthier et al. |
| 2013/0255272 A1 | 10/2013 | Ajhar et al. |
| 2014/0034134 A1 | 2/2014 | Fan et al. |
| 2014/0072917 A1 | 3/2014 | Fan et al. |
| 2014/0144082 A1 | 5/2014 | Fan et al. |
| 2014/0275297 A1 | 9/2014 | Velazquez-Vargas et al. |
| 2014/0295361 A1 | 10/2014 | Fan et al. |
| 2015/0238915 A1 | 8/2015 | Fan et al. |
| 2016/0002034 A1 | 1/2016 | Fan et al. |
| 2016/0023190 A1 | 1/2016 | Fan et al. |
| 2016/0030904 A1 | 2/2016 | Fan et al. |
| 2016/0268616 A1 | 9/2016 | Fan et al. |
| 2016/0376512 A1 | 12/2016 | Fan et al. |

FOREIGN PATENT DOCUMENTS

| | | |
|---|---|---|
| CN | 1501534 | 6/2004 |
| CN | 101389734 | 3/2009 |
| CN | 101426885 | 5/2009 |
| CN | 102187153 | 9/2011 |
| CN | 102612625 | 7/2012 |
| EP | 0161970 | 11/1985 |
| EP | 1134187 | 9/2001 |
| EP | 1445018 | 8/2004 |
| EP | 1580162 | 9/2005 |
| EP | 1845579 | 10/2007 |
| EP | 1933087 | 6/2008 |
| EP | 2450420 | 5/2012 |
| EP | 2515038 | 10/2012 |
| EP | 2601443 | 6/2013 |
| FR | 2924035 | 5/2009 |
| JP | H10249153 | 9/1998 |
| JP | 2006-502957 | 1/2006 |
| TW | 406055 | 9/2000 |
| TW | 426728 | 3/2001 |
| WO | WO 1990/13773 | 11/1990 |
| WO | WO 1999/65097 | 12/1999 |
| WO | WO 2000/22690 | 4/2000 |
| WO | WO 2000/068339 | 11/2000 |
| WO | WO 2001/042132 | 6/2001 |
| WO | WO 2003/070629 | 8/2003 |
| WO | WO 2007/082089 | 7/2007 |
| WO | WO 2007/122498 | 11/2007 |
| WO | WO 2007/134075 | 11/2007 |
| WO | WO 2008/019079 | 2/2008 |
| WO | WO 2008/071215 | 6/2008 |
| WO | WO 2008/082312 | 7/2008 |
| WO | WO 2008/115076 | 9/2008 |
| WO | WO 2009/007200 | 1/2009 |
| WO | WO 2009/009388 | 1/2009 |
| WO | WO 2009/021258 | 2/2009 |
| WO | WO 2009/114309 | 9/2009 |
| WO | WO 2010/037011 | 4/2010 |
| WO | WO 2010/063923 | 6/2010 |
| WO | WO 2010/126617 | 11/2010 |
| WO | WO 2011/021161 | 2/2011 |
| WO | WO 2011/031752 | 3/2011 |
| WO | WO 2011/031755 | 3/2011 |
| WO | WO 2011/084734 | 7/2011 |
| WO | WO 2012/064712 | 5/2012 |
| WO | WO 2012/077978 | 6/2012 |
| WO | WO 2012/155054 | 11/2012 |
| WO | WO 2012/155059 | 11/2012 |
| WO | WO 2013/040645 | 3/2013 |
| WO | WO 2014/085243 | 6/2014 |
| WO | WO 2011/153568 | 12/2014 |
| WO | WO 2014/195904 | 12/2014 |
| WO | WO 2016/053941 | 4/2016 |

OTHER PUBLICATIONS

United States Patent Office Action for U.S. Appl. No. 14/774,727 dated Sep. 14, 2017 (10 pages).

U.S. Pat. No. 9,376,318 2015/0093577, Fan et al., Jun. 28, 2016.

U.S. Pat. No. 9,518,236 2012/0159841, Fan et al., Dec. 13, 2016.

U.S. Pat. No. 9,616,403 2016/0016137, Fan et al., Apr. 11, 2017.

Abad et al., "Chemical-looping combustion in a 300 W continuously operating reactor system using a manganese-based oxygen carrier," Fuel, 2006, vol. 85, Issue 9, pp. 1174-1185.

Abad et al., "Reduction Kinetics of Cu-, Ni-, and Fe- Based Oxygen Carriers Using Syngas (CO+H2) for Chemical-Looping Combustion," Energy Fuels, 2007, 21 (4), pp. 1843-1853.

Abad et al., "The use of iron oxide as oxygen carrier in a chemical-looping reactor," Fuel, 2007, vol. 86, Issues 7-8, pp. 1021-1035.

Adanez et al., "Progress in Chemical-Looping Combustion and Reforming technologies," Progress in Energy and Combustion Science, 2012, vol. 38, Issue 2, pp. 215-282.

Adanez et al., "Selection of oxygen carriers for chemical-looping combustion," Energy & Fuels, American Chemical Society, 2004, vol. 18, No. 2, pp. 371-377.

Azis et al., "On the evaluation of synthetic and natural ilmenite using syngas as fuel in chemical-looping combustion (CLC)," Chemical Engineering Research and Design, 2010, vol. 88, Issue 11, pp. 1505-1514.

Balasubramanian et al., "Hydrogen from methane in a single-step process," Chem Engr Science, 1999, 54(15-16), 3543.

Bell et al., "H2 Productionvia Ammonia Decomposition Using Non-Noble Metal Catalysts: A Review," Top Catal, 2016, 59, 1438-1457.

Cao et al., "Investigation of Chemical Looping Combustion by Solid Fuels. 1. Process Analysis," Energy Fuels, 2006, 20(5), pp. 1836-1844.

Cheng et al., "Carbon Dioxide Adsorption and Activation on Ceria (110): A density functional theory study," J. Chem. Phys. 2013, 138, 014702.

Cheng et al., "Methane Adsorption and Dissociation on Iron Oxide Oxygen Carrier: Role of Oxygen Vacancy," Phys. Chem. Chem. Phys. 2016, 18, 16423-16435.

Cheng et al., "Propagation of Olefin Metathesis to Propene on WO3 Catalysts: A Mechanistic and Kinetic Study," ACS Catal. 2015, 5, 59-72.

(56) References Cited

OTHER PUBLICATIONS

Cho et al., "Comparison of iron-, nickel-, copper- and manganese-based oxygen carriers for chemical-looping combusion," Fuel, 2004, vol. 82, Issue 9, pp. 1215-1225.
Connell et al., "Process Simulation of Iron-Based Chemical Looping Schemes with CO2 Capture for Hydrogen and Electricity Production from Coal," Presented at 29th Annual International Pittsburgh Coal Conference, Pittsburgh, PA, Oct. 15-18, 2002, pp. 1274-1281.
De Diego et al., "Development of Cu-based oxygen carriers for chemical-looping combustion," Fuel, 2004, vol. 83, Issue 13, pp. 1749-1757.
De Klerk, "Gas-to-Liquid Conversion" Natural Gas Conversion Technologies Workshop of ARPA-E. U.S. Department of Energy, Houston, TX. vol. 13 (2012).
Denton et al., "Simultaneous Production of High-Purity Hydrogen and Sequestration-Ready CO2 from Syngas," 2003.
EIA—Independent Statistics and Analysis. U.S. Department of Energy, U.S. Energy Information Administration "Annual Energy Outlook 2015 with Projections to 2040," Apr. 2015.
EIA—Independent Statistics and Analysis. U.S. Department of Energy, U.S. Energy Information Administration, "How Much Petroleum Does the United States Import and from Where?" <https://www.eia.gov/tools/faqs/faq.php?id=727&t=6> webpage available as early as Mar. 22, 2017.
EIA—Independent Statistics and Analysis. U.S. Department of Energy, U.S. Energy Information Administration, "Natural Gas Vented and Flared." <https://www.eia.gov/dnav/ng/NG_PROD_SUM_A_EPG0_VGV_MMCF_A.htm> webpage available as early as Feb. 29, 2016.
EIA—Independent Statistics and Analysis. U.S. Department of Energy, U.S. Energy Information Administration, "Natural Gas Weekly Update." <https://www.eia.gov/naturalgas/weekly/> webpage available as early as Dec. 4, 2011.
Environmental Protection Agency, "Geological CO2 Sequestration Technology and Cost Analysis," Technical Support Document, pp. i-vi & pp. 1-61, Jun. 2008.
Fan et al., "Chemical looping processes for CO2 capture and carbonaceous fuel conversion prospect and opportunity," Energy Environmental Science, 2012, p. 7254-7280.
Fan et al., "Utilization of chemical looping strategy in coal gasification processes," Particuology, 2008, vol. 6, Issue 3, pp. 131-142.
Fan et al., "Chemical-Looping Technology Platform," AIChE Journal, 61(1), 2-22 (2015).
Fan, "Chemical Looping Systems for Fossil Energy Conversions," Wiley-AIChE: Hoboken, NJ, U.S.A.; 2010.
Forero et al., "Syngas combustion in a 500 Wth Chemical-Looping Combustion system using an impregnated Cu-based oxygen carrier," Fuel Processing Technology, 2009, vol. 90, Issue 12, pp. 1471-1479.
Gao et al., "Production of syngas via autothermal reforming of methane in a fluidized-bed reactor over the combined $CeO_2$—$ZrO_2$/$SiO_2$ supported Ni catalysts," International Journal of Hydrogen Energy, 2008, vol. 33, p. 5493-5500.
Garcia-Labiano et al., "Temperature variations in the oxygen carrier particles during their reduction and oxidation in a chemical-looping combustion system," Chemical Engineering Science, 2005, vol. 60, No. 3, pp. 851-862.
Geldart, "Types of Gas Fluidization," Power Technology, vol. 7, pp. 285-292, 1973.
Ghanapragasam et al., "Hydrogen production from coal direct chemical looping and syngas chemical looping combustion systems: Assessment of system operation and resource requirements," International Journal of Hydrogen Energy, 2009, vol. 34, Issue 6, pp. 2606-2615.
Go et al., "Hydrogen production from two-step steam methane reforming in a fluidized bed reactor," International Journal of Hydrogen Energy, 2009, vol. 34, p. 1301-1309.

Haque, "Microwave energy for mineral treatment processes—a brief review," International Journal of Mineral Processing, vol. 57, pp. 1-24, 1999.
Herzog, "Carbon Sequestration via Mineral Carbonation: Overview and Assessment," MIT Laboratory for Energy and the Environmental, http://sequestration.mit.edu/pfd/carbonates.pdf, Mar. 14, 2002.
Hildebrandt et al., "Producing Transportation Fuels with Less Work," Science, Mar. 27, 2009, vol. 323, pp. 1680-1681.
Hossain et al., "Chemical-looping combustion (CLC) for inherent CO2 separations—a review," Chemical Engineering Science, 2008, vol. 63, Issue 18, pp. 4433-4451.
Hua et al., "Three Dimensional Analysis of Electrical Capacitance Tomography Sensing Fields," 1999 IOP Publishing Ltd, vol. 10, pp. 717-725.
Huijgen et al., "Carbon dioxide sequestration by mineral carbonation," ECN-C—03-016, www.ecn.nl/docs/library/report/200e/c03016.pdf, Feb. 2003.
Ishida et al., "Evaluation of a Chemical-Looping-Combustion Power-Generation System by Graphic Exergy Analysis," Energy, 12(2), 147-154 (1987).
Jadhav et al., "Carbonation of Mg-Bearing Minerals: Kinetic and Mechanistic Studies," Ohio Coal Research Consortium/Ohio State University Project C3.12, www.ohiocoal.org/projects/year3/c3.12, Jul. 3, 2002.
Jin et al., "Development of a Novel Chemical-Looping Combustion: Synthesis of a Looping Material with a Double Metal Oxide of CoO—NiO," Energy & Fuels, 1998, vol. 12, 1272-1277.
Johansson et al., "Combustion of Syngas and Natural Gas in a 300 W Chemical-Looping Combustor," Chemical Engineering Research and Design Volume, 2006, vol. 84, Issue 9, pp. 819-827.
Kaiser et al., "Precombustion and Postcombustion Decarbonization," IEEE, Power Engineering Review, Apr. 2001, pp. 15-17.
Kathe et al., "Chemical Looping Gasification for Hydrogen Enhanced Syngas Production with in-situ CO2 Capture," United States Departircnt of Energy, OSTI: 1185194, (2015).
Leion et al., "Solid fuels in chemical-looping combustion using oxide scale and unprocessed iron ore as oxygen carriers," Fuel, 2009, vol. 88, Issue 10, pp. 1945-1954.
Leion et al., "Solid fuels in chemical-looping combustion," International Journal of Greenhouse Gas Control, 2008, vol. 2, Issue 2, pp. 180-193.
Leion et al., "The use of petroleum coke as fuel in chemical-looping combustion," Fuel, 2007, vol. 86, Issue 12-13, pp. 1947-1958.
Li et al., "Clean coal conversion processes—progress and challenges," The Royal Society of Chemistry, Energy & Environmental Science, Jul. 30, 2008, vol. 1, pp. 248-267.
Li et al., "Ionic Diffusion in the Oxidation of Iron-effect of Support and Its Implications to Chemical Looping Applications," Energy Environ. Sci. 2011, 4, 876-880.
Li et al., "Role of Metal Oxide Support in Redox Reactions of Iron Oxide for Chemical Looping Applications: Experiments and Density Functional Theory Calculations," Energy Environmental Science, 2011, vol. 4, p. 3661-3667.
Li et al., "Syngas chemical looping gasification process: Bench-scale studies and reactor simulations," AICHE Journal, 2010, vol. 56, Issue 8, pp. 2186-2199.
Li et al., "Syngas Chemical Looping Gasification Process: Oxygen Carrier Particle Selection and Performance," Energy Fuels, 2009, 23(8), pp. 4182-4189.
Liu et al., "Enhanced Performance of Alkali Metal Doped Fe2O3 and Fe2O3/Al2O3 Composites as Oxygen Carrier Material in Chemical Looping Combustion," Energy Fuels. 2013, 27, 4977-4983.
Luo et al., "Shale Gas-to-Syngas Chemical Looping Process for Stable Shale Gas Conversion to High Purity Syngas with H2:CO Ratio of 2:1," Energy and Environmental Science, 7(12), 4104-4117, (2014).
Lyngfelt, "Chemical Looping Combustion of Solid Fuels—Status of Development," Applied Energy, 2014, vol. 113, p. 1869-1873.
Lyngfelt, "Oxygen Carriers for Chemical Looping Combustion Operational Experience," 1st International Conference on Chemical Looping, Mar. 2010.

(56) References Cited

OTHER PUBLICATIONS

Makepeace et. al., "Ammonia decomposition catalysis using non-stoichiometric lithium imide," Chem. Sci., 2015, 6, 3805.
Mamman et al., "Simultaneous steam and CO2 reforming of methane to syngas over NiO/MgO/SA-5205 in presence and absence of oxygen," Applied Catalysis A, 1998, vol. 168, p. 33-46.
Marashdeh, Q. et al., "A Multimodal Tomography System Based on ECT Sensors," IEEE Sensors Journal, vol. 7, No. 3, 2007, 426-433.
Marashdeh, Q., Advances in Electrical Capacitance Tomography, Dissertation, The Ohio State University, 2006.
Mattisson et al., "Application of chemical-looping combustion with capture of CO2," Second Nordic Minisymposium on Carbon Dioxide Capture and Storage, Goeteborg, Oct. 26, 2001, pp. 46-51.
Mattisson et al., "Chemical-looping combustion using syngas as fuel," International Journal of Greenhouse Gas control, 2007, vol. 1, Issue 2, pp. 158-169.
Mattisson et al., "CO 2 capture from coal combustion using chemical-looping combustion—Reactivity investigation of Fe, Ni and Mn based oxygen carriers using syngas," Department of Energy and Environment, Division of Energy Technology and Department of Chemical and Biological Engineering, Division of Environmental Inorganic Chemistry, Chalmers University of Technology, 2007.
Mattisson et al., "Reactivity of Some Metal Oxides Supported on Alumina with Alternating Methane and Oxygen—Application for Chemical-Looping Combustion," Energy & Fuels, 2003, vol. 17, pp. 643-651.
Mattisson et al., "The use of iron oxide as an oxygen carrier in chemical-looping combustion of methane with inherent separation of CO2," Fuel, 2001, vol. 80, pp. 1953-1962.
Mattisson et al., "Use of Ores and Industrial Products as Oxygen Carriers in Chemical-Looping Combustion," Energy & Fuels, 2009, vol. 23, pp. 2307-2315.
Miller et al., "Toward Transformational Carbon Capture," AIChE Journal, 62, 1-10 (2016).
NETL, National Energy Technology Laboratory. U.S. Department of Energy, "Quality Guidelines for Energy System Studies—Specification for Selected Feedstocks." Jan. 2012.
Ockwig et al., "Membranes for Hydrogen Separation," American Chemical Society, Chem. Rev., Oct. 10, 2007, vol. 107, pp. 4078-4110.
O'Connor et al., "Carbon Dioxide Sequestration by Direct Mineral Carbonation: Results from Recent Studies and Currents Status," Abstract, USDOE Office of Fossil Energy, 2001.
Ohio Coal Development Office of the Ohio Air Quality Development Authority, "Ohio Coal Research Consortium (OCRC)—IV, Year 3 Proposal Solicitation," http://www.ohioquality.org/ocdo/other_pdf/Consortium_IV_Year_3_RFP.pdf (2006).
Ortiz et al., "Hydrogen Production by Auto-Thermal Chemical-Looping Reforming in a Pressurized Fluidized Bed Reactor Using Ni-based Oxygen Carriers," International Journal of HydrogenEnergy, 2010, vol. 35, p. 151-160.
Park et al., "CO2 Mineral Sequestration Chemically Enhanced Aqueous Carbonation of Serpentine," The Canadian Journal of Chemical Engineering, 2003, vol. 81, pp. 885-890.
Park et al., "CO2 Mineral Sequestration physically activated dissolution of serpentine and pH swing process," Chemical Engineering Science, 2004, vol. 59, pp. 5241-5247.
Pröll et al., "Syngas and a separate nitrogen/argon stream via chemical looping reforming—A 140 kW pilot plant study," Fuel, 2010, vol. 89, Issue 6, pp. 1249-1256.
Qin et al., "Evolution of Nanoscale Morphology in Single and Binary Metal Oxide Microparticles During Reduction and Oxidation Processes," J. Mater. Chem. A. 2014, 2, 17511-17520.
Qin et al., "Impact of 1% Lathanum Dopant on Carbonaceous Fuel Redox Reactions with an Iron-Based Oxygen Carrier in Chenical Looping Process," ACS Energy Letters, 2017, 2, 70-74
Qin et al., "Nanostructure Formation Mechanism and Ion Diffusion in Iron-Titanium Composite Materials with Chemical Looping Redox Reactions," J. Mater. Chem. A. 2015, 3, 11302-11312.
Quin et al., "Improved Cyclic redox reactivity of lanthanum modified iron-based oxygen carriers in carbon monoxide xhemical looping combusion," Journal of Materials Chemistry A, 2017, 8 pages.
Ruchenstein et al., "Carbon dioxide reforming of methane over nickel/alkaline earth metal oxide catalysts," Applied Catalysis A, 1995, vol. 133, p. 149-161.
Russo et al., "Impact of Process Design of on the Multiplicity Behavior of a Jacketed Exothermic CSTR," AICHE Journal, Jan. 1995, vol. 41, No. 1, pp. 135-147.
Ryden et al., "Synthesis gas generation by chemical-looping reforming in a continuously operating laboratory reactor," Fuel, 2006, vol. 85, p. 1631-1641.
Scott et al., "In situ gasification of a solid fuel and CO2 separation using chemical looping," AICHE Journal, 2006, vol. 52, Issue 9, pp. 3325-3328.
Shen et al., "Chemical-Looping Combustion of Biomass in a 10kWth Reactor with Iron Oxide as an Oxygen Carrier," Energy & Fuels, 2009, vol. 23, pp. 2498-2505.
Shen et al., "Experiments on chemical looping combustion of coal with a NiO based oxygen carrier," Combustion and Flame, 2009, vol. 156, Issue 3, pp. 721-728.
Sridhar et al., "Syngas Chemical Looping Process: Design and Construction of a 25 kWth Subpilot Unit," Energy Fuels, 2012, 26(4), pp. 2292-2302.
Steinfeld et al., "Design Aspects of Solar Thermochemical Engineering—A case Study: Two-Step Water-Splitting Cycle Using the Fe3O4/FeO Redox System," Solar Energy, 1999, pp. 43-53.
Steinfeld, "Solar hydrogen production via a two-step water-splitting thermochemical cycle based on Zn/ZnO redox reactions," International Journal of Hydrogen Energy, 2002, vol. 27, pp. 611-619.
Tian et al., "Thermodynamic investigation into carbon deposition and sulfur evolution in a Ca-based chemical-looping combustion system," Chemical Engineering Research & Design, 2011, vol. 89, Issue 9, p. 1524.
U.S. Department of Energy, NCCTI Energy Technologies Group, Office of Fossil Energy, "CO2 Capture and Storage in Geologic Formations," pp. 34, Revised Jan. 8, 2002.
Usachev et al., "Conversion of Hydrocarbons to Synthesis Gas: Problems and Prospects," Petroleum Chemistry, 2011, vol. 51, p. 96-106.
Velazquez-Vargas et al., "Atmospheric Iron-based Coal Direct Chemical Looping (CDCL) Process for Power Generation", presented in Power-Gen International 2012, Orlando, FL, Dec. 11-13, 2012, BR-1892, 1-5.
Vernon et al., "Partial Oxidation of Methane to Synthesis Gas," Catalysis Letters, 1990, vol. 6, p. 181-186.
Warsito, W. et al., Electrical Capacitance Volume Tomography, 2007, pp. 1-9.
Yamazaki et al., "Development of highly stable nickel catalyst for methane-steam reaction under low steam to carbon ratio," Applied Catalyst A, 1996, vol. 136, p. 49-56.
Yin et. al., "A mini-review on ammonia decomposition catalysts for on-site generation of hydrogen for fuel cell applications," Applied Catalysis A: General, 2004, 277, 1-9.
Zafar et al., "Integrated Hydrogen and Power Production with CO2 Capture Using Chemical-Looping ReformingRedox Reactivity of Particles of CuO, Mn2O3, NiO, and Fe2O3 Using SiO2 as a Support," Ind. Eng. Chem. Res., 2005, 44(10), pp. 3485-3496.
International Preliminary Report on Patentability for International Application PCT/US/2007/000956 dated Jul. 24, 2008.
International Preliminary Report on Patentability for International Application PCT/US/2010/048121 dated Mar. 22, 2012.
International Preliminary Report on Patentability for International Application PCT/US/2010/048125 dated Mar. 22, 2012.
International Preliminary Report on Patentability for International Application PCT/US/2011/059736 dated May 23, 2013.
International Preliminary Report on Patentability for International Application PCT/US/2012/037544 dated Nov. 12, 2013.
International Preliminary Report on Patentability for International Application PCT/US/2012/037557 dated Nov. 21, 2013.
International Search Report and Written Opinion for Application No. PCT/US14/14877 dated May 14, 2014 (10 pages).

(56) References Cited

OTHER PUBLICATIONS

International Search Report and Written Opinion for Application No. PCT/US14/25520 dated Jul. 11, 2014 (13 pages).
International Search Report and Written Opinion for Application No. PCT/US14/26071 dated Jul. 10, 2014 (9 pages).
International Search Report and Written Opinion for Application No. PCT/US2007/000956 dated Dec. 4, 2007.
International Search Report and Written Opinion for Application No. PCT/US2009/058579 dated Aug. 3, 2010.
International Search Report and Written Opinion for Application No. PCT/US2010/048121 dated Apr. 1, 2011.
International Search Report and Written Opinion for Application No. PCT/US2010/048125 dated Dec. 17, 2010.
International Search Report and Written Opinion for Application No. PCT/US2011/059736 dated Mar. 27, 2012.
International Search Report and Written Opinion for Application No. PCT/US2012/037544 dated Aug. 10, 2012.
International Search Report and Written Opinion for Application No. PCT/US2012/037557 dated Aug. 13, 2012.
International Search Report and Written Opinion for Application No. PCT/US2014/027839 dated Jul. 24, 2014 (9 pages).
International Search Report and Written Opinion for Application No. PCT/US2014/028217 dated Jul. 28, 2014 (8 pages).
International Search Report and Written Opinion for Application No. PCT/US2015/018123 dated May 8, 2015 (10 pages).
International Search Report and Written Opinion for Application No. PCT/US2017/027241 dated Jul. 10, 2017 (11 pages).
International Search Report and Written Opinion for Application No. PCT/US2017/034503 dated Aug. 15, 2017 (14 pages).
Advisory Action pertaining to U.S. Appl. No. 12/160,803 dated Jul. 11, 2013.
Advisory Action pertaining to U.S. Appl. No. 13/121,009 dated Jun. 24, 2013.
Examiner's Answer before the Patent Trial and Appeal Board of U.S. Appl. No. 12/160,803 dated Nov. 4, 2013.
Final Rejection pertaining to U.S. Appl. No. 12/160,803 dated Jan. 5, 2012.
Final Rejection pertaining to U.S. Appl. No. 12/160,803 dated Mar. 22, 2013.
Final Rejection pertaining to U.S. Appl. No. 13/121,009 dated Jan. 16, 2014.
Final Rejection pertaining to U.S. Appl. No. 13/121,009 dated Mar. 14, 2013.
Office Action pertaining to U.S. Appl. No. 12/160,803 dated Jun. 5, 2012.
Office Action pertaining to U.S. Appl. No. 12/160,803 dated Jun. 7, 2011.
United States Patent Office Action for U.S. Appl. No. 12/160,803 dated Feb. 23, 2016 (27 pages).
Office Action pertaining to U.S. Appl. No. 13/121,009 dated Sep. 13, 2013.
Office Action pertaining to U.S. Appl. No. 13/121,009 dated Sep. 6, 2012.
United States Patent Office Action for U.S. Appl. No. 13/394,396 dated Dec. 18, 2014 (14 pages).
United States Patent Office Final Rejection for U.S. Appl. No. 13/394,396 dated Jul. 2, 2015 (15 pages).
United States Patent Office Action for U.S. Appl. No. 13/394,396 dated Jan. 15, 2016 (13 pages).
United States Patent Office Action for U.S. Appl. No. 13/394,572 dated Apr. 9, 2014 (26 pages).
United States Patent Office Action for U.S. Appl. No. 13/394,572 dated Aug. 26, 2014 (16 pages).
United States Patent Office Action for U.S. Appl. No. 13/394,572 dated Dec. 30, 2014 (19 pages).
United States Patent Office Action for U.S. Appl. No. 13/394,572 dated Oct. 13, 2015 (21 pages).
United States Patent Office Notice of Allowance for U.S. Appl. No. 13/394,572 dated Dec. 14, 2015 (10 pages).
United States Patent Office Notice of Allowance for U.S. Appl. No. 13/394,572 dated Feb. 22, 2016 (8 pages).
United States Patent Office Action for U.S. Appl. No. 14/091,654 dated Jun. 12, 2015 (16 pages).
United States Patent Office Action for U.S. Appl. No. 14/091,654 dated Oct. 30, 2014 (14 pages).
United States Patent Office Action for U.S. Appl. No. 14/091,654 dated Jan. 4, 2016 (17 pages).
United States Patent Office Notice of Allowance for U.S. Appl. No. 14/504,295 dated Sep. 28, 2015 (10 pages).
United States Patent Office Action for U.S. Appl. No. 15/162,199 dated Jun. 30, 2016 (10 pages).
United States Patent Office Final Rejection for U.S. Appl. No. 15/162,199 dated Oct. 21, 2016 (9 pages).
United States Patent Office Action for U.S. Appl. No. 13/883,795 dated Jun. 20, 2016 (15 pages).
United States Patent Office Action for U.S. Appl. No. 13/883,795 dated Jun. 23, 2017 (11 pages).
United States Patent Office Notice of Allowance for U.S. Appl. No. 13/394,396 dated Aug. 3, 2016 (8 pages).
United States Patent Office Action for U.S. Appl. No. 14/116,627 dated Oct. 20, 2016 (6 Pages).
United States Patent Office Notice of Allowance for U.S. Appl. No. 14/116,627 dated Mar. 10, 2017 (5 pages).
United States Patent Office Notice of Allowance for U.S. Appl. No. 14/116,627 dated Jun. 14, 2017 (5 pages).
United States Patent Office Final Rejection for U.S. Appl. No. 14/116,636 dated Oct. 24, 2016 (10 pages).
United States Patent Office Action for U.S. Appl. No. 14/766,086 dated Jan. 13, 2017 (22 pages).
United States Patent Office Action for U.S. Appl. No. 14/766,086 dated Sep. 7, 2017 (19 pages).
United States Patent Office Action for U.S. Appl. No. 14/775,044 dated May 30, 2017 (15 pages).
United States Patent Office Action for U.S. Appl. No. 14/634,319 dated Nov. 7, 2016 (7 pages).
United States Patent Office Action for U.S. Appl. No. 14/634,319 dated Apr. 11, 2017 (9 pages).
United States Patent Office Notice of Allowance for U.S. Appl. No. 14/774,730 dated Nov. 16, 2016 (10 pages).
United States Patent Office Notice of Allowance for U.S. Appl. No. 13/883,795 dated Jan. 22, 2018 (7 pages).
United States Patent Office Action for U.S. Appl. No. 14/766,086 dated Jan. 2, 2018 (21 pages).
United States Patent Office Action for U.S. Appl. No. 14/775,044 dated Feb. 26, 2018 (16 pages).
United States Patent Office Action for U.S. Appl. No. 15/191,249 dated Dec. 28, 2017 (14 pages).
United States Patent Office Action for U.S. Appl. No. 15/376,590 dated Mar. 9, 2018 (10 pages).
Forzatti, "Present status and perspectives in de-NOx SCR catalysis." Appl. Catal. A: Gen., 222(1-2), 2001, 221-236.
United States Environmental Protection Agency. "Air Pollution Control Technology Fact Sheet: Selective Catalytic Reforming," <https://www3.epa.gov/ttncatc1/cica/files/fscr.pdf> (2003).
Trout et al., "Analysis of the Thermochemistry of NOx Decomposition over CuZSM-5 Based on Quantum Chemical and Statistical Mechanical Calculations," J. Phys. Chem, 100(44), 1996, 17582-17592.
Iwamoto et al., "Influence of sulfur dioxide on catalytic removal of nitric oxide over copper ion-exchanged ZSM-5 Zeolite." Appl. Catal., 69(2), 1991, 15-19.
Liu et al., "Recent Advances in Catalytic DeNOx Science and Technology," Catalysis Reviews, 48(1), 2006, 43-89.
Imanaka et al., "Advances in Direct NOx Decomposition Catalysts," Appl. Catal. A: Gen., 431-432, 2012, 1-8.
Masui et al.,"Direct Decomposition of NO into N2 and O2 Over C-type Cubic $Y_2O_3$—$Tb_4O_7$—$ZrO_2$," Materials Sciences and Applications, 3(10), 2012, 733-738.
United States Patent Office Notice of Allowance for U.S. Appl. No. 15/191,249 dated May 22, 2018 (8 pages).

\* cited by examiner

SYSTEMS AND METHODS FOR PARTIAL OR COMPLETE OXIDATION OF FUELS

CROSS-REFERENCE TO RELATED APPLICATION(S)

This is a continuation of U.S. patent application Ser. No. 14/634,319, filed on Feb. 27, 2015, which claims priority to U.S. Provisional Patent Application No. 62/041,703, filed on Aug. 26, 2014, and U.S. Provisional Patent Application No. 61/945,257, filed on Feb. 27, 2014, the entire contents of all of which are fully incorporated herein by reference.

TECHNICAL FIELD

The present disclosure relates to systems and methods for converting carbon-based fuels such as methane-rich sources like natural gas or shale gas, syngas, biomass, and coal to value-added products with oxidation-reduction metal-oxides. The exemplary embodiments detail the oxidation-state of the metal oxide in multiple reactor configurations and ways to utilize multiple carbonaceous sources.

BACKGROUND

The rise in human population is related to the rise in global energy demand for value-added products such as gasoline, jet-fuel, diesel, and synthetic intermediates for polyester, polyethylene, Teflon, etc. Conversion of fossil fuels (e.g. natural gas, coal) to value-added products can be used to meet the growing energy demand. Given the abundance of natural fossil resources worldwide and the potential benefits of economic liquid fuel production, the fuel projects have seen some of the highest capital investments for a single fuel processing project worldwide. The cost-intensive nature of the conventional technology has led to considerable research in developing alternatives for fuel-to-liquids conversion.

Conventional technologies for liquid fuel production from coal and natural gas utilize a two-step process. The initial step involves converting the fuel to a synthesis gas (syngas) composing an appropriate $H_2/CO$ ratio that can vary from 1.0 for co-firing to 2.0 or greater for the Fischer-Tropsch reaction or methanol synthesis. This initial step, also known as the syngas-generating step, is capital and energy intensive in terms of the overall plant capital cost and the syngas generation efficiency, respectively.

As energy demands rise due to global population increase, developing systems and system components that can convert fuels efficiently are a necessity. This need also opens the opportunity to develop processes that can flexibly operate using multiple types of hydrocarbon feeds and/or can reduce the demands of conventional cost-intensive process unit operations.

SUMMARY

In one aspect, disclosed is a system for conversion of fuels to produce syngas, the system comprising a series of reactors. In one embodiment, a reactor system is used to produce syngas by reaction with an oxygen carrier material while the fuel source consists of two feedstocks. The reactor system is designed to partially or fully oxidize a given fuel and the resultant gaseous product stream can act as an enhancing agent for gasifying the second fuel. The gas-solid contact mode can be designed to react the metal-oxide with the first and second fuel to convert them to a high purity, syngas with a flexible $H_2/CO$ ratio. A third reactor is used to re-oxidize the metal oxide oxygen carrier and complete the loop auto-thermally. The present disclosure also includes a system and method for increasing the overall system thermal efficiency and decreasing the cost by applying a unique system configuration of compressors/expanders.

In another aspect, disclosed is a system for conversion of fuel (e.g., coal) to produce high quality syngas. The specified operating condition obtained by combination of oxygen carrier and reactor contact pattern selectively oxidizes the fuel feed-stock to a syngas suitable for liquids and/or chemicals production. The combination disclosed increases the carbon utilization efficiency and reduces the costs associated with additional reforming while producing syngas. The operating strategy includes a combination of a suitable oxygen carrier and its temperature swing for sustainable heat management, a co-current downward reaction mode obtained by a specific flow ratio of the oxygen carrier to the solid fuel, and a specific steam flow. The operating condition is characterized by a critical point of operation, wherein the oxygen transfer from the oxygen carrier to the solid fuel and from the steam to the oxygen carrier is maximized while minimizing the oxygen transfer from steam to the fuel. At the specified operating condition, the oxygen carrier undergoes an overall loss of oxygen in the reducer reactor, while gaining it in the oxidizer reactor. A part of the swing is utilized to produce energy for satisfying the parasitic energy requirement of the system. The current disclosure also provides a method used in-conjunction with the specific operating condition to enhance the savings on the net operating energy.

Additional features include the advantages and process configurations with detailed description for each system disclosed. The method disclosure has a general description followed by a detailed example of analysis demonstrating how the method can be applied.

BRIEF DESCRIPTION OF THE DRAWINGS

The following detailed description of specific embodiments of the present disclosure can be best understood when read in conjunction with the following drawings, where like structure is indicated with like reference numerals.

DETAILED DESCRIPTION

Figure 1:
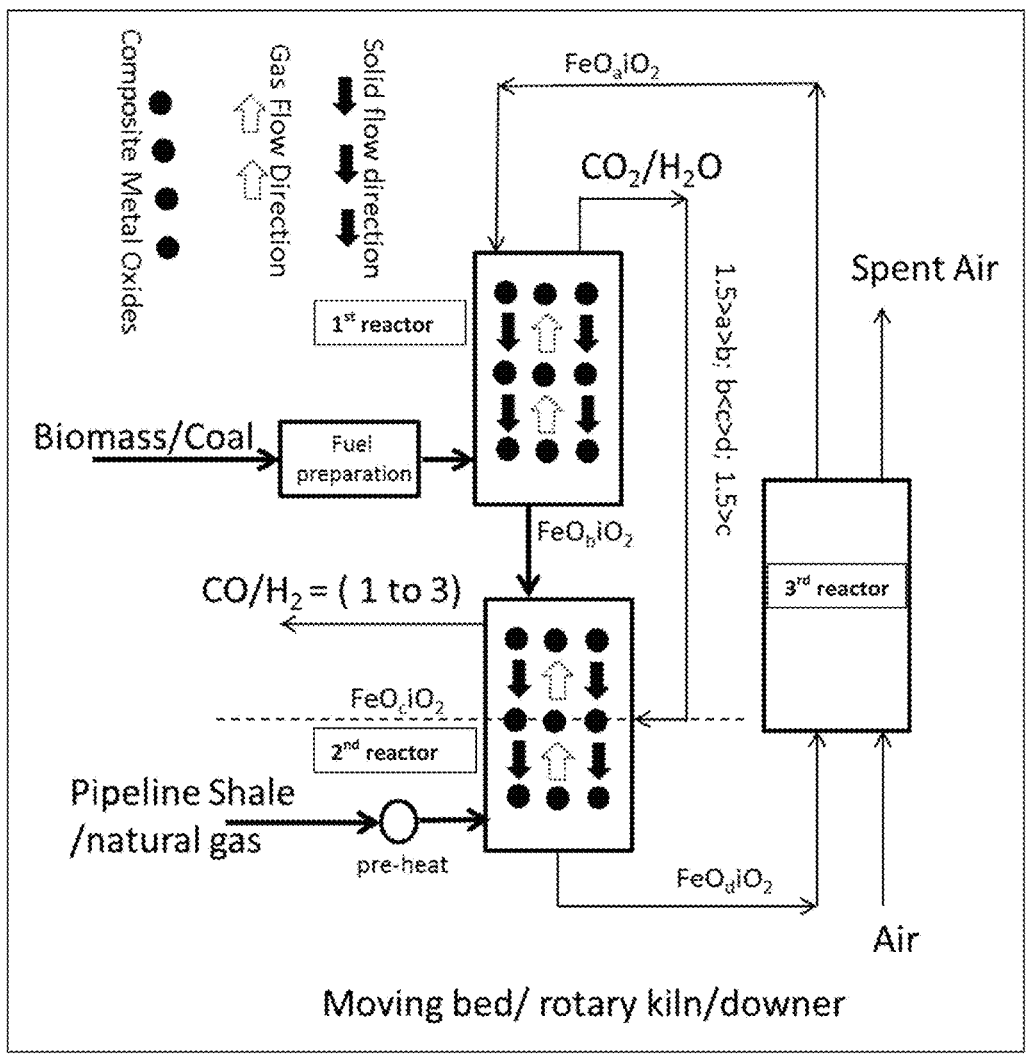
FIG. 1 is a configuration where an oxidation state swing is used in the second reactor, according to one or more embodiments described herein.

In certain embodiments, disclosed is the use of a specific metal-oxide composition to perform the selective partial oxidation of a fuel feedstock. The chemical looping processes typically use a metal-oxide to perform reduction-oxidation cycles. The overall fuel reforming reaction is exothermic. The first step is the reaction of fuel feed with the metal oxide to partially oxidize it to synthesis gas stream consisting predominantly of $H_2$ and CO and is generally endothermic or slightly exothermic. The second step is the exothermic reaction of the metal oxide with an oxygen containing reactant. The metal-oxide can be developed and directed towards the particular application it is used for.

In certain embodiments, disclosed is a specific operating strategy obtained by a unique combination of a suitable oxygen carrier, a co-current downward reaction mode obtained by a specific flow ratio of the oxygen carrier to the solid fuel, the chosen flow enhancer gas injection, and the temperature swing of the near-adiabatic operation. The configurations described use a metal-oxide oxygen carrier in conjunction with a unique reactor configuration to convert fuels like coal, biomass etc. to a $H_2$-rich syngas. The configurations have two basic reactors in which the conversions take place. The first reactor, also known as reducer converts the fuel mixture to a syngas stream with high carbon-utilization. The first reactor in the process of partially oxidizing the fuel reduces the metal-oxide oxygen carrier. The metal-oxide oxygen carrier is re-oxidized back in the oxidizer using an oxygen source like air, steam etc.

Syngas production is often used in determining the overall economics of a liquids/chemicals production facility. The syngas production systems can make a significant contribution to the capital cost and the operating cost of the plant. The disclosed configurations and methodologies provide improvements in the overall economics of the process, and provide greater flexibility for providing efficient and economic syngas production systems and methods.

1. DEFINITIONS

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The terms "comprise(s)," "include(s)," "having," "has," "can," "contain(s)," and variants thereof, as used herein, are intended to be open-ended transitional phrases, terms, or words that do not preclude the possibility of additional acts or structures. The singular forms "a," "an" and "the" include plural references unless the context clearly dictates otherwise. The present disclosure also contemplates other embodiments "comprising," "consisting of" and "consisting essentially of," the embodiments or elements presented herein, whether explicitly set forth or not.

The conjunctive term "or" includes any and all combinations of one or more listed elements associated by the conjunctive term. For example, the phrase "an apparatus comprising A or B" may refer to an apparatus including A where B is not present, an apparatus including B where A is not present, or an apparatus where both A and B are present. The phrases "at least one of A, B, . . . and N" or "at least one of A, B, . . . N, or combinations thereof" are defined in the broadest sense to mean one or more elements selected from the group comprising A, B, . . . and N, that is to say, any combination of one or more of the elements A, B, . . . or N including any one element alone or in combination with one or more of the other elements which may also include, in combination, additional elements not listed.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

2. SYNGAS PRODUCTION SYSTEMS

Syngas production systems play a role in the overall cost of a Fischer Tropsch plant configuration for liquid fuel production from natural gas. Typical syngas production systems include steam-methane reforming, auto-thermal oxidation and partial direct oxidation of the gaseous fuel. The present disclosure provides systems and methods to produce high-quality products like syngas, with lower fuel consumption per unit heating value of product produced.

In one embodiment illustrated in FIG. 1, a three reactor system is used for flexibly producing syngas from a combination of fuels. This reactor system consists of 3 reactors to perform multiple reduction-oxidation cycles. During the reduction cycle, those skilled in the art can design the gas-solid contact mode to partially or fully oxidize the fuels in combination to produce high-quality syngas with a variable $H_2$:CO ratio.

As illustrated in FIG. 1, the first reactor uses solid fuels such as lignite, bituminous, sub-bituminous anthracite, petcoke, and/or biomass. The second reactor uses a gaseous fuel such as natural gas, shale-gas or syngas, etc to react and provide the counter-current contact mode. The first reactor can be a packed moving bed, rotary kiln and/or downer to simulate the counter-current gas-solid contact mode. The solid fuel is introduced into the first reactor system to simulate a counter-current contact mode with the oxygen carrier. The metal-oxide oxygen carrier flows from the top to the bottom in the first reactor. The fuel residence time and the gas-solid contact pattern is designed to entirely convert the solid fuel to a gaseous form when reaching the top of the reactor. The preferred products are completely oxidized to include $CO_2$ and $H_2O$. The metal oxide donates oxygen to the solid fuel to reform and/or fully oxidize it. In certain embodiments, the oxygen carrier is written as $FeO_aTiO_2$ the product outlet will be $FeO_bTiO_2$ governed by the relationship a>b. For the specific case shown in FIG. 1, the overall defining relationship is 1.5>a>b>0.1.

The second reactor receives the metal-oxide from the first reactor. The second reactor can be a packed moving bed, rotary kiln, a downer or a combination thereof. In certain embodiments, a series of fluidized beds simulating multiple stages of equilibrium can be used. The fully or partially oxidized gaseous products from the first reactor are fed into the middle of this reactor. The gaseous fuel is fed from the bottom. In embodiments when shale and natural gas are used, the predominant gaseous fuel is methane. The gaseous product injection from the first reactor should be manipulated such that it is sent in a location where all the methane has been converted to a mixture of CO, $CO_2$, $H_2$, and $H_2O$. The gaseous fuel and the gaseous products flow counter-currently to the flow of the solid oxygen carrier particles from the bottom to the top in FIG. 1. The final product is syngas. The counter-current equilibrium differential can produce a syngas stream with a flexible composition, which can be used downstream for producing liquid fuels. The syngas will have a $H_2$/CO ratio between 1 and 4.

The metal-oxide oxidation state swing is a unique characteristic of this reactor operation. In the top section of the second reactor, the metal oxide gains oxygen as it reforms the fully or partially oxidized product to syngas. This involves gaining oxygen to convert $CO_2$ to CO and $H_2O$ to $H_2$. In certain embodiments, the oxygen carrier introduced into the second reactor has a formula $FeO_bTiO_2$. At the location of where the gaseous fuel is introduced to the second reactor, the oxygen carrier has a formula $FeO_cTiO_2$. In the top section of the second reactor, the oxygen carrier gains oxygen due to its reaction the product gases from the first reactor. Therefore, the governing equation is c>b. The same oxygen carrier will donate oxygen to partially or fully oxidize the gaseous fuels injected from the bottom of the reactor. In some embodiments, the formula $FeO_dTiO_2$ represents the oxygen carrier at this stage and the governing equation is d<c. Thus, the overall governing equation is 1.5>a>b and b<=c=>d and 1.5>c. In case when c is fully oxidized, the value of c can range from b to 1.33. The governing equations are important in simulating the oxygen swing of the oxygen carrier.

The third reactor uses air and/or an oxygen-containing source such as oxygen from an air-separation to re-oxidize the metal-oxide to its full oxidation state. From FIG. 1, the metal-oxide enters the third reactor in the form of $FeO_dTiO_2$ and exits in the form $FeO_aTiO_2$, where 1.5>=a>d>0.1. This value 'a' corresponds to the value of the oxidation state introduced into the first reactor and thereby completing the redox cycle.

The overall reactor operation is auto-thermal or near auto-thermal with the inert percentage of the metal-oxide carrier varying between 5 to 100% depending on the capacity and the flow-rates used. The average operating pressure of the system can vary between 1 and 80 atm. The operating temperature of the reactor system can be 600 C to 1,300 C for isothermal operation. For an overall adiabatic operation the operating temperature is manipulated so no additional heat reactor system is required. The gaseous fuel is pre-heated to maintain the auto-thermal temperature profile. The solid fuel can preferably be processed to have a suitable pellet size for ease of injection and reaction. In certain exemplary embodiments, the metal-oxide oxygen carrier is $FeO_aTiO_2$, with the inert $TiO_2$ composing of 20 wt % and with an operating pressure of 20 atm. The temperature in the first, second and third reactor will range from 1200 C to 900 C, 900 C to 700 C, and 700 C to 1200 C, respectively. The corresponding syngas composition can be designed to have a $H_2$/CO ratio of between 4:1 to 2:1 and the $CO_2$ and $H_2O$ % will be less than 10 v/v % of the total product flow.

Figure 2:
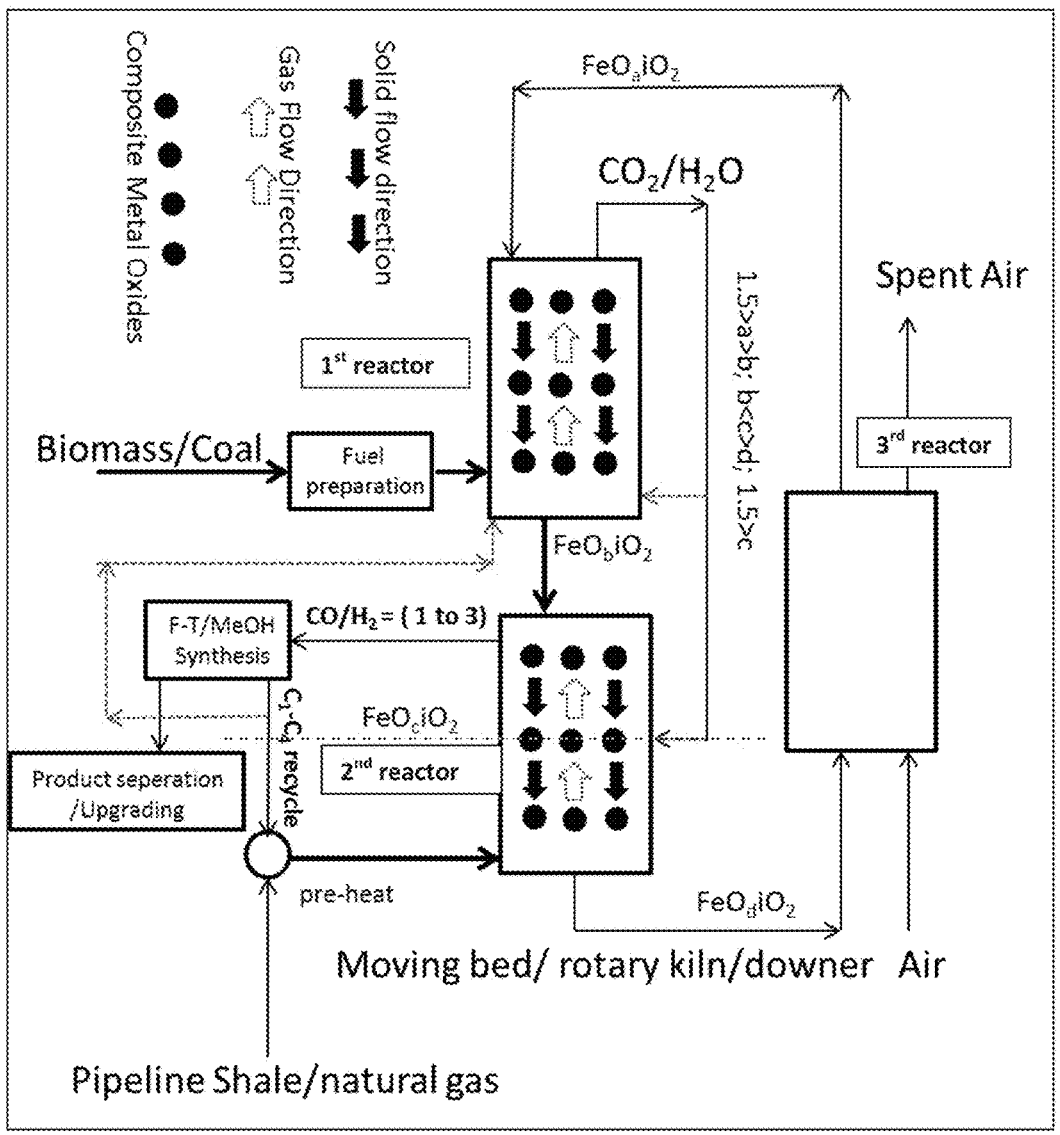
FIG. 2 illustrates the oxidation state swing of metal-oxide using light hydrocarbon recycle or any waste hydrocarbon stream from the liquid fuel production facility or otherwise, according to one or more embodiments described herein.

In another embodiment as illustrated in FIG. 2, the syngas from the system is sent to the Fischer-Tropsch and/or methanol synthesis system. The light hydrocarbon tail-gas which comes from the various unit-operations in the liquid fuel production is recycled to combine with the gaseous fuel and pre-heated to increase the overall carbon-efficiency process to greater than 99%. The overall system can produce excess energy from the high-quality heat extraction from the third reactor and the air-product stream. This will offset the burning requirement for the light hydrocarbon from the down-stream liquid fuel production complex and thereby some of the gas can be recycled to the chemical looping reactor schematic.

It should be noted that although it is stated that the first reactor can use solid fuels, liquid fuels such as naphtha, gasoline, or residual oil could also be used either in a co-current or a counter-current manner. The reactor system design will change to account for the pressure change in vaporization and the respective residence time requirement to complete the oxidation prior to introducing the product gas stream into the second reactor. From FIG. 2, an enhancing gas is introduced into the first reactor for promoting char gasification in solid fuel. The enhancing gas can be supplied by providing a slip-stream from the outlet of the first reactor. The volume percentage of the slip-stream as compared to the product outlet stream will vary between 0 to 30%. In the case where the light hydrocarbons from the liquid fuel production facility are recycled, a portion of the recycle stream can be used in combination with the recycled slip-stream out of the gaseous product of the first reactor. The $C_1$-$C_4$ hydrocarbons can be 0 to 100% of the enhancing gas volumetric flow rate with the complimentary being the gaseous product of the first reactor. The dotted arrows in FIG. 2 indicate the possible locations/ways in which enhancing gas is injected.

Figure 3:
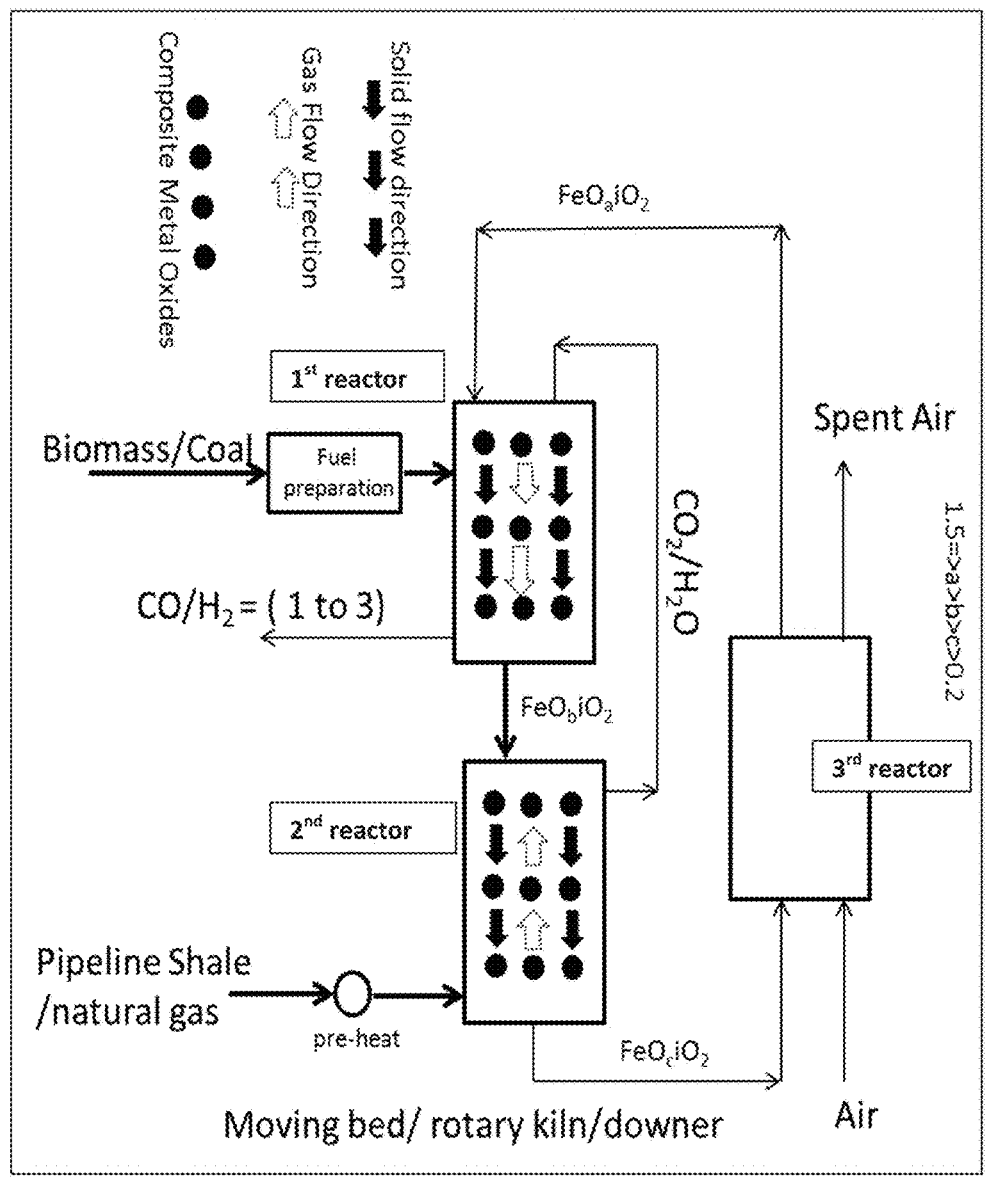
FIG. 3 illustrates the use of the first reactor to produce syngas and the second reactor to generate enhancing gas while over-reducing the metal-oxide, according to one or more embodiments described herein.

In yet another embodiment illustrated in FIG. 3, the first reactor is used to partially oxidize the solid fuel source while the second reactor fully oxidizes the gaseous fuel to $CO_2$ and $H_2O$. The first and the second reactors utilize a fuel source while the third reactor reoxidizes the reduced metal oxide to its full-oxidation state. In the first two reactors the metal oxide moves downwards. In the first reactor, the gas and solid move co-currently while in the second reactor, the gas and solid move counter-currently. In this embodiment, the solid fuel is partially converted to syngas while the gaseous fuel is partially or fully oxidized to increase the gasification efficiency.

From FIG. 3, a packed moving bed reactor design is used for both the first and second reactor to provide multiple stages for the oxygen carrier and thereby separate the two fuel partial oxidation reaction front for easier large-scale integration. The first reactor can utilize solid fuels like coal, pet-coke, biomass, etc. The metal-oxide oxygen carrier is introduced at the top of the reactor while it exits the reactor at the bottom. In certain embodiments, the reactor is a packed downward moving bed, a rotary kiln or a downcomer. In other embodiments, a fluidized bed can be configured to provide multiple equilibrium stages and perform the same function as the moving bed reactor. The solid fuel is introduced at the top of the reactor along a level below the metal-oxide injection. The gasifying product from the second reactor is introduced at the top to gasify the solid fuel. It is injected at a level above the solid fuel. In the embodiment illustrated in FIG. 3, the highest oxidation state of oxygen carrier is in contact with the fresh solid feed introduced. This leads to a higher driving force for oxygen donation and correspondingly faster kinetics and a smaller reactor size. The metal oxide will donate oxygen to the solid char and the gaseous products and drive the conversion to produce syngas. In certain embodiments, the oxygen carrier is iron based and has the formula of $FeO_aTiO_2$ and the outlet metal oxide has a formula of $FeO_bTiO_2$, the governing equation relating the value of 'a' and 'b' will be $1.5=>a>b=>0.75$. The solid fuel flows co-currently with the gas phase products and reactants.

The second reactor takes in a gaseous fuel such as natural gas or shale gas and fully-oxidizes it to a mixture of $CO_2$ and $H_2O$. The gaseous fuel is pre-heated and injected at the bottom of the second reactor. The gaseous fuel travels upwards counter-currently while extracting oxygen from the oxygen carrier reducing it to a lower oxidation state. The oxygen carrier flows downwards counter-currently with the gas phase products and reactants. The reduction of the oxygen carrier has a catalyzing effect initially in converting methane. The greater the reduction of the oxygen carrier can also help reduce the overall solids circulation rate by creating a larger exothermic reaction in the third reactor to fully oxidize the oxygen carrier. The second reactor can be configured to produce a fully or partially oxidized gaseous stream. The final product is a mixture which serves as a gasifying agent to convert the solid fuel to a flexible mixture of syngas with the $H_2$/CO ratio varying from 1:1 to 4:1. In certain embodiments, the oxygen carrier entering the second reactor from the first reactor has a formula of $FeO_bTiO_2$ and the outlet will have a formula of $FeO_cTiO_2$. The governing equation for this reactor in terms of the oxygen carrier oxidation states is $0.1<c<b$.

In FIG. 3, the third reactor uses oxygen from air or from equipment such as an air separation unit and/or vacuum distillation unit to re-oxidize the metal oxide to the original oxidation state. In certain embodiments, the inlet metal-oxide has a formula of $FeO_cTiO_2$ and the outlet has a formula of $FeO_aTiO_2$. The overall governing equation will be $a>c$. The overall system governing equation will be $1.5>=a>b>c>0.1$ and $c<a$. The overall reactor system can be operated in an iso-thermal or adiabatic mode of operation. The iso-thermal operation can include a range of operating temperatures from 700 C to 1,300 C. The adiabatic operation can be auto-thermal with respect to the oxygen carrier if the endothermic or near endothermic reactions in the first and second reactor are balanced or less than the heat extracted from the third reactor step. In certain embodiments, the pre-heating of the gaseous fuel stream and the air-stream assists in the auto-thermal operation of the reactor system. The solid fuel can have a suitable pellet size relative to the oxygen carrier for ease of injection and good mixing. In certain embodiments, the oxygen carrier is $FeO_aTiO_2$ with 80 wt % $TiO_2$. The operating pressure of the system is set at 20 atm and the air and gaseous fuel are pre-heated to 600 C. The first reactor has a temperature range from 1200 C to 1000 C. In the second reactor the temperature ranges from 1000 C to 700 C. The third reactor has a temperature range from 700 C to 1300 C.

Figure 4:
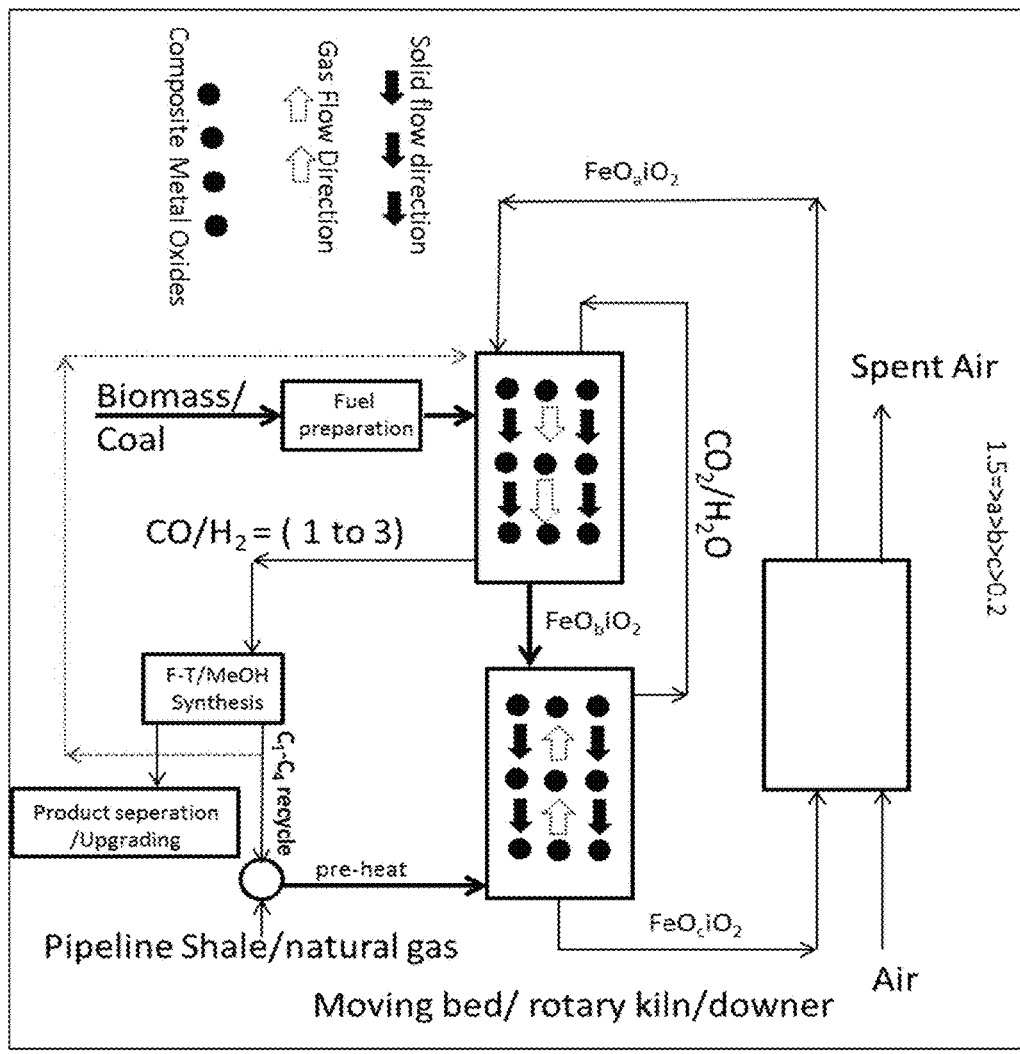
FIG. 4 illustrates the oxidation state swing of metal-oxide using light hydrocarbon recycle or any waste hydrocarbon stream from the liquid fuel production facility or otherwise, according to one or more embodiments described herein.

In another embodiment as illustrated in FIG. 4, the light hydrocarbons ($C_1$-$C_4$) from the liquid fuel production units can be utilized along with the gaseous fuels. This embodiment increases the carbon-efficiency to a value greater than 90%. The overall energy requirement can be offset and the carbon emission removed by extracting heat and using it in a gas-turbine/steam-turbine system to generate electricity to compensate for parasitic energy consumption. In another variation, the gaseous fuels and/or solid fuels can be substituted with a liquid fuel such as waste gasoline or petroleum in a co-current downward flow or counter-current upward flow. The possible configurations for the hydrocarbon recycle are shown as dotted lines in FIG. 4.

Figure 5:
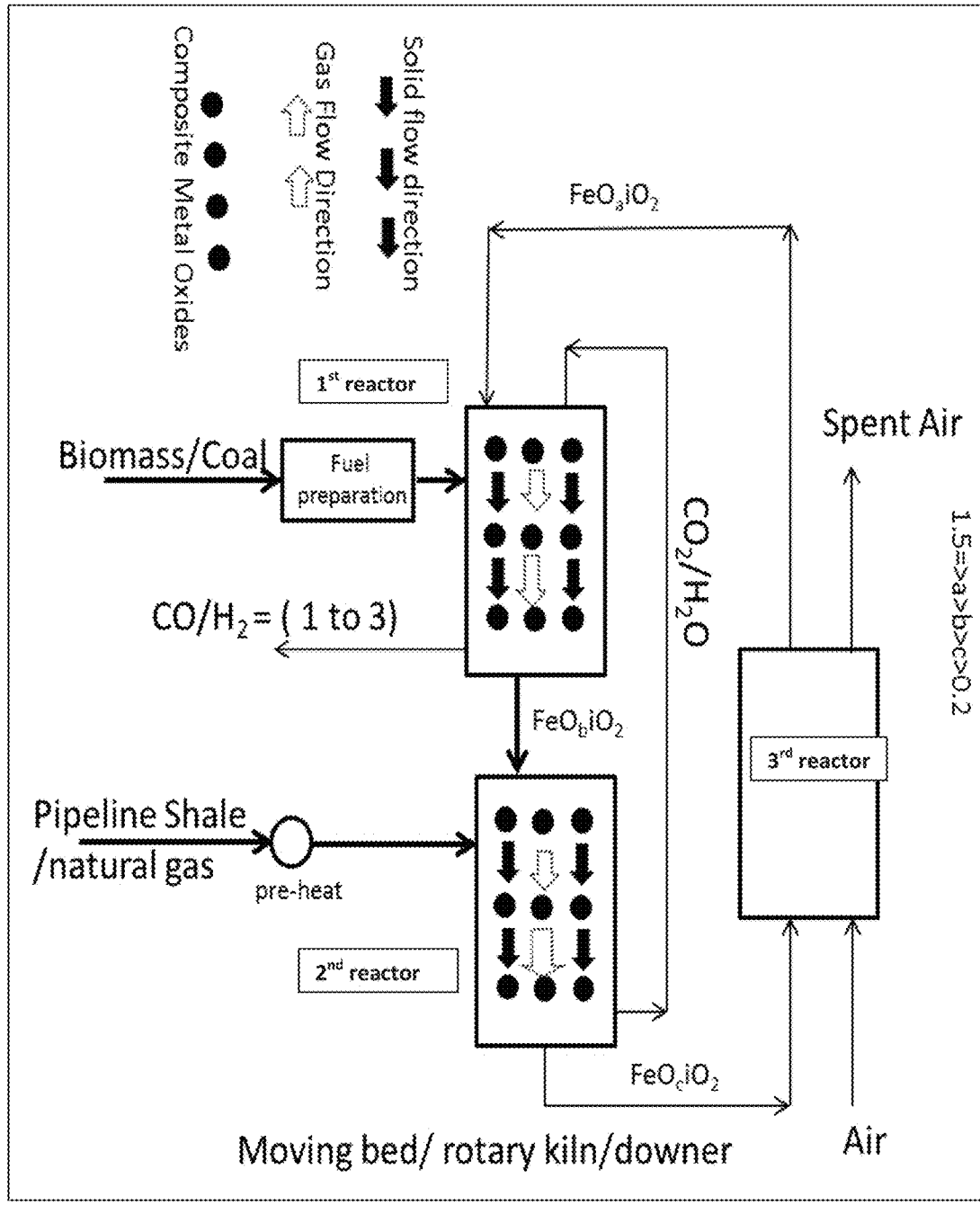
FIG. 5 is a configuration with the enhancing gas obtained from the second reactor according to one or more embodiments described herein.

In another embodiment illustrated in FIG. 5, a system to generate syngas in a three reactor system is disclosed. Similar to FIG. 3, the first reactor converts the solid fuel to syngas in a co-current gas-solid flow. The oxygen carrier donates oxygen to the fuel to partially oxidize it to a high quality syngas. The gaseous products from the second reactor enhance the gasification of the solid fuels in the first reactor. The reduced metal oxide is sent to the second reactor. The second reactor operates in a co-current gas-solid contact pattern. The gaseous fuel is injected from the top and exits the bottom. Both the reactors can be moving bed, downer and/or a rotary kiln. The possible benefit of this operation mode is that the fuel receives oxygen in the first step from a relatively oxygen rich oxygen carrier. This leads to a higher driving force and correspondingly a lower residence time requirement and a smaller size of the reactor. In certain embodiments, $FeO_bTiO_2$ enters the second reactor at the top and exits as $FeO_cTiO_2$ at the bottom; the governing equation for the system will be c<b. It should be noted that though this embodiment is similar to FIG. 4 except for the contact mode in the second reactor—it is co-current downwards as opposed to counter-current upwards. Correspondingly the value of 'c' at the outlet of the second reactor in FIG. 3 is lower than in FIG. 5.

In the embodiment illustrated in FIG. 5, the operating pressure of the system can vary from 1 atm to 100 atm. The auto-thermal operation can have a temperature range from 1300 C to 700 C in the first and second reactor. The third reactor schematic is similar to that in FIG. 3. The syngas quality will have a $H_2/CO$ ratio between 1:1 to 1:4 and a combined $CO_2$, $H_2O$ content of less than or equal to 15%.

Figure 6:
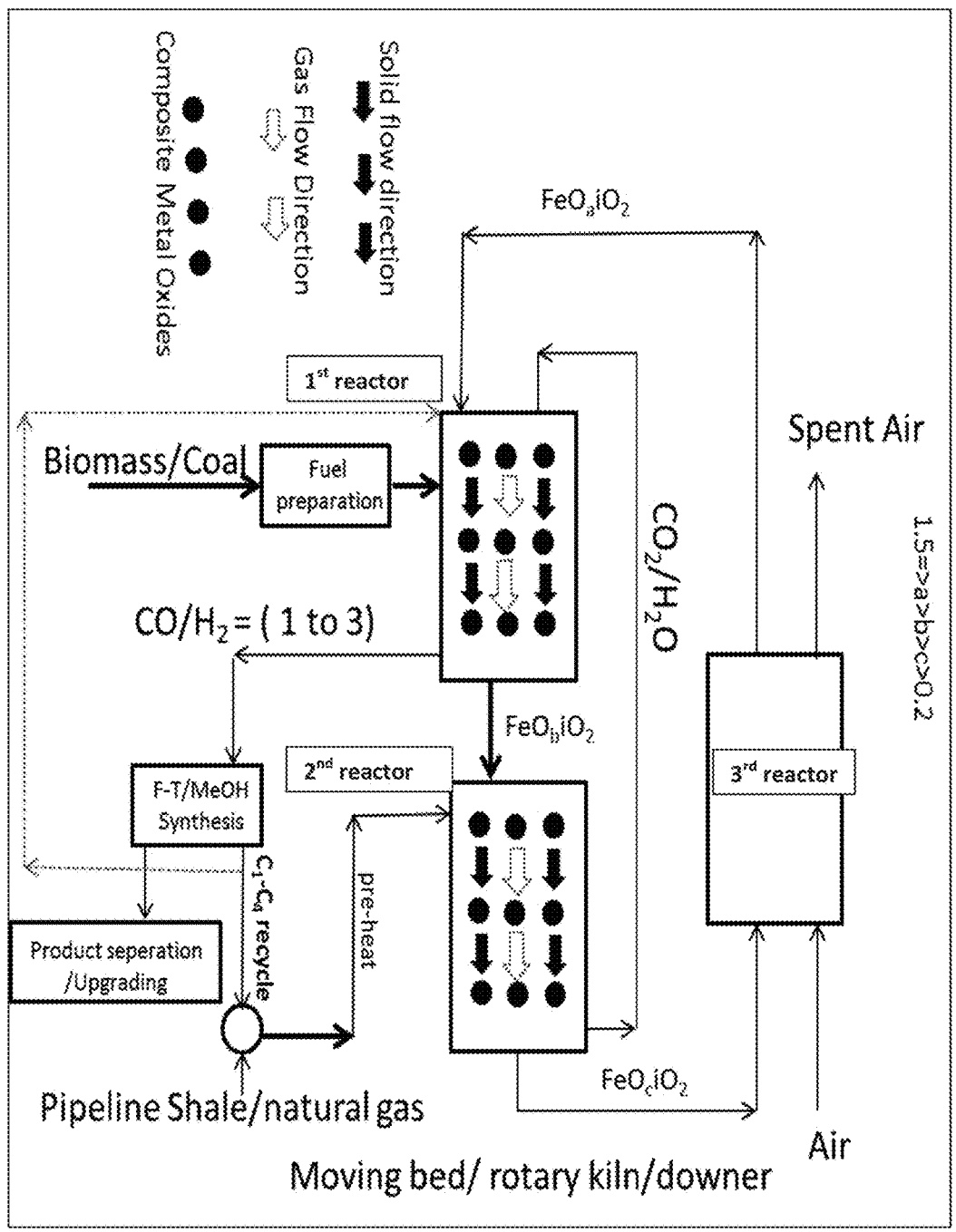
FIG. 6 is a similar configuration as FIG. 5 with light hydrocarbon recycle used an enhancing gas for either fuel, according to one or more embodiments described herein.

In another embodiment illustrated in FIG. 6, the $C_1$-$C_4$ off-gas stream from various unit operations in a liquid chemicals production refinery can be used to off-set the power generation unit in the refinery complex. High quality heat can be extracted and the carbon efficiency can achieve greater than 90% for this configuration. The inert percentage can vary between 20 to 80% for near auto-thermal operation. The oxygen can be provided by air or pure oxygen from an air-separation unit, vacuum distillation unit or oxygen tanks.

Figure 7:
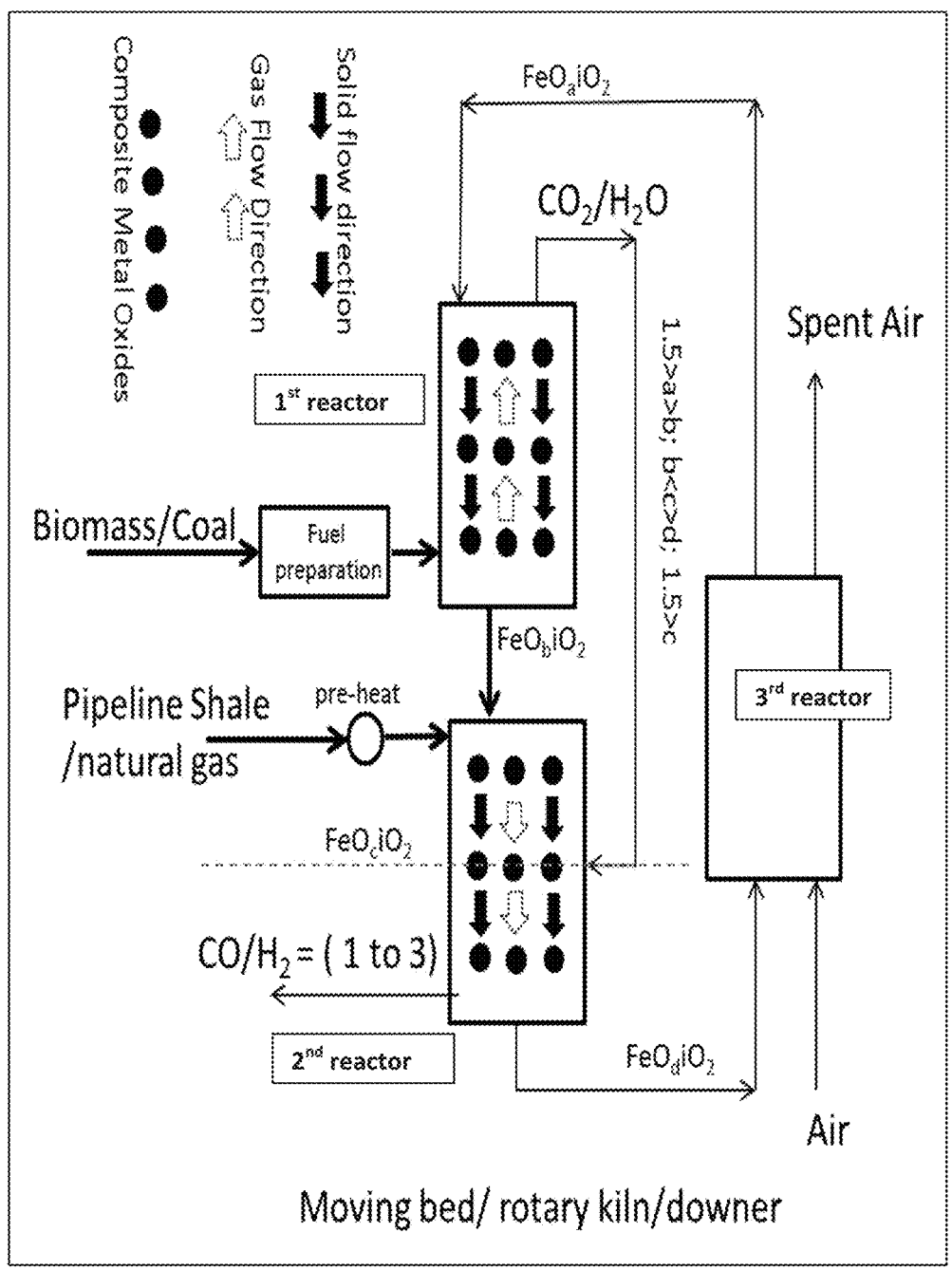
FIG. 7 is the oxidation state swing in the second reactor with co-current downward gas-solid flow, according to one or more embodiments described herein.
Figure 8:
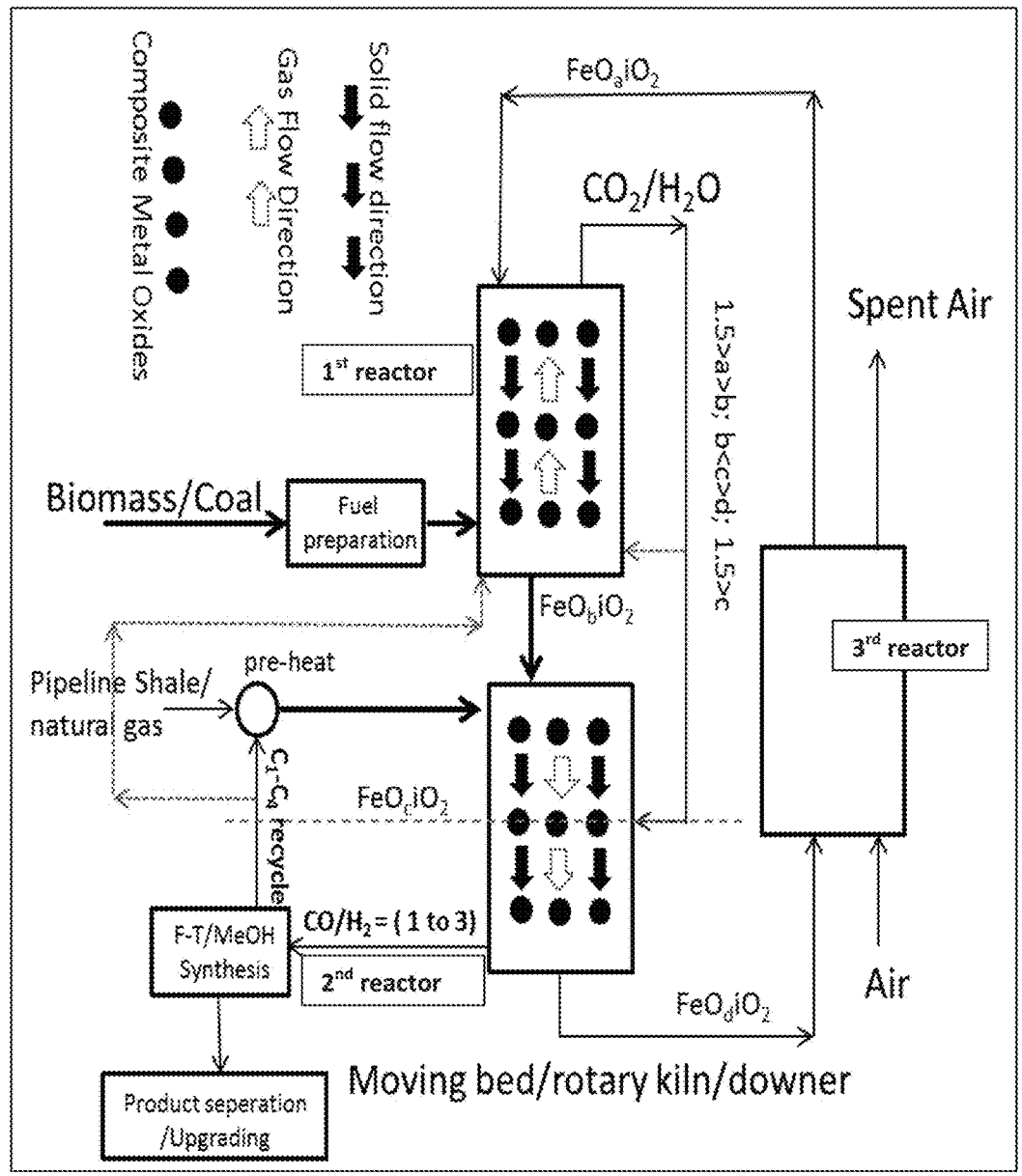
FIG. 8 is a variation of FIG. 7 to use a light hydrocarbon recycle from the liquid fuel production facility, flare gas recycle or otherwise, according to one or more embodiments described herein.

In another embodiment illustrated in FIG. 7, the first and second reactors operate in a counter and co-current gas-solid flow, respectively. The first and second reactor can be configured to have a downward flow of the oxygen carrier. Similar to the case disclosed in FIG. 2, the enhancing gas for the first reactor can include up to 30 v/v % slip-stream from the outlet of the first reactor. In another embodiment illustrated in FIG. 8, the light hydrocarbons are recycled to the first reactor for greater end-product production efficiency. The light hydrocarbons can range between 0 to 100 v/v % of the enhancing gas stream.

From FIG. 7 in comparison to FIG. 1, the metal oxide enters from the top and exits out of the second reactor, undergoing a partial oxidation in the top-section and partial reduction in the bottom section. The gaseous fuel will enter from the top of the second reactor in this schematic. The gaseous product from the first reactor will enter the middle of the second reactor at a place such that all the methane is converted to a gas mixture composing predominantly CO, $CO_2$, $H_2$, and $H_2O$. In certain embodiments, the metal oxide is represented as $FeO_bTiO_2$ exiting the first reactor and enters the second where $TiO_2$ is the inert (85 wt %), and $FeO_cTiO_2$ is the metal oxide state where the gaseous products are introduced in the second reactor. This is the phase where the metal-oxide donates oxygen and hence the governing equation is 0<c<b. The oxygen carrier exits the second reactor as $FeO_dTiO_2$ and the governing equation will be d>c as the metal-oxide will take in oxygen from the gaseous product $CO_2$ to convert it to CO and $H_2O$ to convert it to $H_2$. The difference in FIG. 7 and FIG. 8 as compared to FIG. 1 and FIG. 2 is the mode of operation is co-current instead of counter-current. This helps to contact the injected methane to react with a higher oxidation state of iron than a lower one. The catalytic effect of the iron-phase along with the oxygen donation capacity will help in lowering the residence time requirement. The syngas produced is high quality with <25% of $H_2O$ and $CO_2$ present and the $H_2/CO$ ratio can vary between 1:1 and 4:1. The $CO/CO_2$ ratio can be as high as 9, but in general is greater than 3. The operating temperature range is similar to the iso-thermal and the auto-thermal conditions presented in FIG. 1 and FIG. 2. The operating pressures can vary from 1 atm to 100 atm. The secondary metal oxide in the oxygen carrier required for satisfying the heat balance can vary from 5% to 95%.

Figure 9:
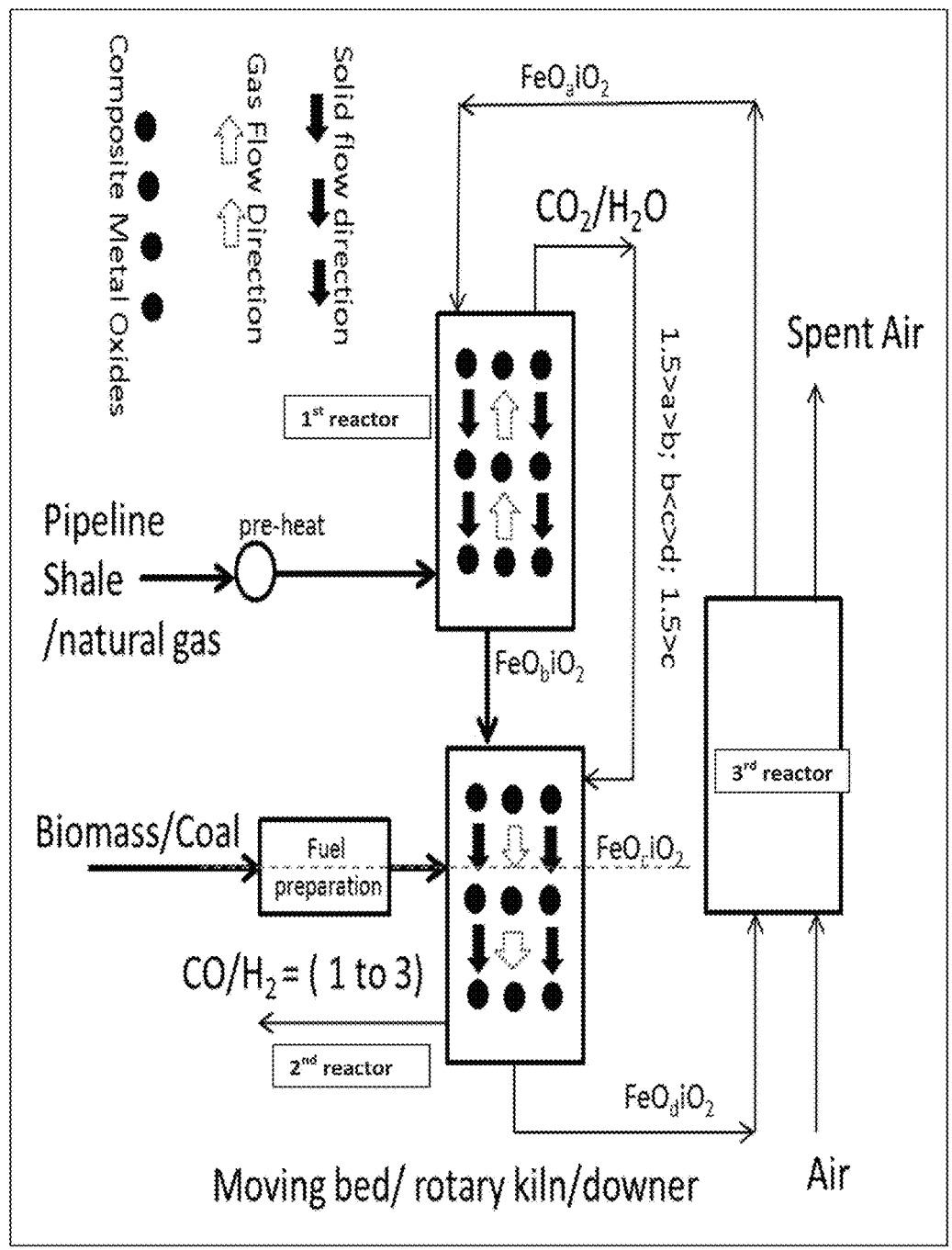
FIG. 9 illustrates syngas production in a co-current downward flow reactor producing syngas with metal-oxide oxidation state swing, according to one or more embodiments described herein.
Figure 10:
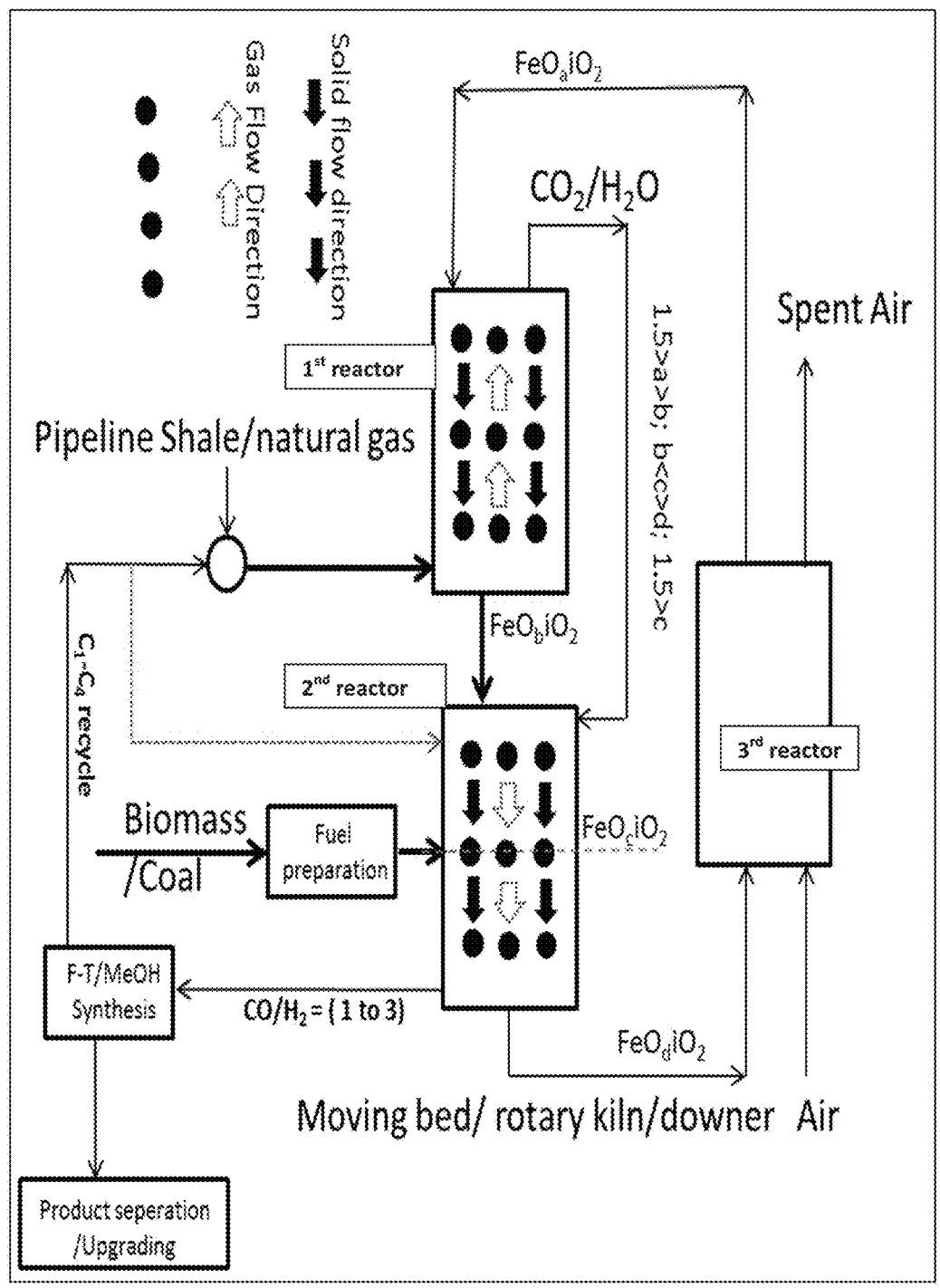
FIG. 10 shows a variation of FIG. 9 using light hydrocarbons, according to one or more embodiments described herein.

In yet another embodiment, a variation of the first and second reactors is used for producing syngas as illustrated in FIG. 9. The first reactor is used for providing enhancing gas by partial or complete oxidation of a carbonaceous source including gaseous fuels like methane, shale gas, liquid fuels like gasoline, diesel or solid fuels like coal, biomass, solid waste etc. The product gas from the first reactor is introduced to the second reactor as an enhancer gas for solid fuel gasification. In certain embodiments, a gaseous fuel such as natural gas or shale gas is also introduced to the second reactor as illustrated in FIG. 10. The product gas from first reactor is used to reform the gaseous fuel and/or partially oxidize the oxygen carrier.

From FIG. 9, the carbonaceous fuel reacts in a counter-current gas-solid contact mode with the oxygen carrier in the first reactor. The objective of the first reactor is to enable the metal-oxide to donate oxygen in a counter-current manner with the fuel. The carbonaceous fuel is converted to gaseous product which is sent to the top of the second reactor. In certain embodiments, the oxygen carrier is of the form $FeO_aTiO_2$ where the $TiO_2$ percentage is 85 wt % and the outlet metal-oxide is of the form $FeO_bTiO_2$ and the governing equation for the system is that $0.1<=b<a<=1.5$.

As illustrated in FIG. 10, the gases produced in the second reactor flow co-currently with the solid fuel and oxygen carrier gasifying the solid fuel which is introduced in the middle of the reactor. In the top half of the reactor, the metal-oxide oxygen carrier gains oxygen by converting the $CO_2$ and $H_2O$ to CO and $H_2$ respectively. In certain embodiments, the oxygen carrier entering the second reactor has the formula $FeO_bTiO_2$ and the oxygen carrier oxidation state where the solid fuel is injected is $FeO_cTiO_2$, the governing equation for this section of the reactor in terms of metal oxide is $1.33>=c>=b$. The solid fuel is injected in the middle and the syngas is extracted from the bottom of the reactor. In the lower section of the second reactor, the metal-oxide will donate oxygen to partially oxidize the solid fuel. In certain embodiments, the oxygen carrier formula at the exit of the reactor is $FeO_dTiO_2$, and the governing equation for this section of the reactor will be $0.1<=d<=c<=1.33$. The syngas generated is of high quality with the $H_2/CO$ ratio ranging from 1:1 to 4:1. The % $CO_2$ and $H_2O$ in this configuration is below 25% v/v and the $CO/CO_2$ ratio is >3 with an ideal value close to 8. The overall set of governing equations for this reactor scheme in terms of the oxygen carrier oxidation states are $1.33>=c>=b$ and $0.1<=d<=c<=1.33$. Note that the second reactor follows a swing in the oxidation state of the oxygen carrier. In the top section the oxygen carrier gains oxygen and in the bottom section the oxygen carrier loses oxygen. This oxidation state change is different from the configuration shown in FIG. 1, FIG. 2, FIG. 7 and FIG. 8 as the syngas is produced with the oxygen carrier constantly reducing in oxidation states in one direction, while the fresh fully-oxidized $Fe_2O_3$ from the top of the reducer reactor is used to fully oxidize the enhancing gas. This embodiment enables the enhancing gas to react with the oxygen-rich oxidation state of iron. In certain embodiments of FIG. 10, the solid fuel can be introduced to the second reactor from the top.

The carbonaceous fuel in the first and second reactor can be reacted with the metal oxide counter-currently or co-currently in a moving bed, a rotary kiln and/or a downer reactor design. The oxygen carrier is sent to the third reactor to react with air or an oxygen source to re-oxidize the reduced oxygen carrier to complete the redox cycle. The heat can be extracted inside the third reactor and from the spent air stream through heat-exchangers for satisfying the parasitic energy consumption. In a variation of the scheme shown in FIG. 10, the $C_1$-$C_4$ hydrocarbons from the liquid chemical complex can be used as enhancing gas for the solid fuel and/or to supplement the carbonaceous fuel source in the first reactor.

In the following two configurations, the general circulation path of the metal oxide solids does not change from prior configurations. In prior configurations, the enhancer gas, a $CO_2$ and $H_2O$ mixture, is recycled from different locations. Another possibility for the source of the enhancing gas, an oxidized carbon form and/or oxidized hydrogen form, occurs from the oxidation of at least either a carbon-containing or hydrogen-containing source, including hydrocarbons, in a gaseous, liquid, or solid form, or combination thereof. Examples include natural gas, syngas, and tail gas from the F-T reactor, waste gas, liquid fuels, coke, coal, biomass, and solid waste. The generation of enhancing gas can occur in the third reactor, a new fourth reactor, or a combination of the two. By independently generating the enhancing gas, additional electricity or high-quality heat can be produced while removing the necessity for gas cooling, compression, and re-heating that is necessary for recycling enhancing gas shown in previous configurations. Further, if oxidation of the carbon-containing and/or hydrogen-containing source occurs solely in the fourth reactor, no temperature restriction exists and the oxidation, either partially or fully, can occur at temperatures higher than the third reactor, thus allowing for electricity production or heat transfer without worry of metal oxide degradation.

Figure 11:
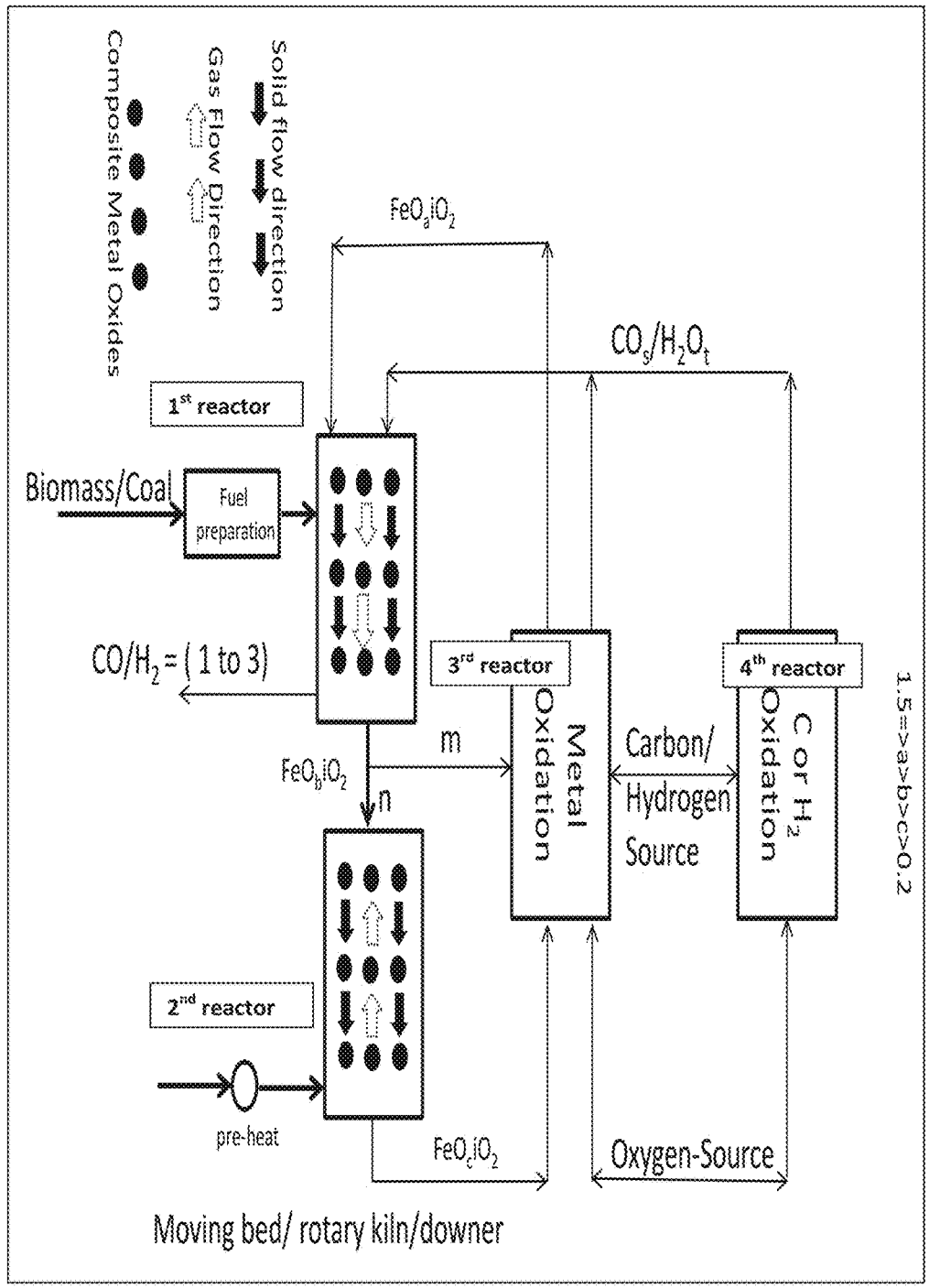
FIG. 11 illustrates a combination of partial/full oxidation to generate enhancing gas in combination with metal re-oxidation or any combination thereof, according to one or more embodiments described herein.

In FIG. 11, the reduced metal oxide, $FeO_b iO_2$, exiting the first reactor can be split into two streams with split fractions m and n where m+n=1. The split stream m enters the third reactor while split stream n continues on its normal circulation path to the second reactor. The split stream m containing $FeO_b iO_2$ mixes with $FeO_c iO_2$ exiting the second reactor and reacts with the oxygen-source to regenerate the metal oxide entering the first reactor, $FeO_a iO_2$.

In the third reactor or an entirely new reactor, a carbon-containing source, hydrogen-containing source, or combination thereof, can be oxidized, either partially or fully, to $CO_s$ and $H_2O_t$ where 0<s<2 and 0<t<2. If oxidation of the carbon-containing and/or hydrogen-containing source occurs in the third reactor, the outlet temperature of the $CO_s/H_2O_t$ mixture is dictated by the reaction temperature of the third reactor. The generation of enhancing gas in the third reactor has another added benefit over prior configurations by removing the need for a gas-solid separation device as the enhancing gas can also assist in pneumatically transporting the solids into the first reactor. If a fourth reactor is used to generate the enhancing gas, the reactor temperature has no restrictions. For example, the fourth reactor system can be a gas turbine where natural gas combustion occurs to produce electricity, $CO_2$ and $H_2O$. The electricity can be used either internally or distributed to the grid while the $CO_2$ and $H_2O$ enters the first reactor. Here, adiabatic flame temperatures are in the range of 2000 C to 3000 C, which would deactivate the metal oxide if such temperatures were used in the third reactor.

The source of oxygen is unimportant so long as the carbon-containing, hydrogen containing source or mixture thereof can be oxidized, either partially or fully, at temperatures near the operating temperature of the first reactor where minimal re-heat of the gas stream is necessary. Sources of oxygen can include ambient air, oxygen-enhanced air, or oxygen derived from an air separation unit, with the purity of oxygen necessary being dependent upon the desired $CO_2$ concentration in the first reactor system. Both air and oxygen-enhanced air have a large volume fraction of nitrogen present, thus diluting the $CO_2$ stream exiting the first reactor. From literature, guidelines for $CO_2$ purity required for sequestration are typically greater than 90% with nitrogen less than 7%. However, should the gas stream containing $CO_2$ and $H_2O$ exiting the first reactor be used for purposes other than geological sequestration such as biological fixation or re-utilization, then the $CO_2$ purity will not be as important so long as it is a concentrated source of $CO_2$ with impurities meeting the specifications required for the purpose. The oxidation of a carbon-containing, hydrogen-containing source or mixture thereof with an oxygen source in a separate vessel removes the need for the cooling, compression, and re-heating of $CO_2$ and $H_2O$ for recycle, but rather additional heat can be generated for additional electricity generation or heat transfer.

Figure 12:
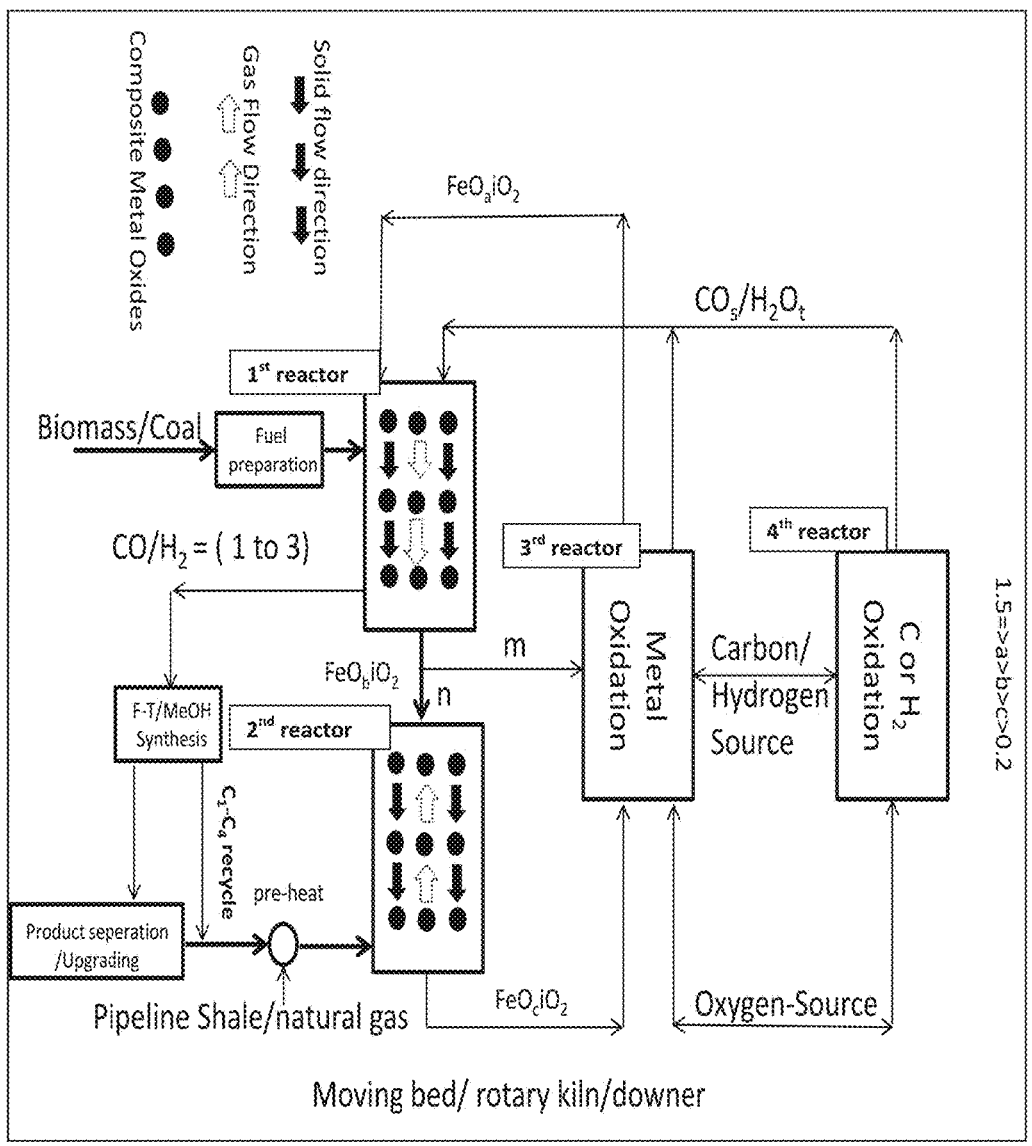
FIG. 12 shows oxidation of a carbon-containing and/or hydrogen-containing source in a fourth reactor system, a combination of partial/full oxidation to generate enhancing gas in combination with metal re-oxidation or any combination thereof with light hydrocarbon recycle from liquid fuel production facility or otherwise, according to one or more embodiments described herein.

In FIG. 12, the four main reactors are equivalent to FIG. 11. In FIG. 12, the syngas, with a $CO:H_2$ ratio between 1 and 3 is used to generate chemicals through either a Fischer-Tropsch or methanol synthesis process. A portion of the $C_1$-$C_4$ hydrocarbons are recycled into the second reactor, which reduces the overall consumption of pipeline/shale natural gas going into the second reactor as compared to the configuration shown in FIG. 11.

Figure 13:
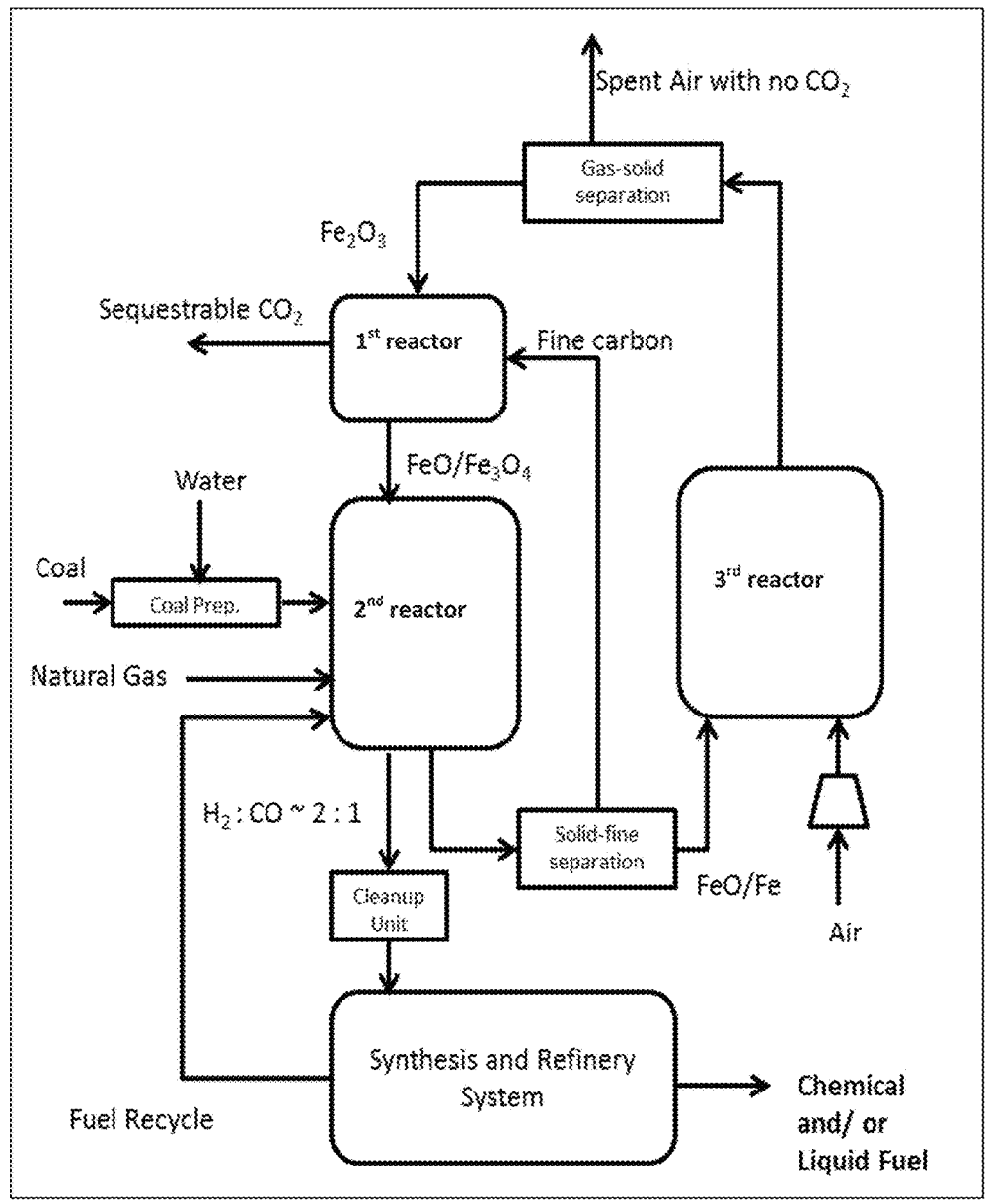
FIG. 13 illustrates a two-reactor system for high temperature separation of char, oxygen carrier particles, and abraded particle and ash fines, according to one or more embodiments described herein.

In yet another embodiment, as shown in FIG. 13, a 3-reactor system is used to convert solid and gaseous fuel to high purity $CO_2/H_2O$ and high quality syngas. In certain embodiments, the gaseous and solid fuel can be coal and natural gas. The solid and gaseous fuels are fed into the second reactor and converted to syngas. A portion of unreacted devolatilized solid fuel formed in the second reactor is discharged with the oxygen carriers from the solids outlet. This devolatilized solid fuel (e.g. char) is then separated from the oxygen carrier via a solid-fine separation device. The oxygen carrier is discharged to the third reactor from the solid-fine separation device while the devolatilized solid fuel is sent to the first reactor. In the first reactor, the devolatilized solid fuel reacts with the fully oxidized oxygen carrier discharged from the third reactor to produce a gas stream predominately consisting of $CO_2$, CO, $H_2$, and $H_2O$. The first and second reactor can operate in a co-current and counter-current gas-solid contact mode. In certain embodiments, $Fe_2O_3$ is the primary metal oxide used as the fully oxidized oxygen carrier. The iron-based oxygen carrier enter the first reactor in the oxidation state of $FeO_x$ and the outlet state of $FeO_y$ where 1.5>=x>=y>=0.75. The iron-based oxygen carrier then enter the second reactor as $FeO_y$ and exit as $FeO_z$ where y>=z>=0.01. In certain embodiments, a 3-reactor system can be reduced to a two-reactor system with char-separation and re-oxidation of the oxygen carrier as the second reactor. The oxygen carrier sent to the third reactor is re-oxidized with air and/or an oxygen-containing source. In the case of an iron-based oxygen carrier, the oxygen carrier enters the third reactor as $FeO_z$ and exits as $FeO_x$ where 1.5>=z>=y>=0. In certain embodiments, a recycled product gas stream from the first reactor is used to separate the devolatilized solid fuel from the oxygen carrier in the solid-fine separation device and convey the devolatilized solid fuel to the first reactor. The recycled product gas stream can also serve to enhance the devolatilized solid fuel gasification in this embodiment. Yet another embodiment, the product gas stream from the first reactor is also recycled to the second reactor to enhance the gasification of the solid fuel and reform the gaseous fuel introduced. The amount of devolatilized solid fuel discharged from the second reactor and transferred to the first reactor is based on the thermodynamic, kinetic, and hydrodynamic properties of the solid fuel in addition to the oxygen carrier properties and reactor contact mode used. The devolatilized solid fuel discharge amount can be adjusted to produce a flexible syngas $H_2/CO$ ratio and for additional heat for the system and/or electricity generation. This exemplary embodiment produces a sequester-ready stream of $CO_2$ without the need for additional gas-gas separation techniques resulting in operating and capital cost reductions.

Figure 14:
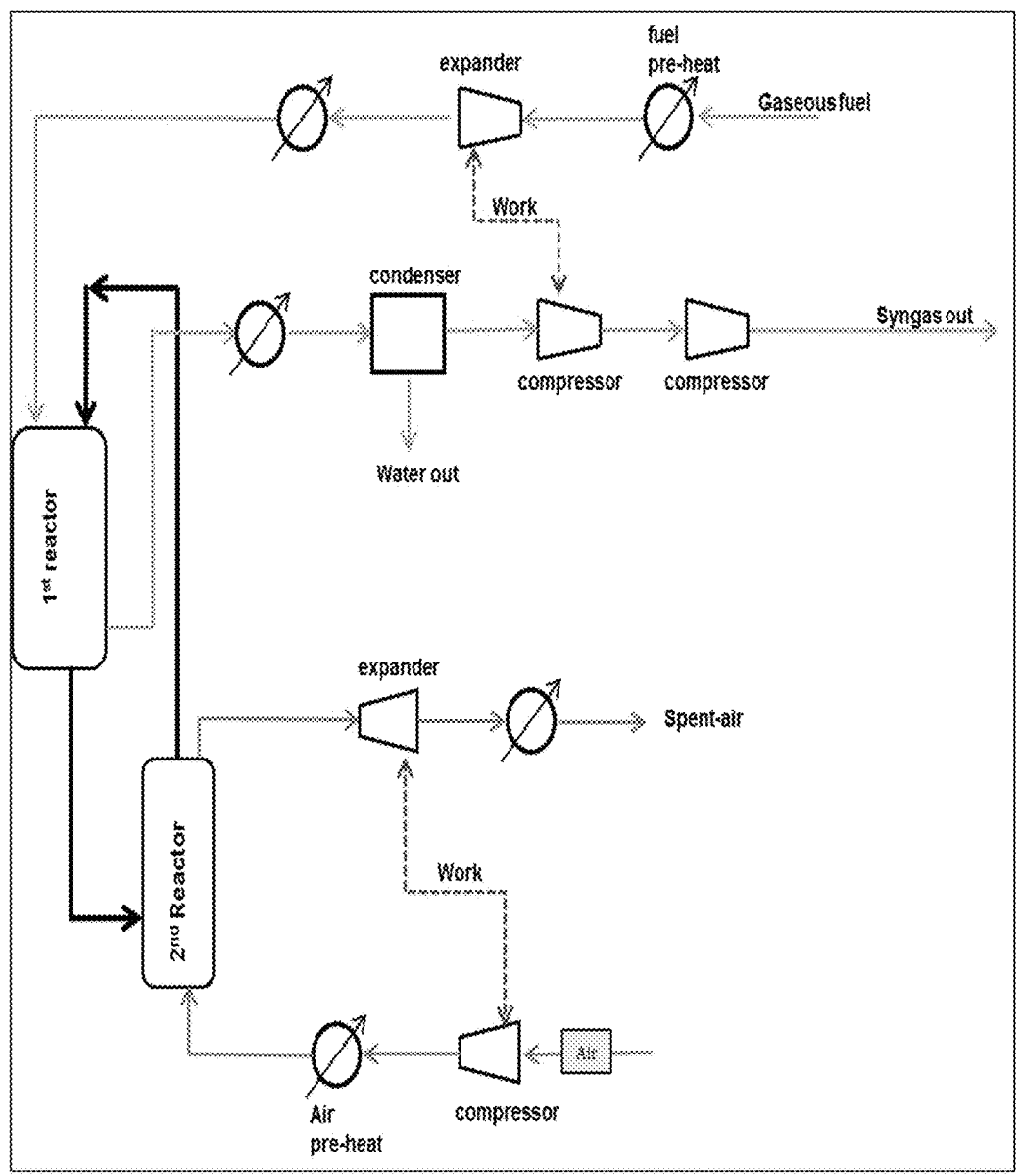
FIG. 14 illustrates a two reactor system for syngas generation with a gas compressor and expansion used on the gas stream for the second reactor, according to one or more embodiments described herein.

In yet another embodiment, a two-reactor system is used to convert gaseous fuels such as natural gas and shale gas to high quality syngas as illustrated in FIG. 14. In the first reactor, the gaseous fuel is introduced and reacted with the oxygen carrier in a co-current gas solid flow to produce high quality syngas. In the second reactor, the reduced oxygen carrier is reacted with air and/or other gaseous oxygen-containing reactants in a fluidized bed/entrained bed in a co-current or counter-current gas-solid contacting mode. The gas produced from the second reactor consists of an oxygen-depleted gas stream. The gaseous fuel is introduced to the first reactor at varying pressures ranging from ambient to as high as required for the downstream reactor system. The first and second reactors operate at the same or lower pressure than the pressure of the gaseous fuel stream. A gas compressor is used to provide high pressure oxygen-containing gas to the second reactor. An expander is also placed on the product gas stream for the second reactor to recuperate a portion or all of the energy used for compressing the gas inlet stream. A similar philosophy is used to design the expander-compressor coupling for the gaseous fuel inlet and the gaseous product outlet stream. The high-pressure gaseous fuel is subjected to a Joule-Thomson expansion in an expander after pre-heating it to a suitable temperature. The work extracted from the expander is used to compress the gaseous product by coupling the expander with a compressor. Down-stream of the expander, the gaseous fuel is heated before it is injected to the reactor system. The gaseous product has a compressor which is coupled with the expander from the inlet stream. Down-stream of this product stream, another compressor can be used to pressurize the product gas to the requisite value. This method follows an optimization pathway to reduce the operating energy requirement for a gaseous fuel to gaseous product system.

3. METAL OXIDE

The metal oxide used in the disclosed systems and methods includes a primary metal oxide, a secondary metal oxide, and optionally a tertiary metal oxide. In certain embodiments, the metal oxide composition used is $MeO_x$ (primary)—$Al_2O_3$ (secondary) or $FeO_x$ (primary)—$TiO_2$ (secondary) (where $0<x\leq1.5$) to ensure overall high (>85%) ratio of $(CO+H_2)/(CO+H_2+H_2O+CO_2)$.

The primary metal oxides can consist of Ni, Cu, Mn, Mg, Co, Zn, Mo, or any combination thereof. The primary metal-oxide can be chosen from any of $Fe_2O_3$, NiO, Cu, Mn, Mg, Zn, Mo, Co etc. The primary metal-oxide should be able to donate oxygen to the fuel mixture (e.g., the primary metal oxide must have the capacity to donate oxygen to selectively oxidize fuels to a mixture of syngas).

The secondary metal oxide can be chosen from any of the previously listed primary metal oxides or other metals such as Ti, Al, Ca, etc, that provide support and enhance reactivity to oxidation/reduction reaction with air and/or solids fuels at the operating temperatures. In certain embodiments, the secondary metal-oxide can be $TiO_2$, $Al_2O_3$, Co, Cu, Mg, Mn, Zn, or a combination thereof. The secondary metal-oxide can serve to strengthen the primary metal-oxide and can enhance reactivity.

A tertiary component like Ag, Au, Ca etc may be added to impart catalytic effect to the oxygen carrier. In some embodiments, the tertiary metal oxides like Pt, Mo, Ag, Au, and Zn serve to catalyze the tar decomposition and char gasification reaction for solids fuels. It can also serve to catalyze gaseous fuel decomposition reaction for methane and higher hydrocarbons.

The oxygen-carrier metal-oxide may contain a combination of primary, secondary and tertiary metal-oxides in varying weight percentages. The metal oxide can have varying percentages of the primary metal oxide ranging from greater than 0 to 100 wt %, and the secondary metal oxide compositions can vary from 0 to 100 wt % as well. In addition to the primary and the secondary metal oxide, a tertiary metal oxide can be added in varying percentages up to less than 100 wt % as a promoter to enhance the reactivity of the primary metal oxide.

The metal oxide particles can vary in size from 250 microns to 5000 microns, with a density varying between 500 kg/m³ to 3000 kg/m³ depending on the method of synthesis. The method of synthesis can vary from dry mixing and pelletizing via dry or wet mixing methods. Other techniques can include extrusion, co-precipitation, wet or dry impregnation, spray drying and/or sintering after mechanical compression. Techniques like sintering the synthesized metal-oxide or adding a binder with sol-gel combustion can be used to increase the strength of the metal-oxide.

In certain embodiments, the metal oxide has a primary component as iron-oxide and a secondary component as $Al_2O_3$. In certain embodiments, the metal oxide has a primary component as iron-oxide and secondary component as $TiO_2$.

4. FEEDSTOCK

In general, the feedstock used in the disclosed systems and methods can be classified into two separate categories: (1) solids fuels and (2) gaseous fuels. Each embodiment described below includes gaseous and the solid fuels used in conjunction. The solid fuel can include coal (anthracite, lignite, bituminous and subbituminous type), biomass, pet-coke, and/or solid hydrocarbon-based waste products including municipal solid waste. The gaseous fuels can include natural gas, gasified coal (syngas), and/or the light hydrocarbon off-gas stream. The light hydrocarbon stream can be a combination produced from various units of the refinery operation including but not limited to hydrocracking, hydrogenation, isomerization, etc. In cases where waste naptha and residual oil (which are essentially liquid fuels) are present, they can be used in conjunction with or replace either solid or gaseous fuels. The overall reaction efficiency can be increased by (1) pre-treating the solid fuels by de-moisturizing; and (2) pre-heating the gaseous and liquid fuels as close to the reaction temperature as possible. The solid fuel can be pretreated to ensure that the distribution of the fuel is uniform in the reactor to simulate the proper reaction method and the desired solids profile. The gaseous and/or liquid fuels can be pre-heated as close to the reaction temperature as feasibly possible.

In certain embodiments, the feedstock for this application can be any solid fuel like coal, pet-coke, biomass etc. The co-injection of a higher intrinsic $H_2$ content fuel like methane, flare gas etc. may be used in some variations. The solid fuel can be pre-treated and the injection mode designed to ensure uniform distribution of fuel through the radial reactor direction. It is generally expected that the overall reaction efficiency will increase with increasing the pre-heat temperature of the fuel to a value near or above the reactor operating condition.

The present invention has multiple aspects, illustrated by the following non-limiting examples.

5. EXAMPLES

Examples 1-8 refer to the exemplary embodiment of the two-reactor system with a gas compressor and expander for significant increase in process efficiency. The example studies performed herein provide a detailed analysis of the expected efficiency gain from this disclosed exemplary embodiment.

This method can be flexibly applied to a combination of high-pressure gaseous fuel and a high temperature reactor system for the concept of chemical looping or otherwise. The system uses a synergy between a compressor-expander device to recover a portion of the energy expended in compressing the gaseous fuel or utility.

Syngas production systems play a role in the overall cost of a Fischer-Tropsch plant configuration for liquid fuel production from natural gas. Typical syngas production systems include steam-methane reforming, auto-thermal oxidation and partial direct oxidation of the gaseous fuel. In reference to the various configurations disclosed above and this analysis comprehensively investigates the operating power requirements for running the chemical looping syngas production system in an auto-thermal operation mode. As an example, the syngas produced needs a pressure and temperature equivalent to the downstream reactor system; out of the syngas production system. This particular analysis explores applications and benefits of the method disclosed.

Establishing a baseline for partial oxidation energy requirements: The partial direct oxidation system uses an Air Separation Unit (ASU) to supply 99% pure oxygen for partially oxidizing the methane in a combustion chamber. The combustion chamber is operated around 1400 C. The inlet pressure for the oxygen as an example is expected to be around 30 atmospheres which gives a baseline for comparing the chemical looping case against.

The reaction chemistry targeted in direct partial oxidation is shown in Reaction 1:

$$CH_4 + 0.5O_2 \rightarrow CO + 2H_2 \quad (1)$$

This reaction is slightly exothermic. Reaction 1 shows the stoichiometric ratio of $O_2/CH_4$ to be 0.5. The actual ratios used can vary from 0.73 to 3.0 depending on the combustion chamber design and methane conversions targeted. For this analysis a conservative number of 0.73 is used. The air separation unit is typically designed for two purities: 95% pure $O_2$ and 99% pure $O_2$. The energy consumption for the $O_2$ produced from an ASU can be found in a variety of literature sources between 160 to 250 kWh/met tonne $O_2$ (95 and 99% purity). The power consumption for a 99% pure stream of $O_2$ pressurized to 30 atm is 378.34 kWh/met tonne $O_2$. If 1 kmol/hr of $CH_4$ is selected as the basis flow for analysis, the amount of $O_2$ will be 0.73 kmol/hr. The operating power can be calculated as 9.08 kWe, assuming the heating value of $CH_4$ to be 52582 kJ/kg. This value when translated on a per unit fuel input basis becomes 3.815% $kWe/(kW_{th} CH_4)$ processed. The comparison of the chemical looping cases operating energy consumption is computed with this number as the baseline.

Example 1

Chemical Looping Reactor Operated at 1 atm ("Case 1")

Figure 15:
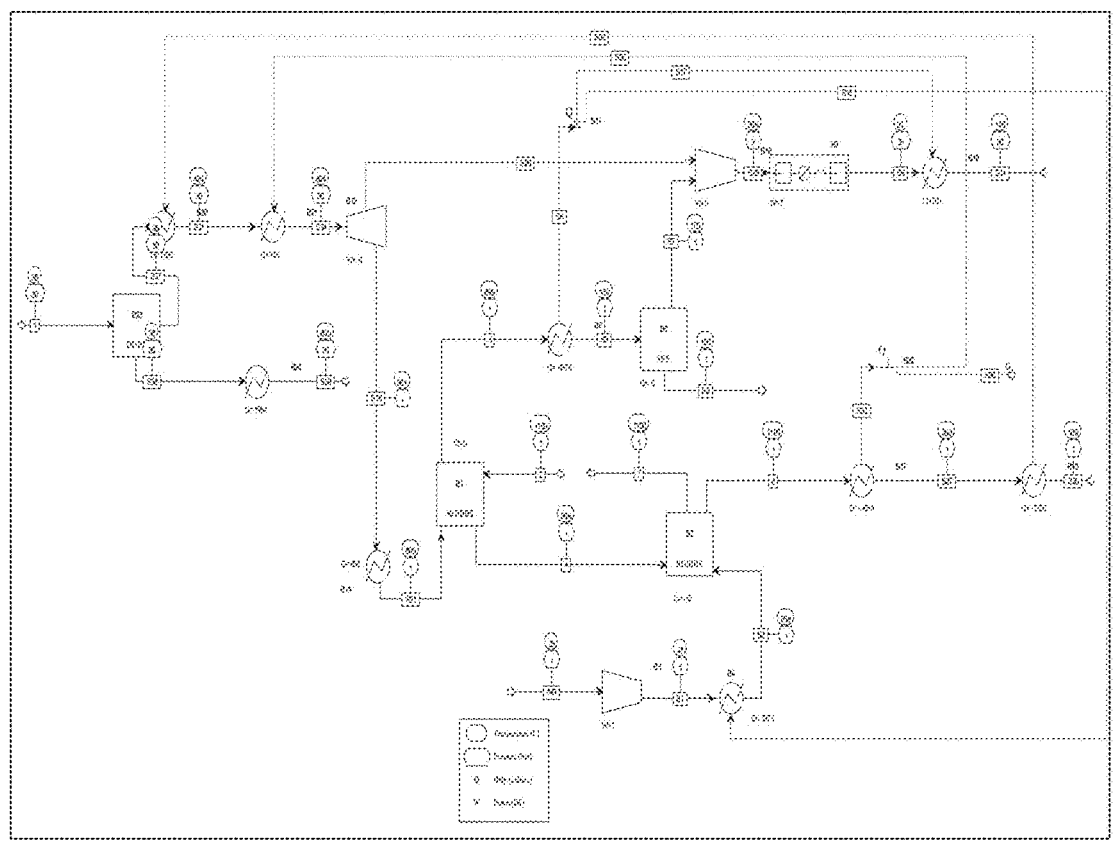
FIG. 15 shows a schematic of a chemical looping reactor scheme operated at 1 atm, heat integration Scheme 1
Figure 16:
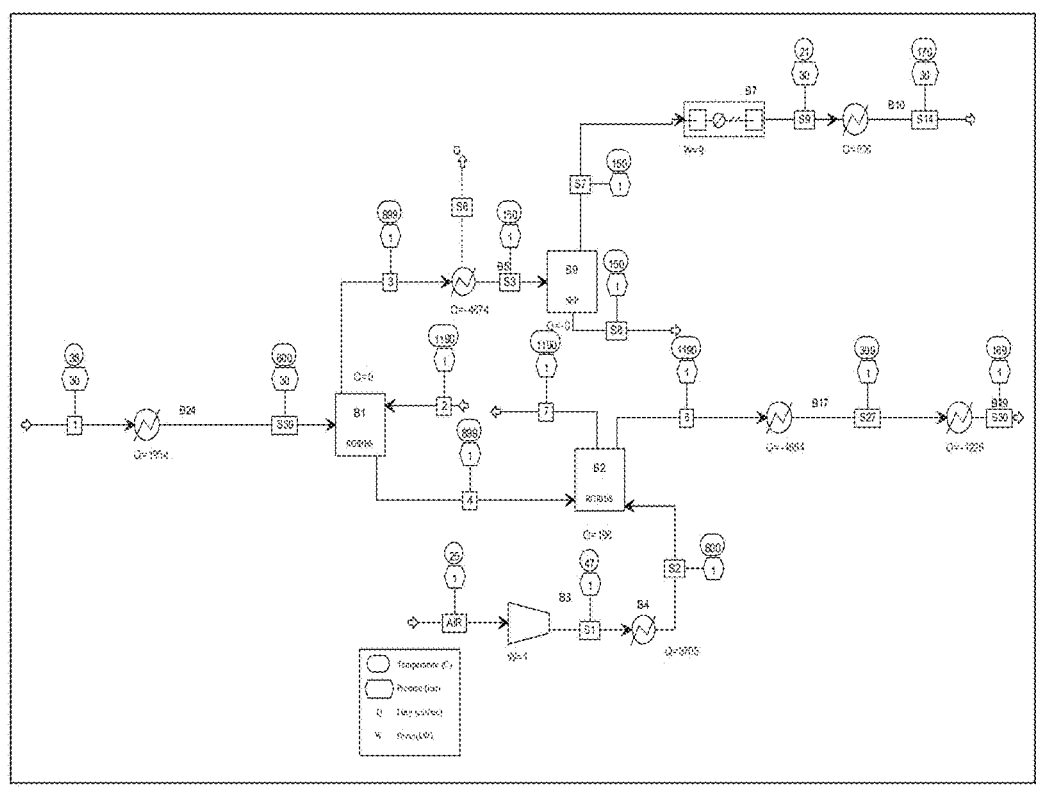
FIG. 16 shows a schematic of a chemical looping reactor scheme operated at 1 atm, heat integration Scheme 2.

The chemical looping cases are analyzed assuming the outlet pressure of syngas produced is 30 atm. The inlet pressure of methane is taken to be 30 atm. The overall analysis indicates that the operating power requirement is a function of the operating pressure of the chemical looping system. The analysis starts from a basic set-up analysis of the chemical looping scheme being operated at 1 atm, in two modes of heat-integration as shown in FIGS. 15 and 16. For the chemical looping case with heat-integration scheme 1, the methane is expanded to a pressure of 1.2 atm in an expander which recovers work. This expansion is coupled with a compressor on the syngas outlet stream from the reducer. The compressor compresses the syngas produced at near atmospheric conditions from the reducer reactor. The basis of analysis is 1 kmol/hr $CH_4$. The reactor modeling is optimized as per the earlier discussion to produce the syngas in accordance with performance results for an auto-thermal operation and an optimal % of secondary metal support. The air flow is set at 15% excess of the stoichiometric requirement for full re-oxidation of metal oxide. An air-compressor is used to compress the air to overcome the pressure drop in the combustor and for transporting the solids to the reducer reactor. The reducer reactor inlet temperature is set at 1190 C. The product gases for the reducer and the combustor reactor are assumed to be exiting at 1190 C. The methane inlet temperature is 600 C. The methane stream loses heat in the expander, and is heated again to 600 C. The air-pre-heat temperature is also set to 600 C. The heat-extraction takes place from the air-outlet and the syngas streams to satisfy the heating requirement and produce work to off-set the compressor power requirements. The syngas compressor for Case 1, heat integration scheme 1 compresses the syngas to 30 atm using a pressure ratio of 1.6. The compression efficiencies used are 0.86 for the polytropic efficiency and 0.98 for the mechanical efficiency. The cooling water temperature for each stage is set at 69 F. The compression method used for modeling the power requirements is polytropic using ASME method. The heat-extraction specification after heat-integration is specified in Table 1 below.

TABLE 1

Available heat for Case 1, heat integration Scheme 1, FIG. 15
Available heat

| Unit | Description | Q (cal/sec) | $T_{in}$ (C.) | $T_{out}$ (C.) | P (bar) |
|---|---|---|---|---|---|
| B17(S36) | Spent Air stream | 3972 | 1190 | 398 | 1 |
| B2 | Combustor (heat extrn) | 69 | 1190 | 1190 | 1 |

The parasitic energy consumption is shown in Table 2 below.

TABLE 2

Parasitic energy consumption for Case 1, FIG. 15
Parasitic operating energy consumption

| Unit | Description | Energy | | % kWe/kWth |
|------|-------------|--------|--|------------|
| B7   | Syngas compressor | 6.96 | $kW_e$ | 2.98 |
| B3   | Air compressor    | 0.13 | $kW_e$ | 0.056 |

The last column in Table 2 converts and compares the operating energy requirement from 1 kmol/hr $CH_4$ to % $kWe/(kW_{th}\ CH_4$ basis).

Example 2

Chemical Looping Reactor Operated at 1 atm, FIG. 16 ("Case 2")

This case analyzes the chemical looping at 1 atm case without the expander-compressor coupling from Case 1. The schematic for the case is shown in FIG. 16. This case assumes that the $CH_4$ is pre-heated to 600 C. The air outlet is used to extract heat in two stages: a primary pass reducing the temperature to 400 C and a secondary pass further reducing the stream temperature to 170 C. The syngas compressor pressurizes the syngas to 30 atm using similar assumptions to those stated in Case 1. The overall heat extracted is summarized in Table 3.

TABLE 3

Available heat for Case 2, Heat integration Scheme 2, FIG. 15
Heat extraction source

| B5  | Syngas outlet heat extrn | −4674 | 899  | 150 | 1 |
| B17 | Spent air heat extraction | −4696 | 1190 | 399 | 1 |
| B19 | Spent air ht extrn secondary | −1238 | 399 | 169 | 1 |

The total operating energy requirement is given in Table 4.

TABLE 4

Parasitic energy consumption for Case 2, heat integration scheme 2.
Parasitic operating energy consumption

| Unit | Description | Energy | % kWe/kWth |
|------|-------------|--------|------------|
| B7 (8 stages) | Syngas compressor | 8.97 | 3.83 |
| B3 | Air compressor | 0.58 | 0.05 |

The last column gives a % $kWe/(kW_{th}\ CH_4$ input) value. If we compare the values in Table 2 and Table 4 we can see that the heat-integration Scheme 1 gives a lower operating cost which outweighs the energy lost in heating up the methane gas before the expander unit. Hence, for the cases at higher pressure the compressor-expander coupling unit is added wherever feasible. The unit is used to couple the methane inlet stream with the syngas outlet stream. The unit is also used to couple the air-inlet stream with the air-outlet stream to effectively utilize the energy and reduce the operating power requirements.

Example 3

Figure 17:
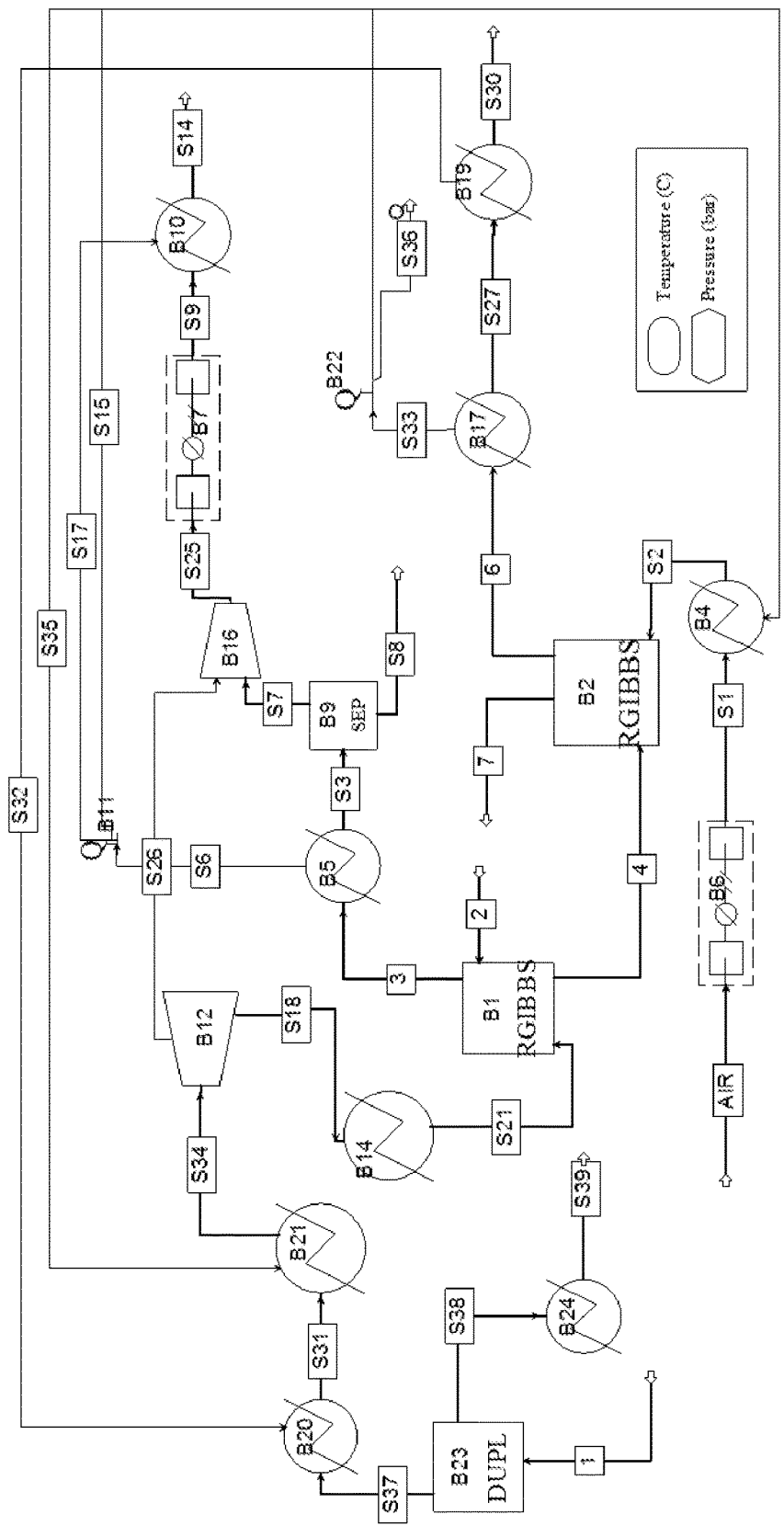
FIG. 17 shows an overall schematic representative of Case 3 to Case 6 (5 to 25 atm), heat integration Scheme 2.
Figure 18:
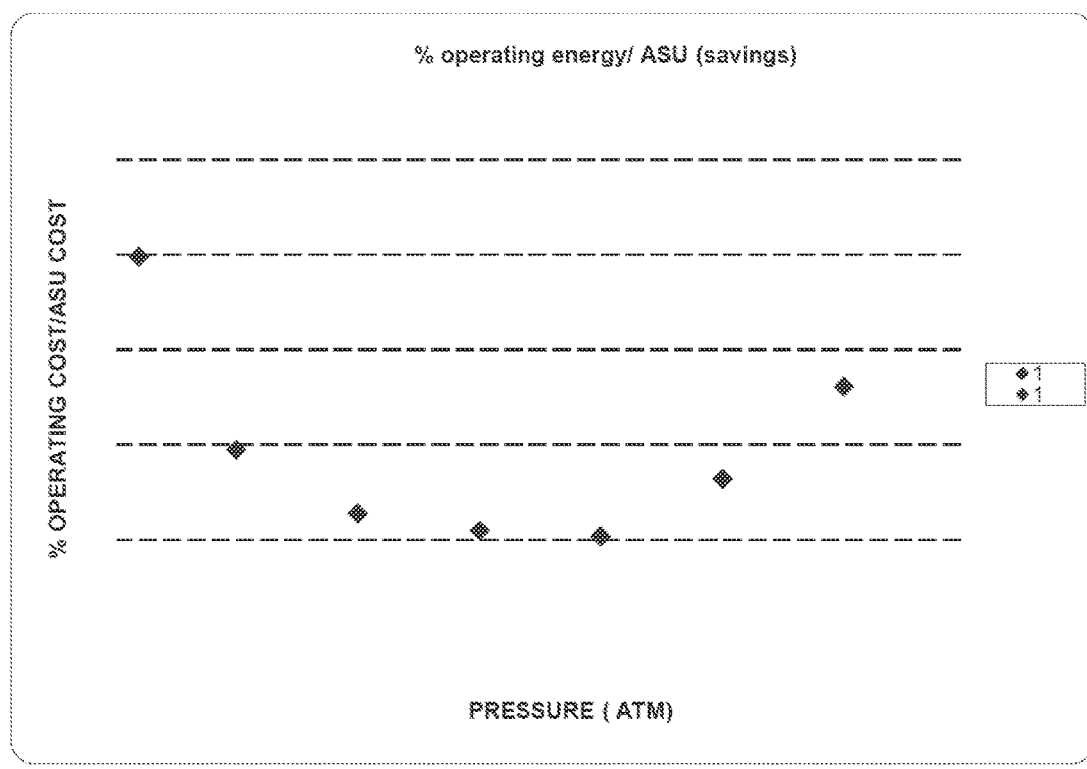
FIG. 18 shows the overall % operating cost for specific case over the ASU operating cost for same methane input baseline.

Chemical Looping Reactor Operated at 5 atm, FIG. 17 ("Case 3")

The schematic for this case is shown in FIG. 17. The general schematic for this case is similar in terms of the number of units used to analyze higher pressure cases (Case 4 to Case 7). The methane inlet condition for this example is 30 atm. This stream is heated to 600 C, before being subjected to a Joule-Thomson expansion to reduce the general stream pressure to a value slightly above the system operating pressure. This expander is coupled with a compressor to save on the overall syngas compression cost. The methane inlet stream is heated to 600 C as it loses temperature after the expander. The syngas produced is compressed using the compressor coupled with the expander. This is followed by a syngas compressor which compresses the syngas to 30 atm. The specifications for this compressor are the same as those specified for Case 1. The air inlet stream is initially compressed by a compressor which is coupled to an expander downstream of the combustor reactor. This leads to two scenarios where the expander supplies enough power to compress the inlet air beyond the combustor operating pressure. In an alternative scenario, the pressure of the air-stream at the outlet of the coupled compressor is lower than the combustor operating pressure. In this case an additional syngas compressor is used to compress the air to a pressure higher than the combustor operating pressure. The assumptions on this compressor are similar to those in Case 1 analysis. The compression typically increases the temperature of the gas-stream. The air-stream is pre-heated to 600 C. If the compressor outlet temperature is lower than 600 C, a heat-exchanger is added to heat the air stream to 600 C. The air outlet stream goes through an expander and then through two heat-extraction passes. The primary pass cools down the stream to 400 C and the secondary pass cools down the stream to 170 C. The expander decompresses the gas to a pressure value slightly higher than 1 atm (~1.2 atm). The syngas outlet stream also passes through two passes with similar specifications to the air outlet stream and passes through a condenser stream before the coupling compressor and the syngas compressor.

A break-down of the available heat for the Case 3 is given in Table 5.

TABLE 5

Available heat for Case 3, 5 atm, FIG. 17
Available heat

| Unit | Description | Q (cal/sec) | $T_{in}$ (C.) | $T_{out}$ (C.) | P (bar) |
|------|-------------|-------------|---------------|----------------|---------|
| B17 (S36) | Spent air stream | 2567 | 1190 | 398 | 5 |
| B2 | Combustor (heat extrn) | 875 | 1190 | 1190 | 5 |

Table 6 shows the operating energy consumption for Case 3.

TABLE 6

Parasitic energy consumption for Case 3, heat integration scheme 2.
Parasitic operating energy consumption

| Unit | Description | | | % $kW_e$/kWth |
|------|-------------|--|--|---------------|
| B7 | Syngas compressor | 3.46 | kWe | 1.480573 |
| B3 | Air compressor | 0 | kWe | 0 |

The expander-compressor coupling for the air compressor is sufficient to offset the amount of energy required to compress the air inlet stream slightly above 5 atm. The compression cost is reduced by 55% over the Case 2 scenario. As compared to the ASU case the cost is around 60% lower on the same basis.

Example 4

Chemical Looping Reactor Operated at 10 atm, FIG. 17 ("Case 4")

This case uses the same schematic set-up described in Case 3. The expander for syngas stream has a discharge pressure of 10.2 atm and the air compressor outlet pressure is desired to be >10 atm. The advantage of this scheme is that the syngas compressor requirements will go down as the syngas is produced at a pressure of 10 atm. The available heat for this case is shown in Table 7 below.

TABLE 7

Available heat for Case 4, 10 atm, heat integration Scheme 2, FIG. 3
Available heat

| Unit | Description | Q (cal/sec) | $T_{in}$ (C.) | $T_{out}$ (C.) | P (bar) |
|---|---|---|---|---|---|
| B17 (S36) | Spent air stream | −1901 | 1190 | 398 | 10 |
| B2 | Combustor (heat extrn) | −1986 | 1190 | 1190 | 10 |

Table 8 shows the operating energy consumption.

TABLE 8

Parasitic energy consumption for Case 4
Parasitic operating energy consumption

| Unit | Description | | | % kW$_e$/kWth |
|---|---|---|---|---|
| B7 | Syngas compressor | 2.27 | kWe | 0.972 |
| B3 | Air compressor | 0 | kWe | 0 |

For this case the coupling is sufficient to offset the energy requirements for the air-compressor and the syngas compressor power requirement goes down by 35% over the 5 atm case.

Example 5

Chemical Looping Reactor Operated at 15 atm and FIG. 17 ("Case 5")

The syngas compressor requirement goes down further as the base pressure after coupling is higher than 15 atm. This case shows a higher air compressor energy demand than the Case 4. The coupling is not sufficient to increase the pressure of the air to greater than 10 atm. An additional single stage air-compressor is used to compress the air to greater than 10 atm. The available heat for Case 5 is shown in Table 9.

TABLE 9

Available heat for Case 5, 15 atm, FIG. 16
Available heat

| Unit | Description | Q (cal/sec) | $T_{in}$ (C.) | $T_{out}$ (C.) | P (bar) |
|---|---|---|---|---|---|
| B17 (S36) | Spent air stream | −1564 | 1190 | 398 | 15 |
| B2 | Combustor (heat extrn) | −3378 | 1190 | 1190 | 15 |
| CO$_2$ stream heat | Syngas (heat extraction) | −1224 | 951 | 150 | 15 |

The parasitic energy consumption for Case 5 is shown in Table 10 below.

TABLE 10

Parasitic energy consumption for Case 5
Parasitic operating energy consumption

| Unit | Description | | | % kW$_e$/kWth |
|---|---|---|---|---|
| B7 | Syngas compressor | 1.57 | kWe | 0.671821 |
| B3 | Air compressor | 0.38 | kWe | 0.162606 |

As compared to Case 4 the syngas compressor power consumption by itself goes down by 30%. The net including air compressor reduces the cost by 15%.

Example 6

Chemical Looping Reactor Operated at 20 atm, FIG. 17 ("Case 6")

This investigation analyzes the case when the chemical looping reactors are operated at a pressure of 20 atm. In this analysis the air compressor parasitic energy requirement is expected to be higher than that in Case 5. The corresponding value of the syngas compressor energy requirement is supposed to go lower. The schematic is similar to the one used in FIG. 17. The available heat and the parasitic energy requirements are shown in Table 11 and Table 12.

TABLE 11

Available heat for Case 6, 20 atm, FIG. 17
Available heat

| Unit | Description | Q (cal/sec) | $T_{in}$ (C.) | $T_{out}$ (C.) | P (bar) |
|---|---|---|---|---|---|
| B17 (S36) | Spent air stream | −1347 | 1190 | 398 | 20 |
| B2 | Combustor (heat extrn) | −4221 | 1190 | 1190 | 20 |
| CO$_2$ stream heat | Syngas (heat extraction) | −1224 | 951 | 150 | 20 |

TABLE 12

Parasitic energy consumption for Case 6
Parasitic operating energy consumption

| Unit | Description | | | % kW$_e$/kWth |
|---|---|---|---|---|
| B7 | Syngas compressor | 0.78 | kWe | 0.34 |
| B3 | Air compressor | 1.07 | kWe | 0.46 |

In case 6 at 20 atm, the syngas compressor requirement is 50% lower than the case 5. This is expected as a higher starting point is given in terms of pressure for the syngas compressor. The air power requirement is 20% higher than case 4. The overall efficiency is around 5% reducing in the compression energy requirement over case 5.

Example 7

Chemical Looping Reactor Operated at 25 atm, FIG. 17 ("Case 7")

This case is expected to further reduce the syngas compression cost, but the air compression cost increases. Operating the chemical looping reactors at 25 atm shows the case where the air compression cost increase outweighs the decrease in syngas compression cost. The available heat and the parasitic energy consumption are shown in Table 13 and Table 14.

TABLE 13

Available heat for Case 7, 25 atm, FIG. 17
Available heat

| Unit | Description | Q (cal/sec) | $T_{in}$ (C.) | $T_{out}$ (C.) | P (bar) |
|---|---|---|---|---|---|
| B17 (S36) | Spent air stream | −1189 | 1190 | 398 | 25 |
| B2 | Combustor (heat extrn) | −4221 | 1190 | 1190 | 25 |
| $CO_2$ stream heat | Syngas (heat extraction) | −4999 | 951 | 150 | 25 |

TABLE 14

Parasitic energy consumption for Case 7
Parasitic operating energy consumption

| Unit | Description | | | % $kW_e$/kWth |
|---|---|---|---|---|
| B7 | Syngas compressor | 0.77 | kWe | 0.328 |
| B3 | Air compressor | 2.14 | kWe | 0.91573 |

The overall net compression energy requirement goes up by 50% over that required in case 6. The syngas compression cost decreases minimally, while the air compression cost increases by around 50% value.

Example 8

Chemical Looping Reactor Operated at 30 atm ("Case 8")

This case investigates the operating cost at a pressure of 30 atm. As the chemical looping reactors are operated at 30 atm, the syngas compression cost goes down to zero. The air compression cost however will outweigh this decrease despite the coupling effect with a high temperature spent-air stream. The available heat and the parasitic energy consumption are shown in Table 15 and 16.

TABLE 15

Available heat for Case 8, 30 atm
Available heat

| Unit | Description | Q (cal/sec) | $T_{in}$ (C.) | $T_{out}$ (C.) | P (bar) |
|---|---|---|---|---|---|
| B17 (S36) | Spent air stream | −1167 | 1190 | 398 | 30 |
| B2 | Combustor (heat extrn) | −2389 | 1190 | 1190 | 30 |

TABLE 16

Parasitic energy consumption for Case 8, Heat integration scheme 2
Parasitic operating energy consumption

| Unit | Description | | | % $kW_e$/kWth |
|---|---|---|---|---|
| B7 | Syngas compressor | 4.65 | kWe | 1.989787185 |
| B3 | Air compressor | 0 | kWe | 0 |

As compared to an ASU this energy requirement is still around 48% lower. The air compressor follows similar specifications to those defined in Case 1 and Case 2, with a polytropic efficiency of 0.86 and a mechanical efficiency of 0.98.

Discussion Overall analysis: The pressure sensitivity in terms of operating cost is shown in Table 17.

TABLE 17

An overall analysis for the example cases is shown where the disclosed optimization method is applied

| | Pressure (atm) | Syngas comp (kWe) | Air comp (kWe) | Total (kWe) | % kWe/ kWth | Savings (% over baseline case) |
|---|---|---|---|---|---|---|
| Case 1 | 1 | 6.96 | 0.13 | 7.09 | 3.033 | 79.62967 |
| Case 2 | 1 | 9.3 | 0.13 | 9.43 | 4.03520283 | 105.9108 |
| Case 3 | 5 | 3.46 | 0 | 3.46 | 1.48057283 | 38.86018 |
| Case 4 | 10 | 2.27 | 0 | 2.27 | 0.971358475 | 25.49497 |
| Case 5 | 15 | 1.57 | 0.38 | 1.95 | 0.834426884 | 21.90097 |
| Case 6 | 20 | 0.78 | 1.07 | 1.85 | 0.791635762 | 20.77784 |
| Case 7 | 25 | 0.78 | 2.14 | 2.92 | 1.24950077 | 32.7953 |
| Case 8 | 30 | 0 | 4.65 | 4.65 | 1.989787185 | 52.22539 |
| Case 0 | ASU-30 atm | 9.08 | 0 | 9.08 | 3.81 | |

The energy percentage in the last column is an energy consumption ratio of energy consumed for case to ASU, and is computed as a % of the overall % kWe/kWth for each case as compared to the ASU case. As we go in blocks of 5 atm from 1 atm to 30 atm, the overall percentage goes through a minima in-between 15-20 atm. The overall analysis is a method of analysis which can be applied to a combination of fuels and corresponding pressurized products. The optima are obtained by a consideration of the expander-compressor coupling and the overall heat-integration schematic.

Example 9

Specific Operating Condition

Figure 19:
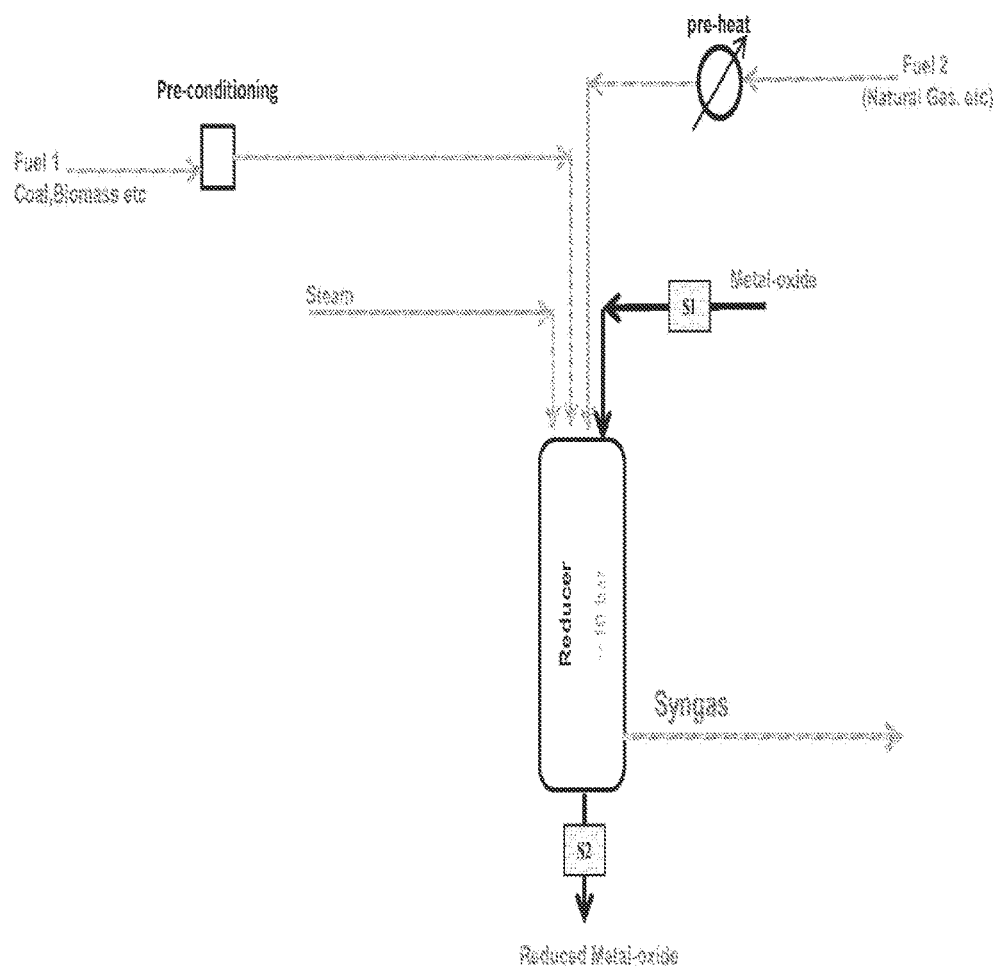
FIG. 19 shows the basic reactor system set-up analyzed and used in the disclosure for reducer reactor for various configurations described.
Figure 20A:
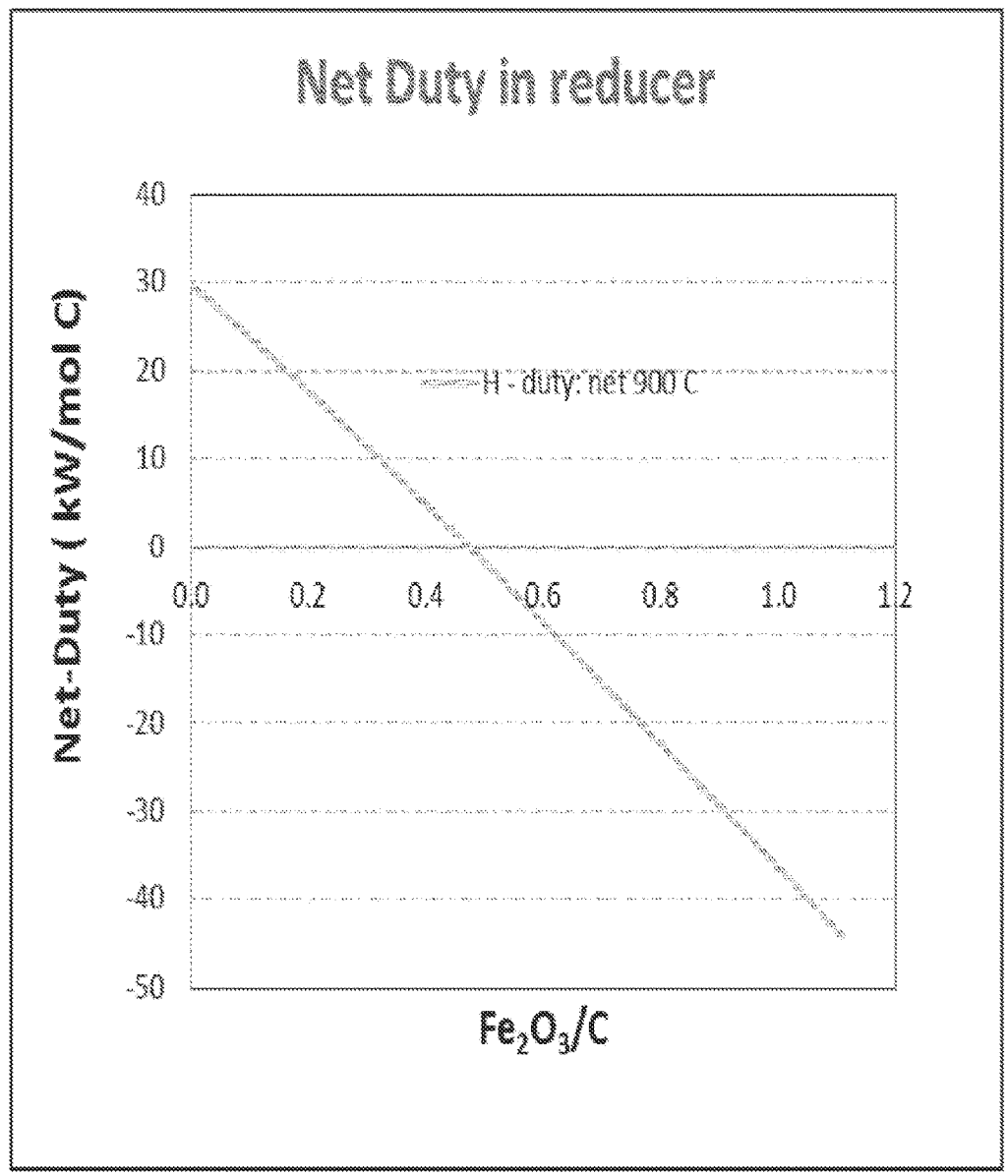
FIG. 20a illustrates the variation in net-duty (kW/mol C) as a function of $Fe_2O_3/C$ ratio variation for a 50% HHV input of methane and PRB coal at an iso-thermal temperature of 900 C for the reducer reactor.
Figure 20B:
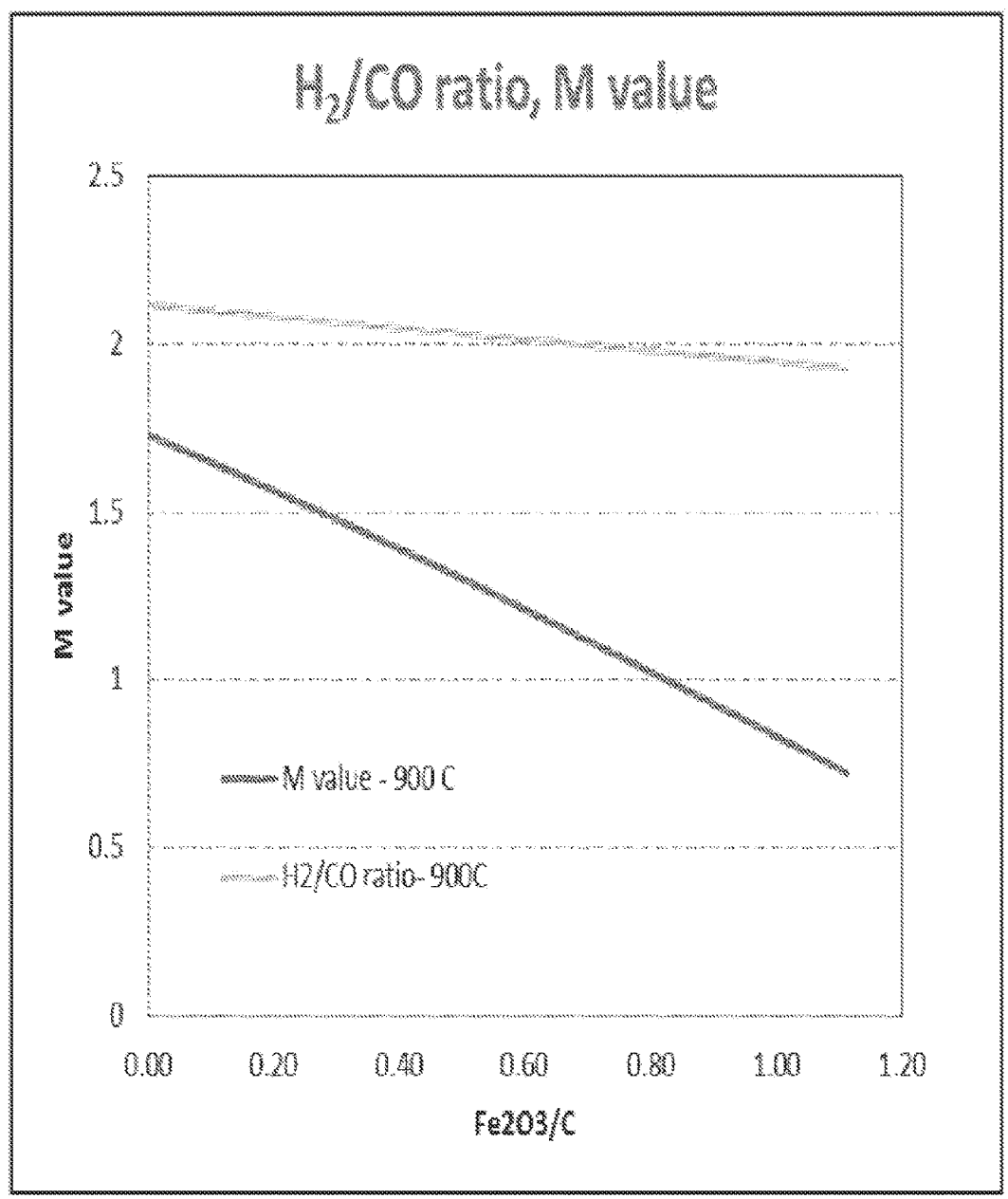
FIG. 20b illustrates the variation in the $H_2/CO$ ratio and M value as a function of $Fe_2O_3/C$ ratio variation for a 50% HHV input of methane and PRB coal and an iso-thermal temperature of 900 C for the reducer reactor.
Figure 21A:
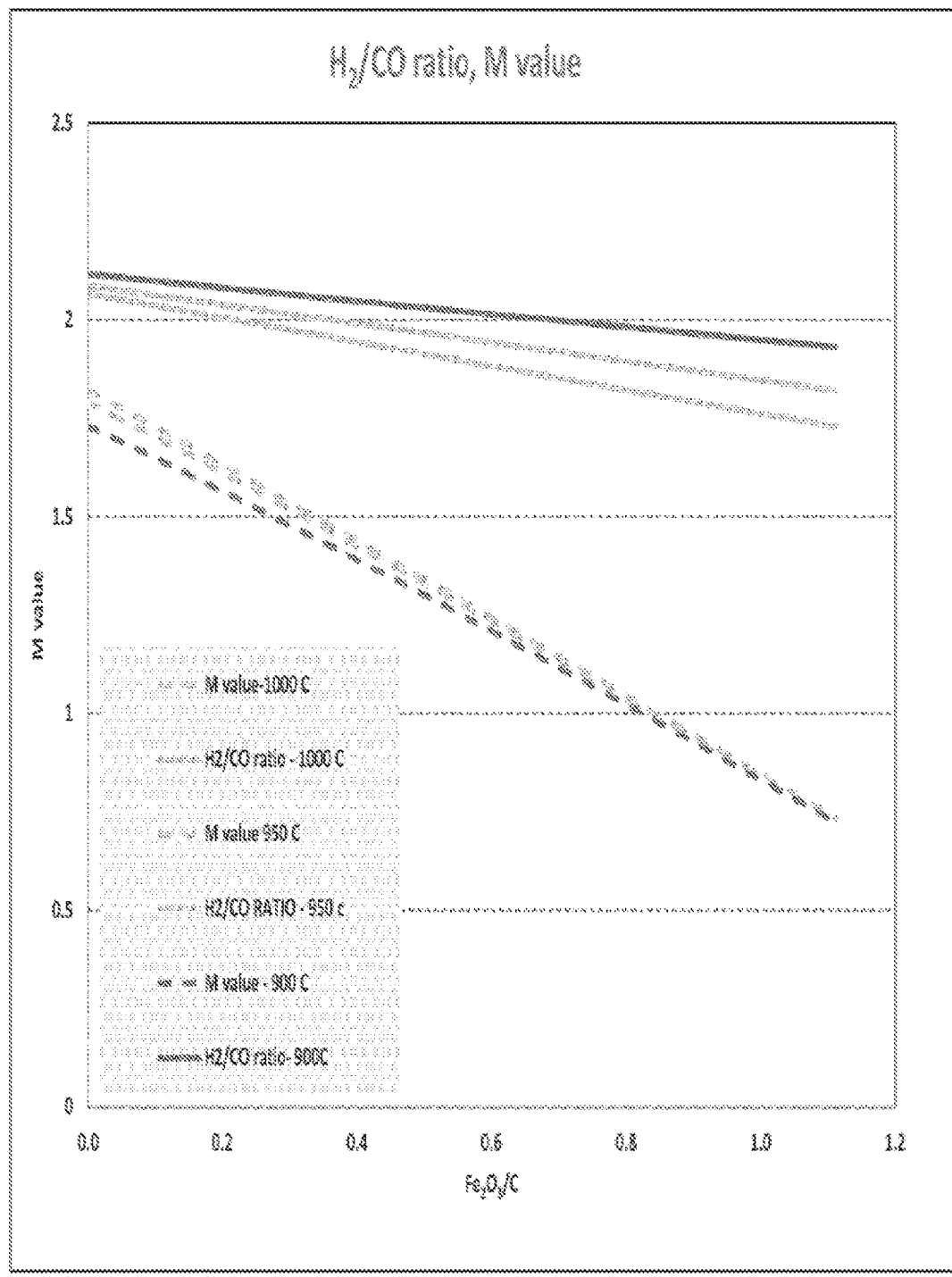
FIG. 21a illustrates the variation in the $H_2/CO$ ratio and M value as a function of $Fe_2O_3/C$ ratio variation for a 50% HHV input of methane and PRB coal and varying temperatures for the reducer reactor.
Figure 21B:
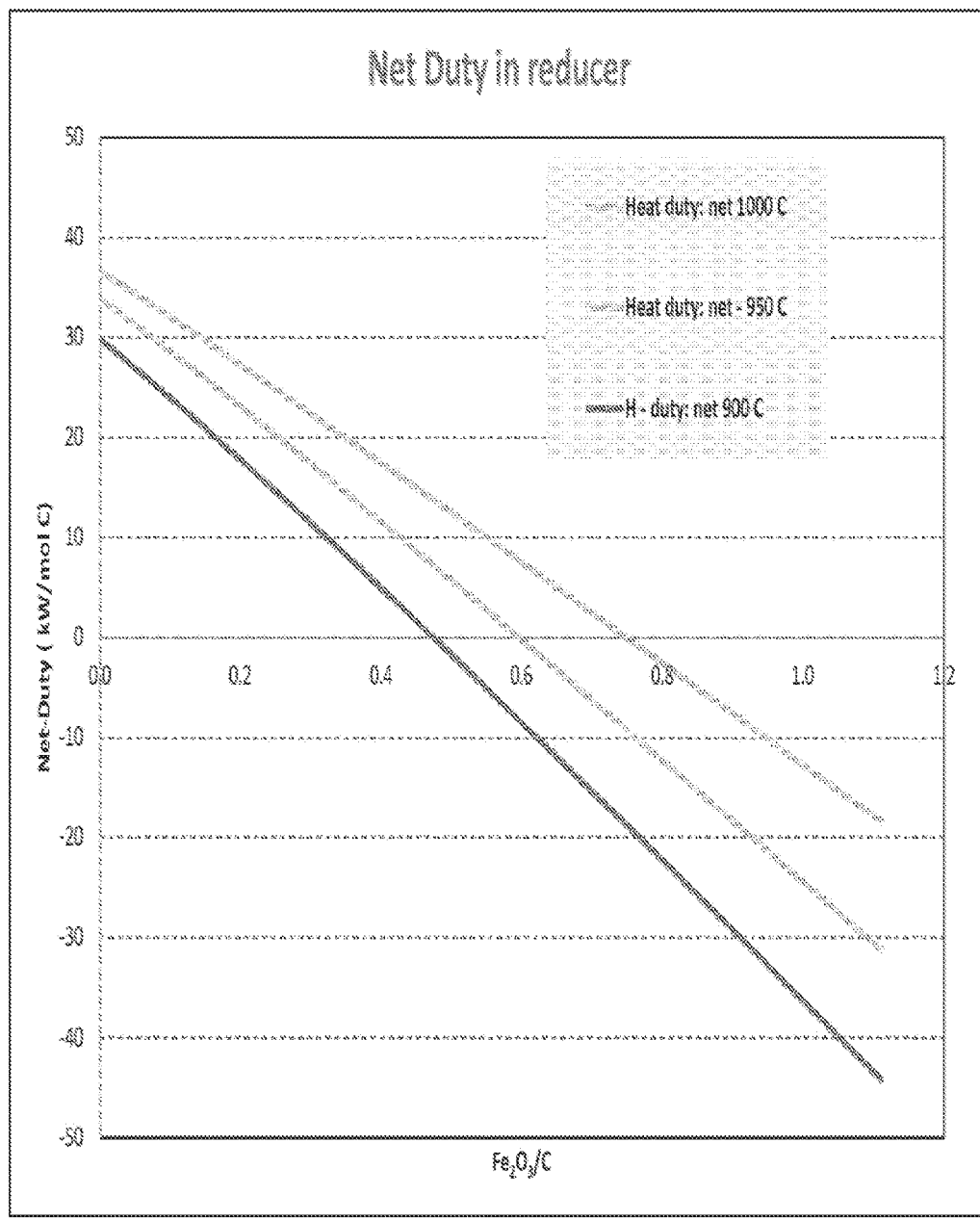
FIG. 21b illustrates the variation in the net-duty (kW/mol C) as a function of $Fe_2O_3/C$ ratio variation for a 50% HHV input of methane and PRB coal and varying temperatures for the reducer reactor.
Figure 22A:
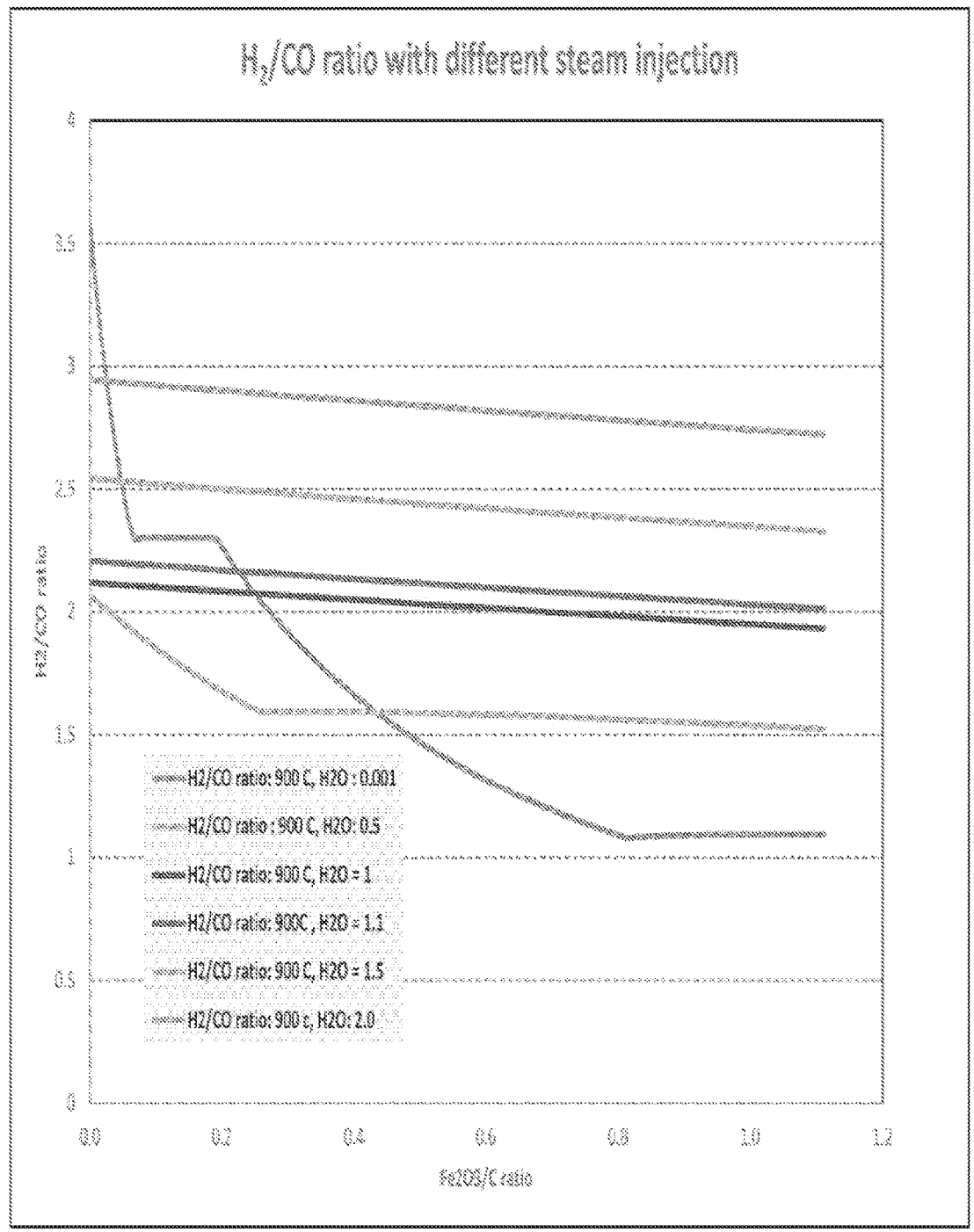
FIG. 22a illustrates the variation in the $H_2/CO$ ratio as a function of $Fe_2O_3/C$ ratio variation for a 50% HHV input of methane and PRB coal and varying temperatures for the reducer reactor for varying amount of $H_2O$ injection.
Figure 22B:
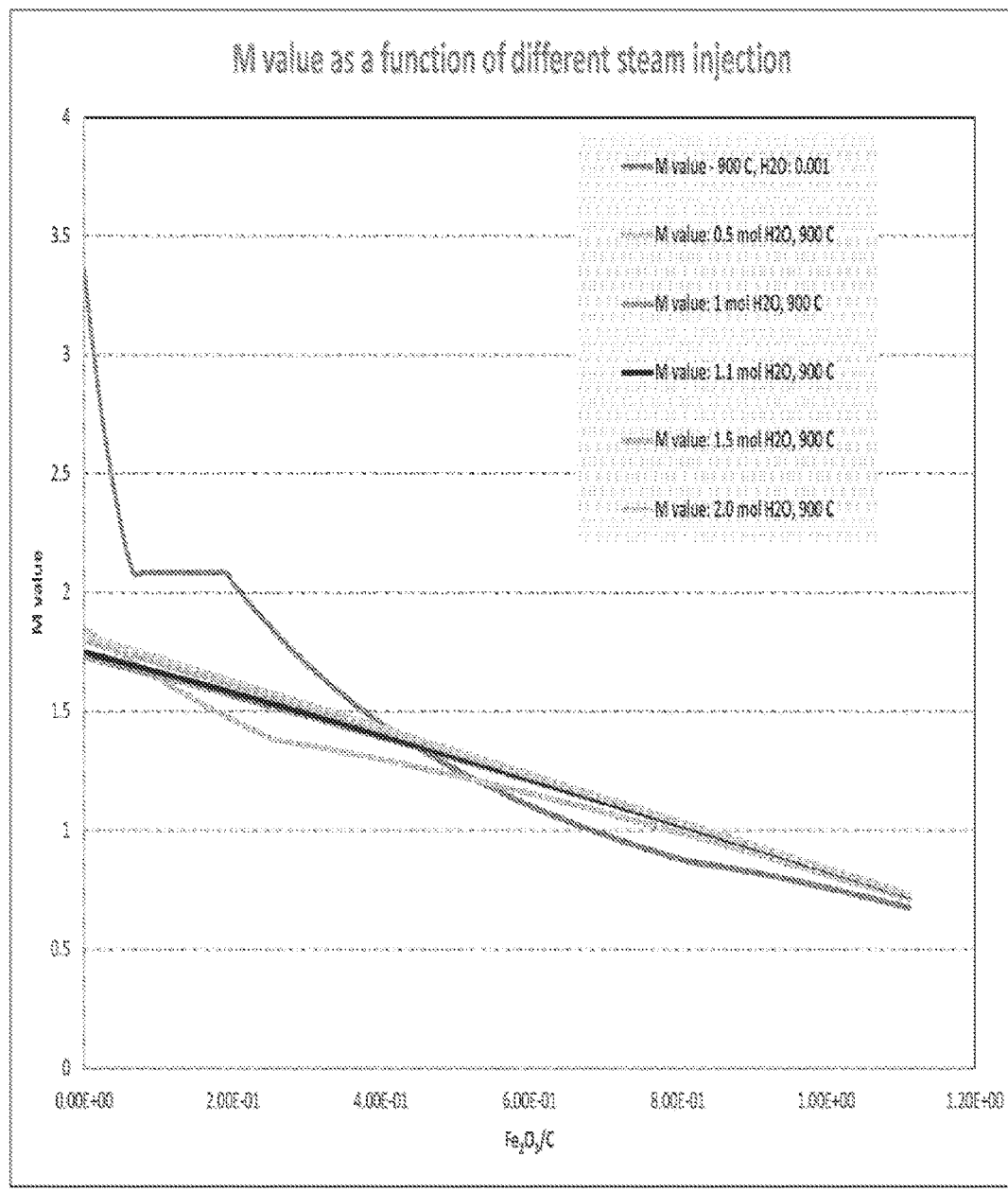
FIG. 22b illustrates the variation in the M value (($H_2$—$CO_2$)/($CO+CO_2$)) as a function of $Fe_2O_3/C$ ratio variation for a 50% HHV input of methane and PRB coal for the reducer reactor for varying amount of $H_2O$ injection.

The explanation of the specific operating condition is initially shown in an iso-thermal condition in the reducer. The reducer system is a downward co-current moving bed. The metal-oxide combination chosen is $Fe_2O_3$ as the primary component and $Al_2O_3$ as the secondary component. FIG. 19 shows a sample reducer reactor configuration investigated for the optimal reactor operation condition, configuration and analysis. The model used is a Gibbs-energy minimization reactor. The minimization of Gibbs free energy gives the thermodynamic performance of the system. The Gibbs reactor simulates the co-current downward flowing moving bed performance. The temperature swing for the oxygen carrier in an adiabatic reactor is limited between 1250 C and 750 C. If the temperature swing is set between 1200 C and 900 C, the performance is shown in FIG. 20. This condition is analyzed at a 50% HHV ratio of CH4 and PRB Coal. The steam injection is 1 mol $H_2O$ per mole of Carbon entering the reducer. The feasible area of operation for satisfying the heat balance is determined by the value of heat duty being either zero or negative. For example, when the heat duty is negative, the temperature of the solids will be higher than 900 C. If the heat duty is positive, the temperature will be lower than 900 C. The heat-duty may be manipulated by increasing or decreasing the support content in the metal-oxide, increasing or decreasing the solids flow and changing the pre-heat temperatures. A similar scan at temperatures of 950 C and 1000 C give the values listed in Table 18 and plotted on FIG. 21. Expectedly, it was found that higher the temperature of analysis, higher is the heat-duty required. If the fuel pre-heat and the oxygen carrier inlet temperature and support weight % are kept constant, then the neutral heat-duty condition is only satisfied when going to a higher solids circulation rate. This leads to a higher oxygen transfer to the syngas produced, which converts more CO to $CO_2$ reducing the carbon utilization of the system.

TABLE 18

Illustration of reactor performance for different solids outlet temperatures

| T out | Solids conversion | $H_2$/CO ratio | M value | % Syngas | $Fe_2O_3$/C | $CH_4$ conversion |
|---|---|---|---|---|---|---|
| 900 | 33% | 2.03 | 1.32 | 65% | 0.47 | 91% |
| 950 | 33% | 1.94 | 1.23 | 69% | 0.6 | 97% |
| 1000 | 33% | 1.83 | 1.08 | 72.10% | 0.75 | 99% |

FIGS. 22a, 22b, 23a and 23b show a sensitivity analysis of the effect of steam addition to the reducer reactor. The steam addition is to increase the syngas $H_2$/CO ratio and the syngas M value (M:($H_2$—$CO_2$/CO+$CO_2$) to the required values for some of downstream processes. Note that there is no significant change in the net-duty curve beyond a certain point of water injection. Note that the $H_2$/CO ratio increases with increasing $H_2O$ addition while the amount of CO produced decreases correspondingly. The point beyond where the heat-duty does not show a significant deviation for incremental values of steam injection is a special point of interest around which the system can be designed to maximize the carbon utilization.

Figure 23A:
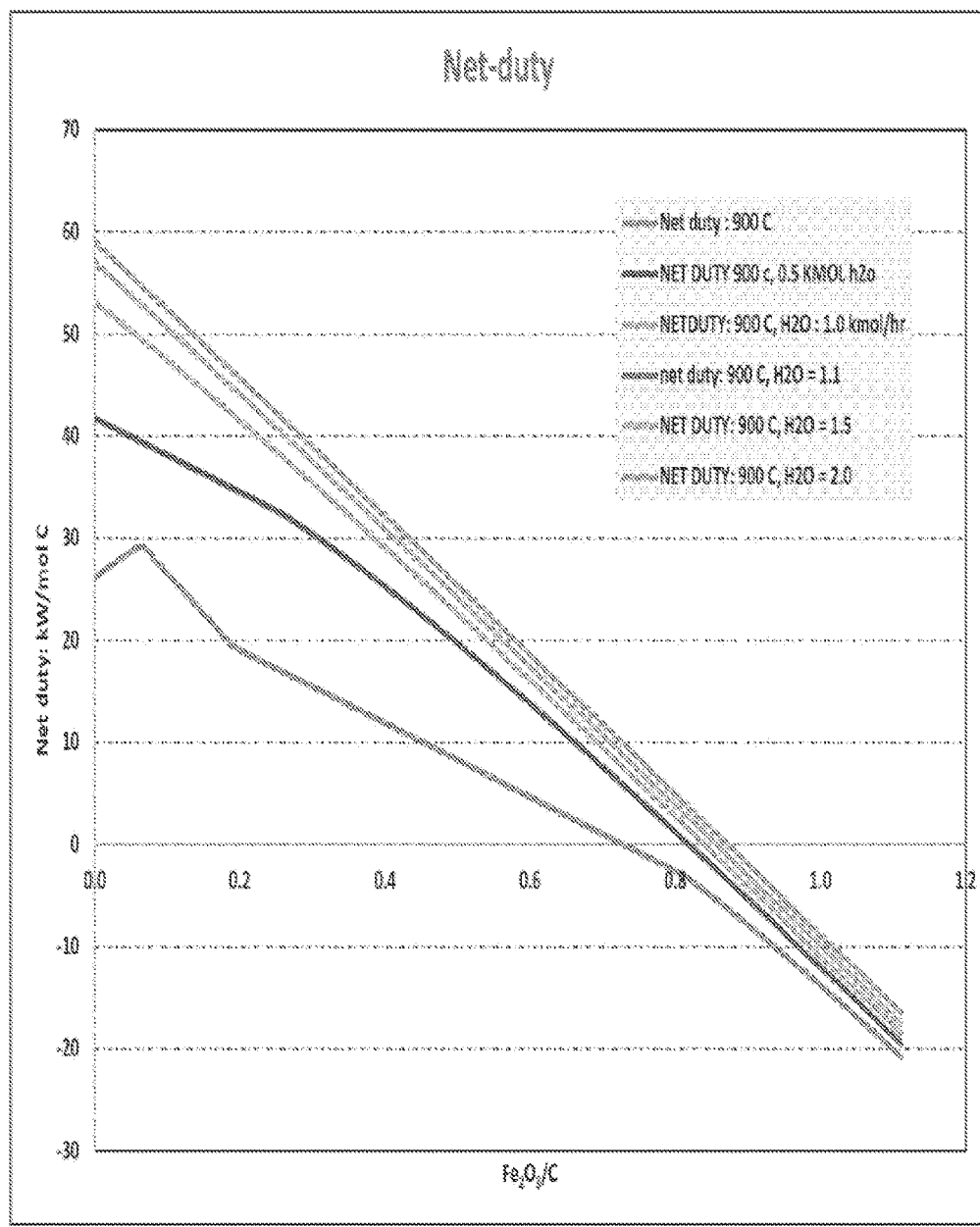
FIG. 23a illustrates the variation in the net reducer duty (kW/mole C) as a function of $Fe_2O_3/C$ ratio variation for a 50% HHV input of methane and PRB coal for the reducer reactor for varying amount of $H_2O$ injection.
Figure 23B:
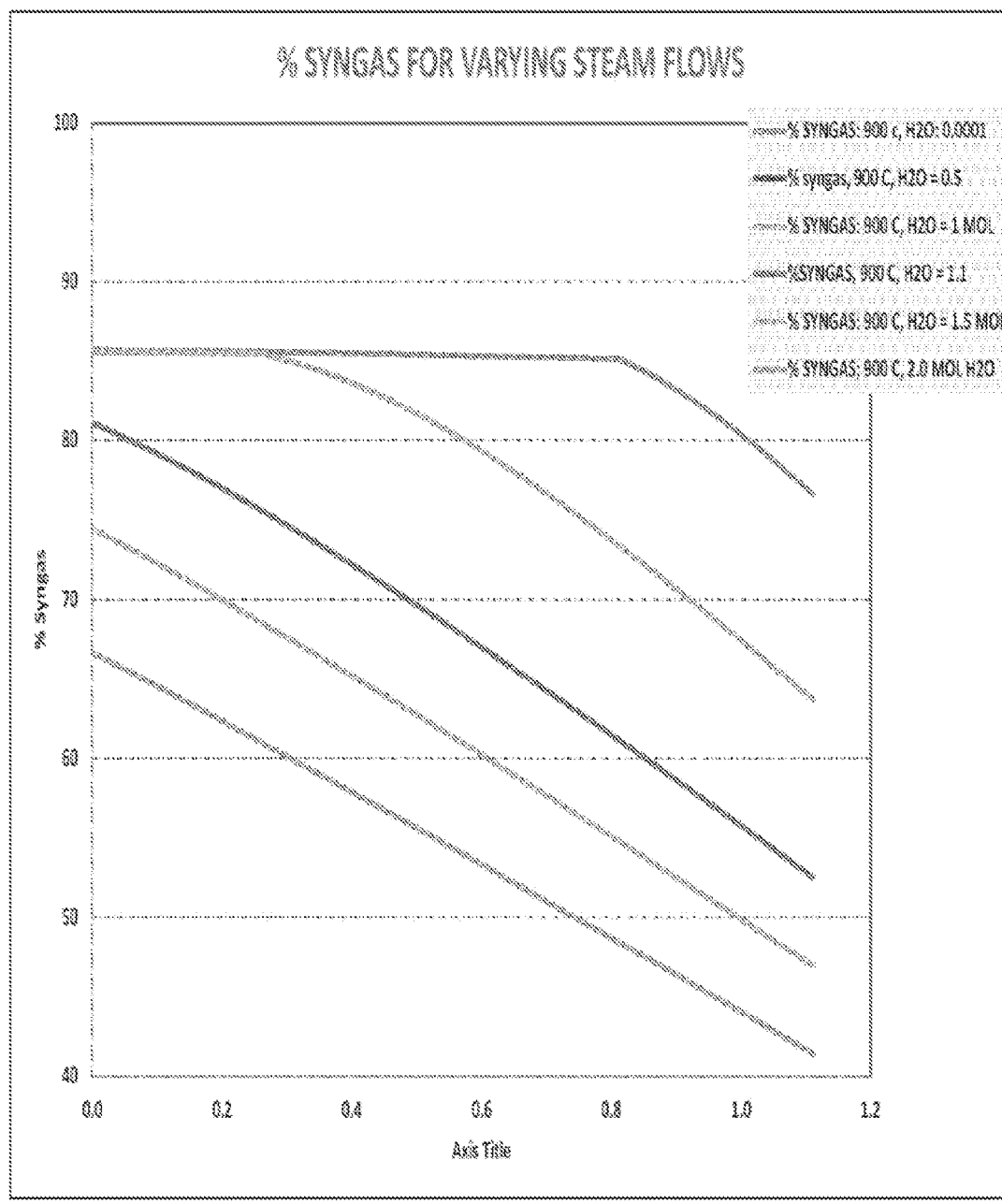
FIG. 23b illustrates the variation in the % Syngas (% ($CO+H_2$) in gas-stream) as a function of $Fe_2O_3/C$ ratio variation for a 50% HHV input of methane and PRB coal for the reducer reactor for varying amount of $H_2O$ injection.

Analyzing the regions before and after this point shows two distinct trends. Before this point, the oxygen for production of $H_2$ and CO from the solid fuel comes exclusively from the oxygen carrier. Going beyond the so-called critical point of steam injection, the amount of oxygen donated by the oxygen carrier stays more or less constant. The amount of CO produced from the fuel is constant. The additional steam starts donating oxygen to the CO, converting it to $CO_2$, while producing more $H_2$. This increases the $H_2$/CO ratio to the requisite value at the cost of converting CO to $CO_2$. The $CO_2$ itself can be removed in a standard rectisol type configuration to give a M value which is very close to the $H_2$/CO ratio. As shown in FIG. 22, the $H_2$/CO ratio increases with addition of more water. Note that the M value remains more of less the same. As shown in FIG. 23b, the % syngas drops as predicted by the hypothesis mentioned above. The specific operating condition is designed around the system for this particular injection condition uniquely by a combination of an iron based metal-oxide and the co-current downward flow and solid fuel. This condition is unique in the sense that the operation is designed to harness the sweet spot of maximizing the oxygen donation from the oxygen carrier for producing syngas rather than the water-gas shift reaction. The importance of oxygen donation from the oxygen carrier is in the fact that it donates oxygen in a reducing environment without oxidizing the CO to $CO_2$. A conventional coal-gasifier using only a water gas shift based system gives a fuel to syngas carbon conversion values of between 25 and 35%. This is because of the fact that the water-gas shift reaction provides an oxidizing environment which increases the $H_2$ content of the syngas at the cost of converting CO to $CO_2$. The role of oxygen carrier in providing the oxygen can be controlled by a combination of the oxygen carrier material, the reactor operation mode and the amount of steam injection. The conditions claimed satisfy the heat-balance for an iso-thermal operation.

The analysis presented so-far held a constant temperature to evaluate the effect of various parameters for deriving a specific condition and confirmation of the theory of maximizing the oxygen donation by the oxygen carrier.

FIGS. 24 to 31 analyze the behavior of the looping reducer for a commercial prototype adiabatic system. The fuel system is maintained similar to the iso-thermal case analyzed above for ease of understanding. The commercial reactor system is typically designed with refractory lining of the reactor wall to have an adiabatic operating condition. For this analysis, this will accurately represent a realistic commercial operation. This evaluating the GIBBS reactor system under the condition of heat duty being near zero instead of a constant temperature. The variable which changes with varying iron-oxide flow-rate is the temperature coming out of the system. The temperature swing is within the specified oxygen carrier limits of 1250 C and 750 C. The system behavior is analyzed with steam addition as a parameter, while the other inlet conditions remaining similar to the isothermal cases analyzed in FIGS. 20-23.

Figure 30:
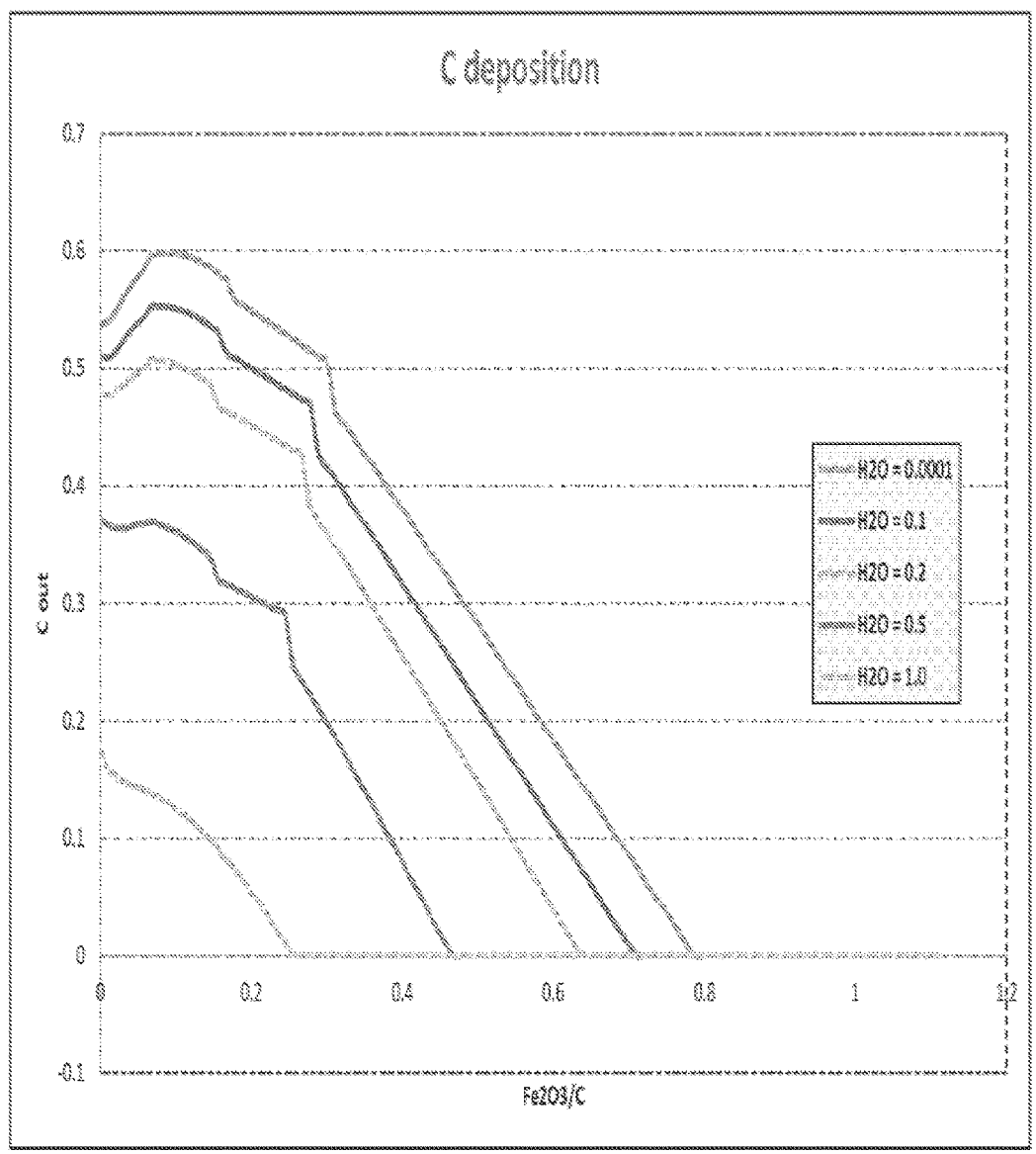
FIG. 30 illustrates the variation in the Carbon deposition in the reduced solids coming out of reducer reactor produced as a function of $Fe_2O_3/C$ ratio variation for a 50% HHV input of methane and PRB coal for the reducer reactor for varying amount of $H_2O$ injection.
Figure 31:
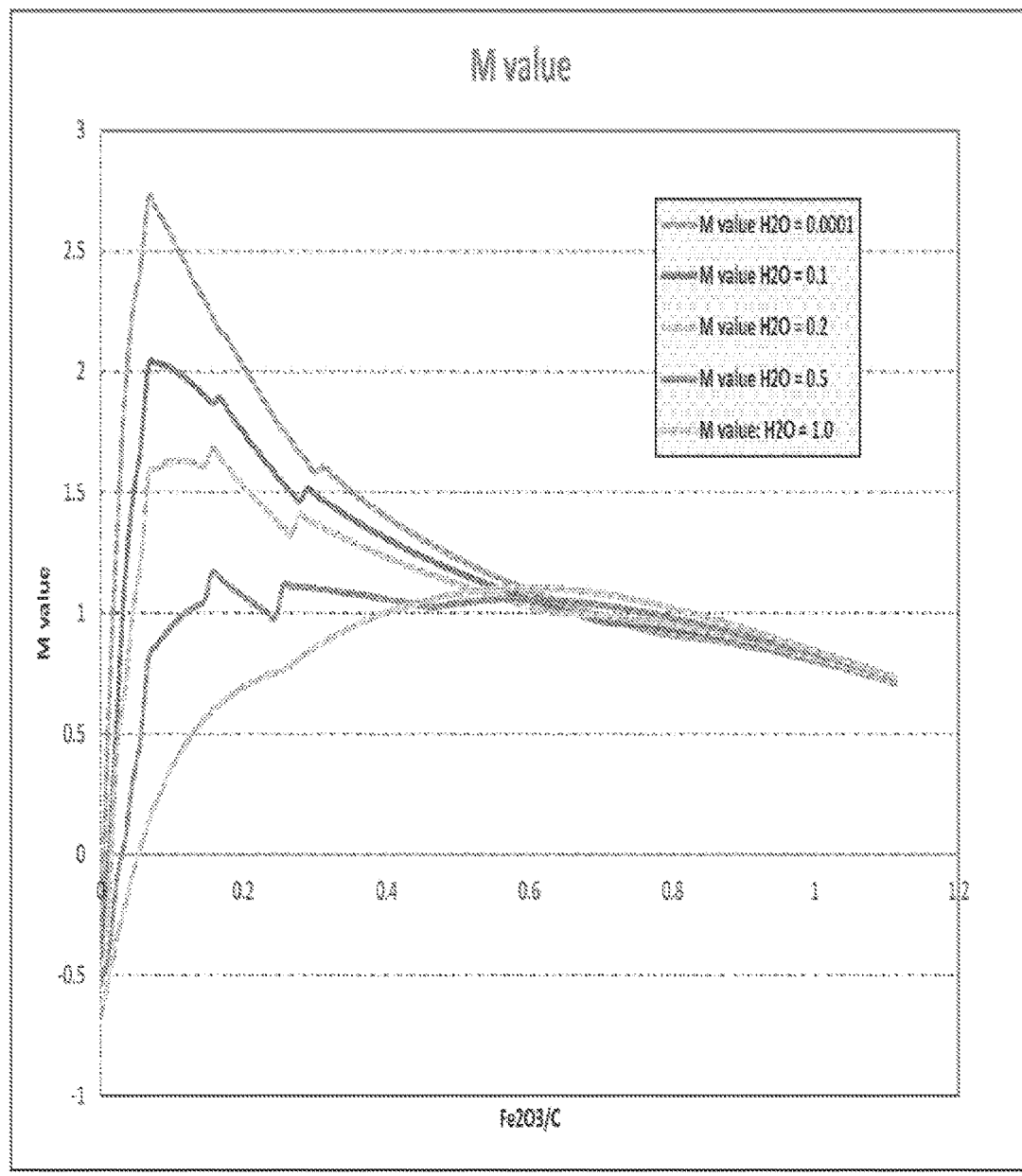
FIG. 31 illustrates the variation in the M value of the syngas coming out of reducer reactor produced as a function of $Fe_2O_3/C$ ratio variation for a 50% HHV input of methane and PRB coal for the reducer reactor for varying amount of $H_2O$ injection.

The first condition to be isolated for an acceptable reactor performance is the absence of Carbon deposition in the reducer. The set of operating curves are shown as a function of the amount of water-injected per mole of Carbon input to the reducer. The conditions where there is no carbon-deposition are acceptable for evaluating the system performance. FIG. 30 shows that for the same amount of fuel injection, the minimal amount of oxygen-carrier flow required for no-carbon deposition decreases with increase of water flow for increasing temperature. In other words, the system can have a lower solids flow and a lower reducer outlet temperature with higher water injection for the same amount of carbon input to the system.

Figure 24:
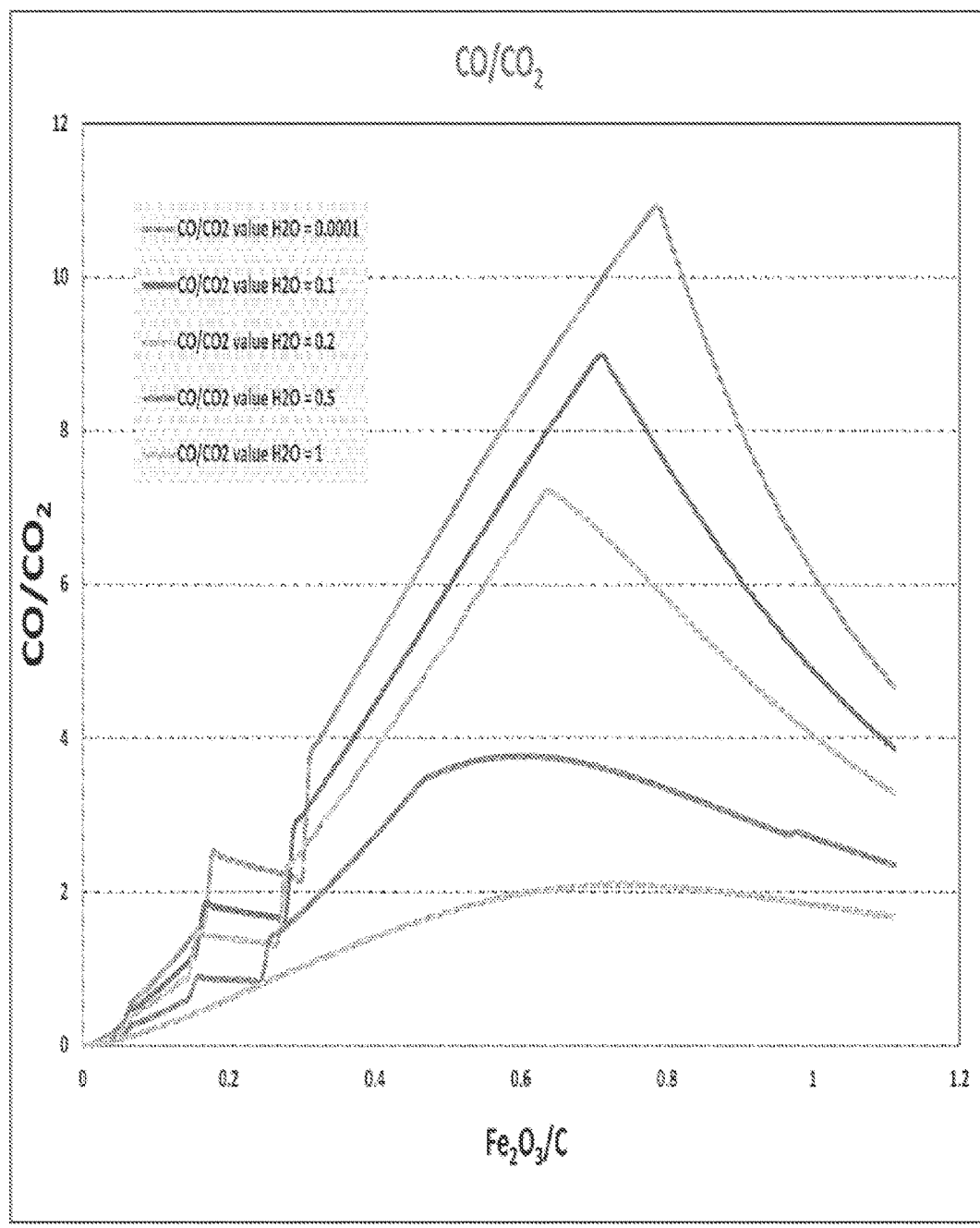
FIG. 24 illustrates the variation in the $CO/CO_2$ ratio of syngas produced as a function of $Fe_2O_3/C$ ratio variation for a 50% HHV input of methane and PRB coal for the reducer reactor for varying amount of $H_2O$ injection.
Figure 25:
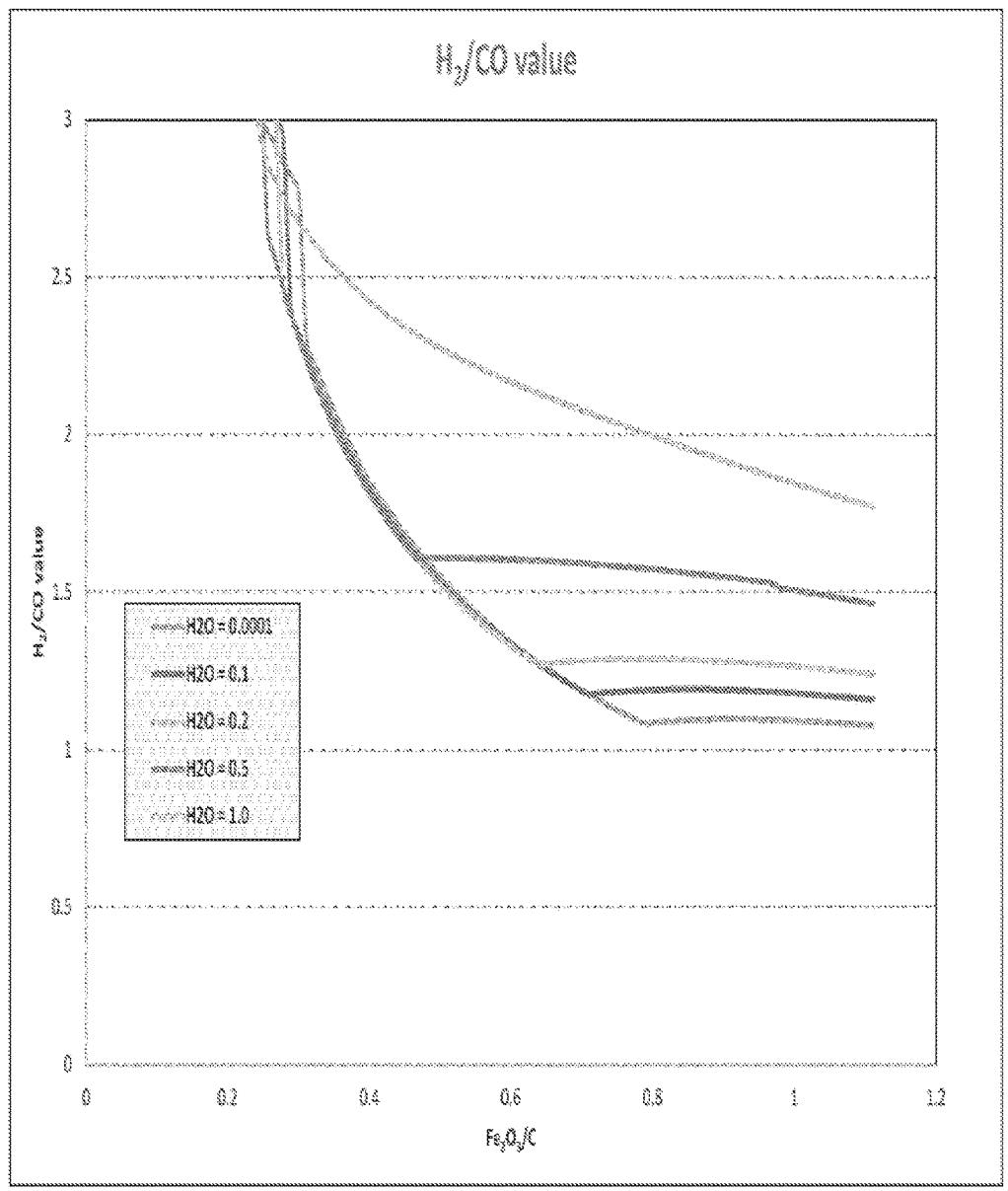
FIG. 25 illustrates the variation in the $H_2/CO$ ratio of syngas produced as a function of $Fe_2O_3/C$ ratio variation for a 50% HHV input of methane and PRB coal for the reducer reactor for varying amount of $H_2O$ injection.
Figure 26:
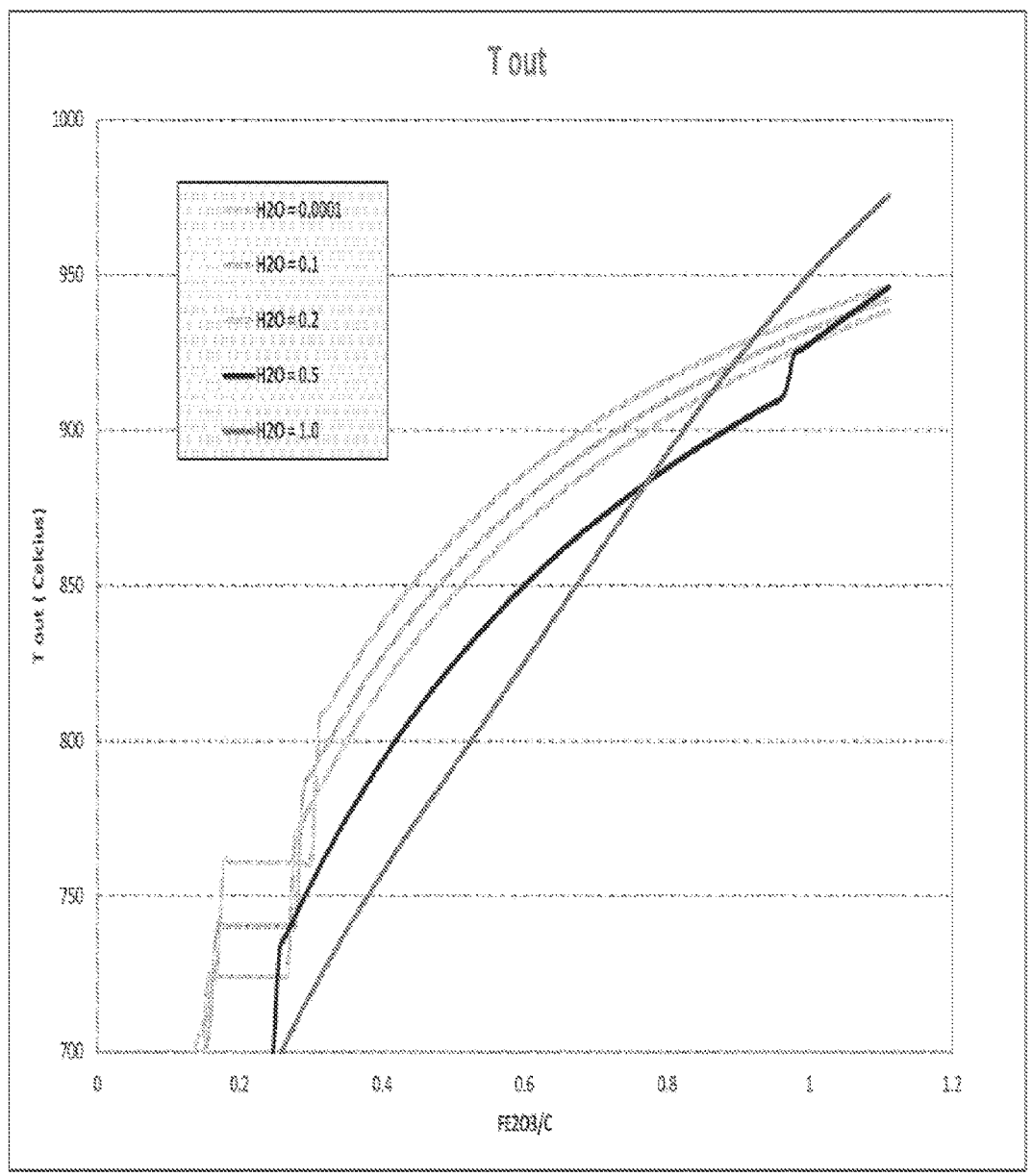
FIG. 26 illustrates the variation in the temperature of the solids coming out of reducer reactor produced as a function of $Fe_2O_3/C$ ratio variation for a 50% HHV input of methane and PRB coal for the reducer reactor for varying amount of $H_2O$ injection.
Figure 27:
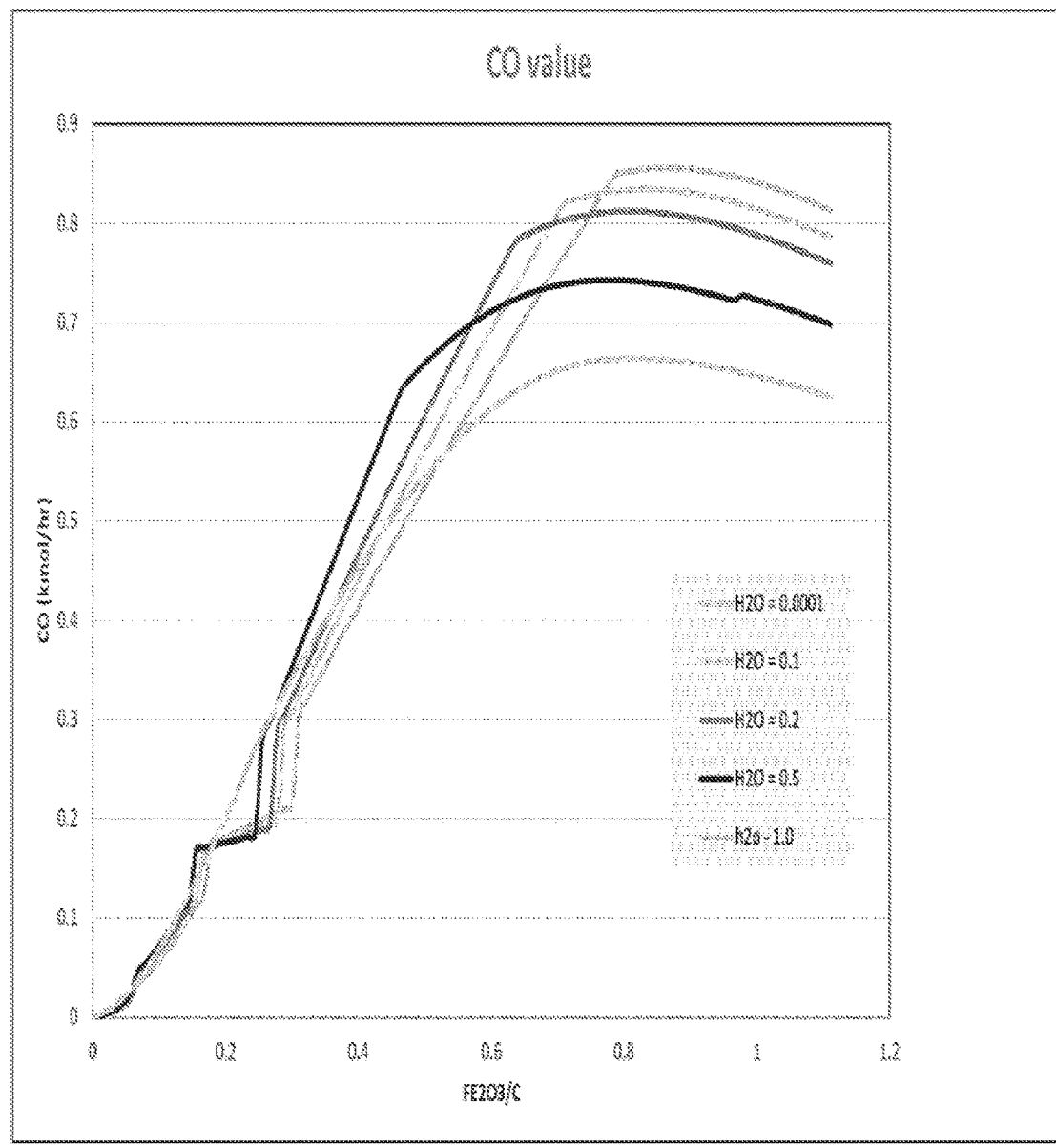
FIG. 27 illustrates the variation in the CO content in the syngas coming out of reducer reactor produced as a function of $Fe_2O_3/C$ ratio variation for a 50% HHV input of methane and PRB coal for the reducer reactor for varying amount of $H_2O$ injection.
Figure 28:
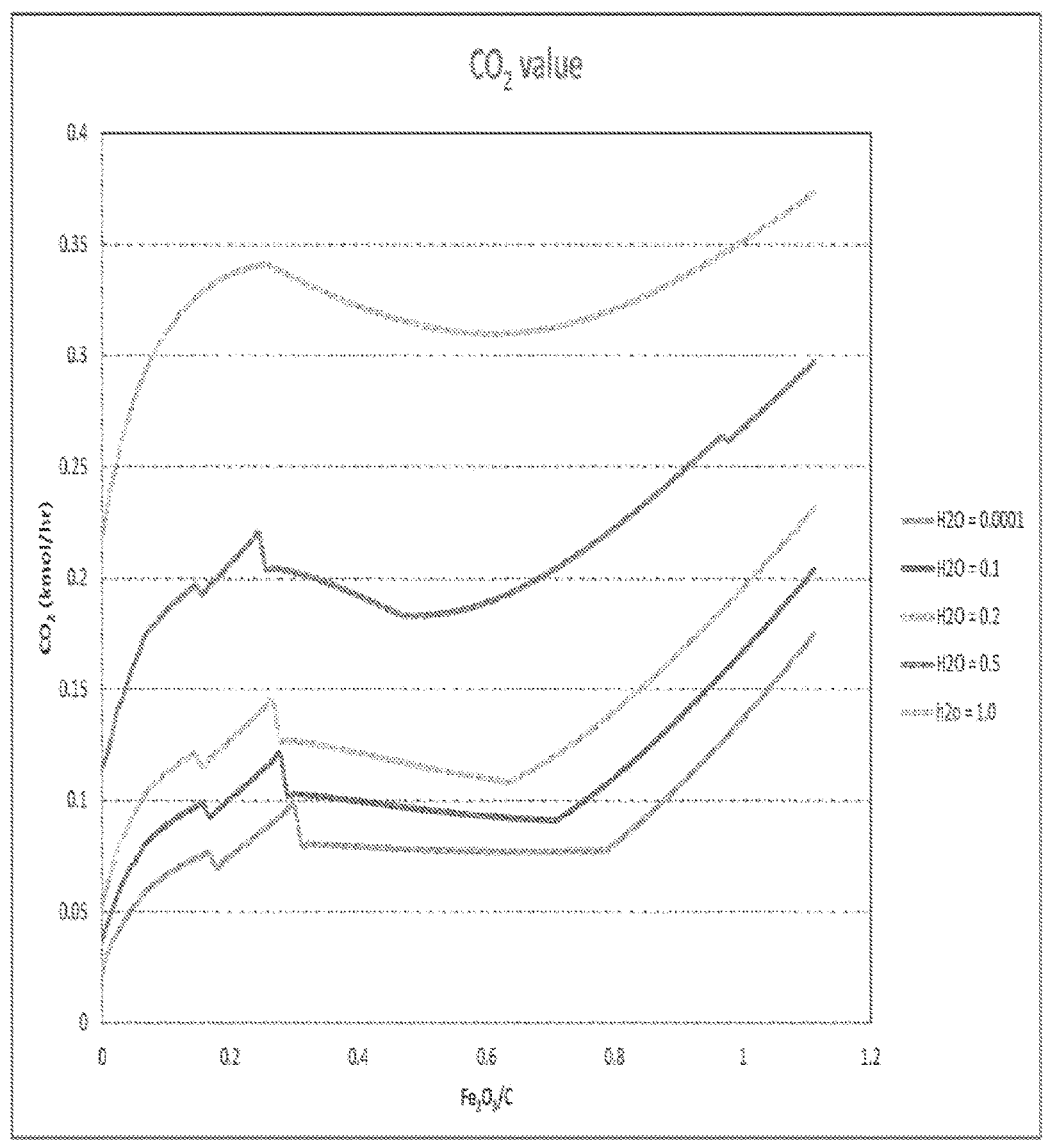
FIG. 28 illustrates the variation in the $CO_2$ content in the syngas coming out of reducer reactor produced as a function of $Fe_2O_3/C$ ratio variation for a 50% HHV input of methane and PRB coal for the reducer reactor for varying amount of $H_2O$ injection.
Figure 29:
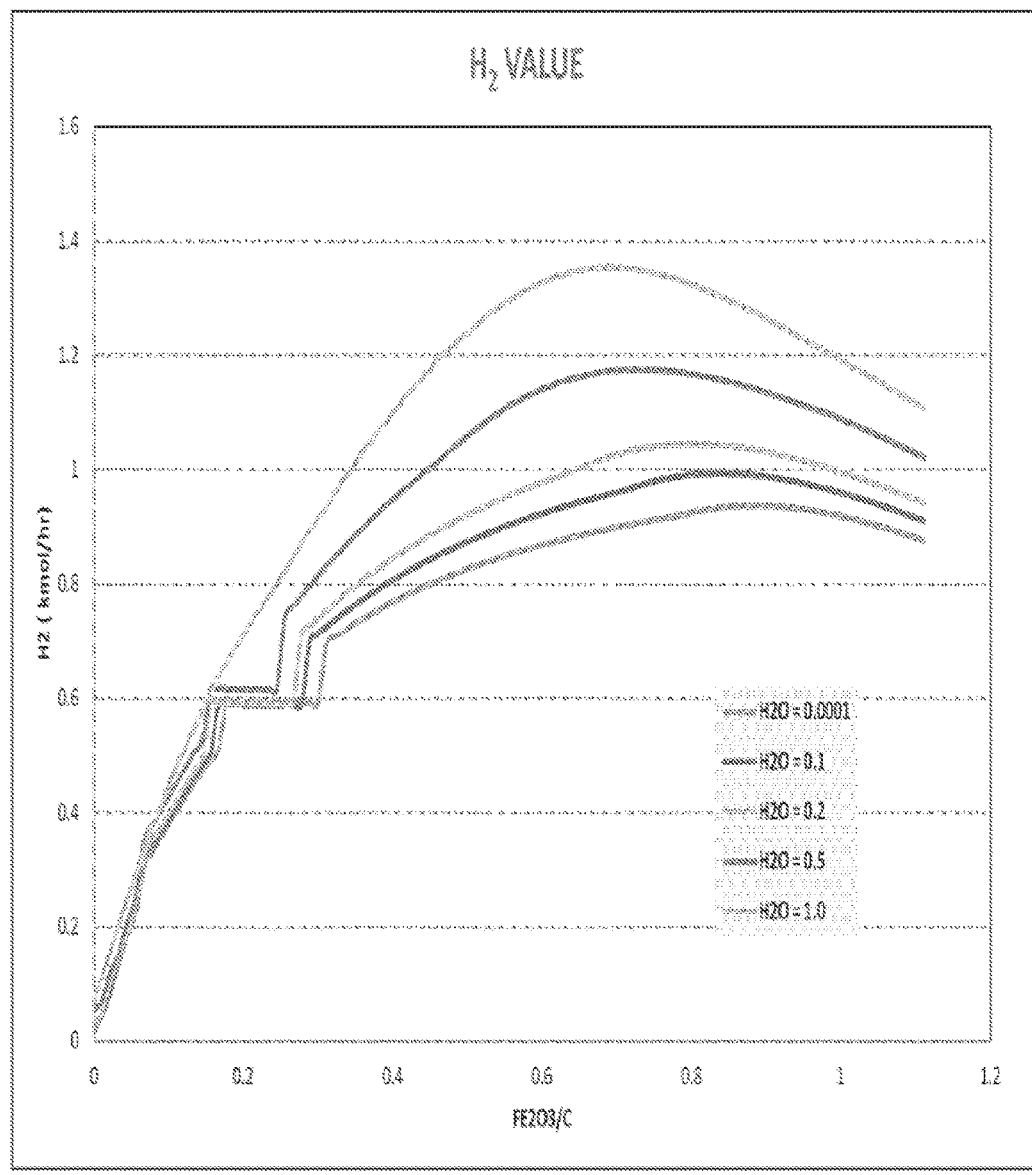
FIG. 29 illustrates the variation in the $H_2$ content in the syngas coming out of reducer reactor produced as a function of $Fe_2O_3/C$ ratio variation for a 50% HHV input of methane and PRB coal for the reducer reactor for varying amount of $H_2O$ injection.

FIG. 24 and FIG. 25 plot the CO/$CO_2$ curves and $H_2$/CO value in syngas for varying iron-oxide flows as a function of steam injection per mole of Carbon. It can be seen that in the regions where there is no carbon deposition, the $H_2$/CO ratio increases with increasing steam injection. The CO/$CO_2$ ratio decreases with increased steam injection, pointing to the presence of the so-called critical point (claimed specific operating condition) beyond which the oxygen donation from the steam to the fuel occurs. The $H_2$ produced increases as a function of the increasing steam injection as shown in FIG. 29. The $CO_2$ produced also increases while the CO decreases as a function of increased steam injection. The temperature outlet profile does not show a significant difference as a function of steam injection. Using a standard post-combustion rectisol-type system downstream of the unique looping reactor helps decide the optimal system goals for this case. The goals in accordance with previous iso-thermal analysis are reaching a reasonable $H_2$/CO ratio while maximizing the CO/$CO_2$ ratio. The specific point of operation would be close to the point where the critical point of transition occurs wherein the oxygen transfer from steam to the fuel begins dominating over that from steam to the oxygen carrier and the oxygen carrier to the fuel. This specific condition can be achieved only with the unique combination of the oxygen carrier, heat management, steam injection, fuel feedstock and a downward co-current contact between the oxygen carrier and the fuel type reactor.

Figure 32:
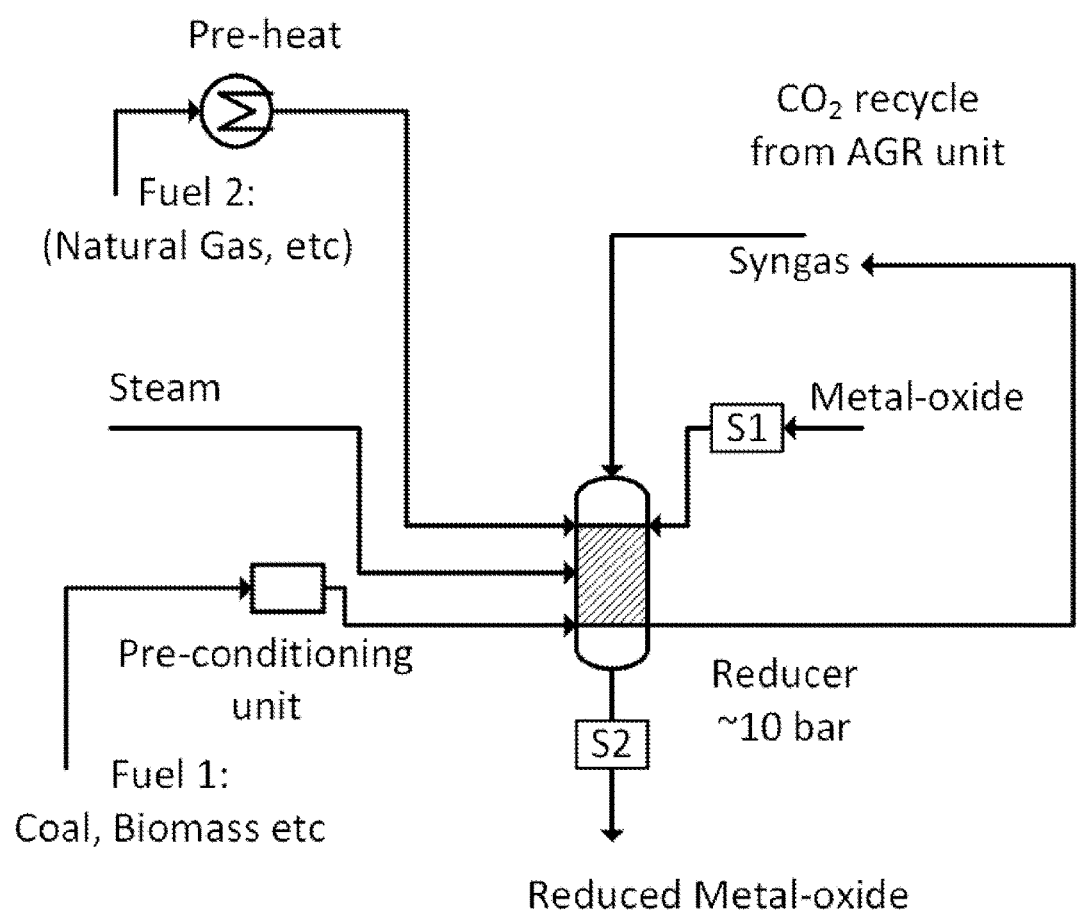
FIG. 32 shows the basic reactor system set-up analysed with $CO_2$ recycle from an Acid Gas Removal (AGR) type system.
Figure 33A:
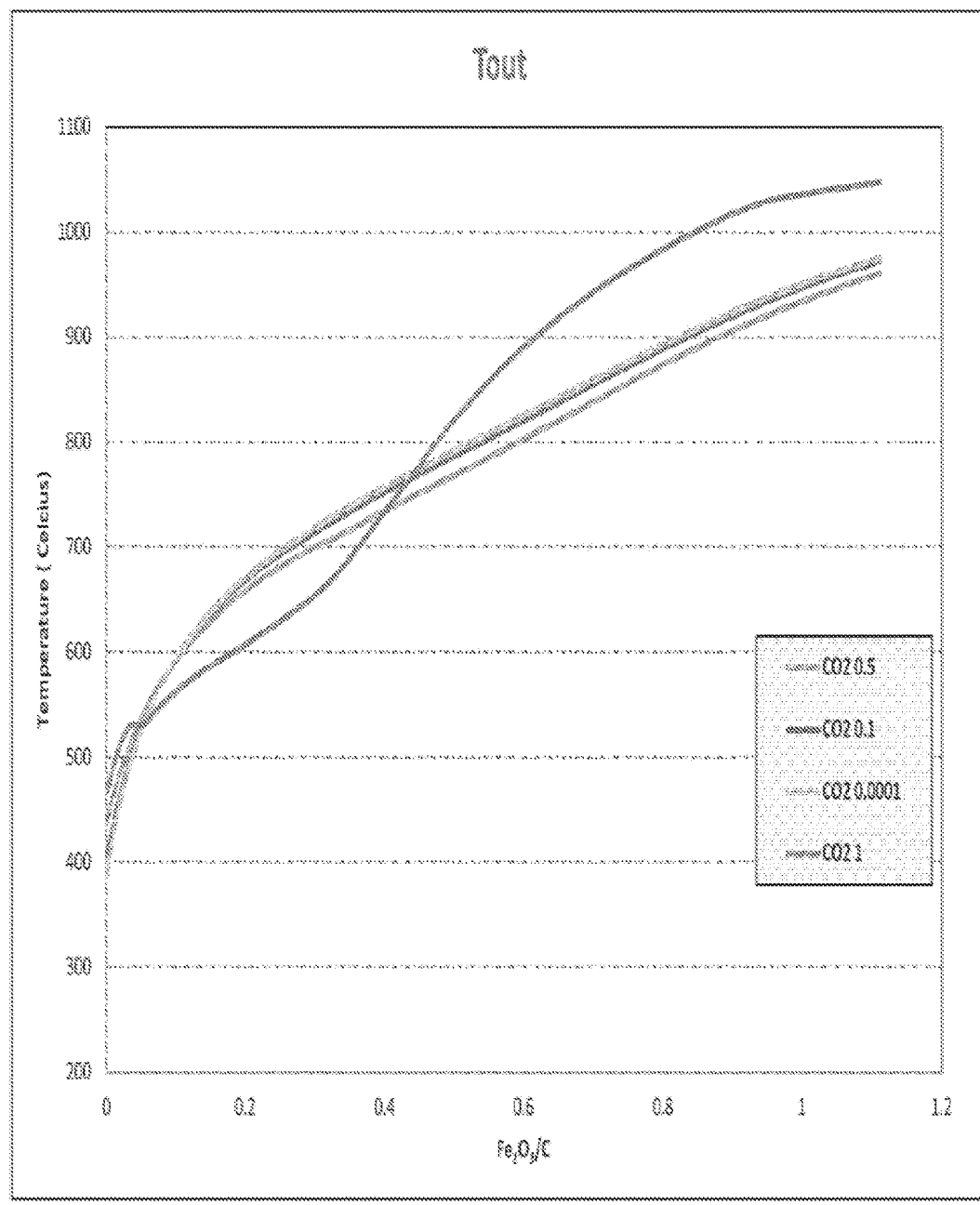
FIG. 33a illustrates the variation in the temperature of the solids coming out of reducer reactor produced as a function of $Fe_2O_3/C$ ratio variation for a 50% HHV input of methane and PRB coal for the reducer reactor for varying amount of $CO_2$ recycle with steam injection.
Figure 33B:
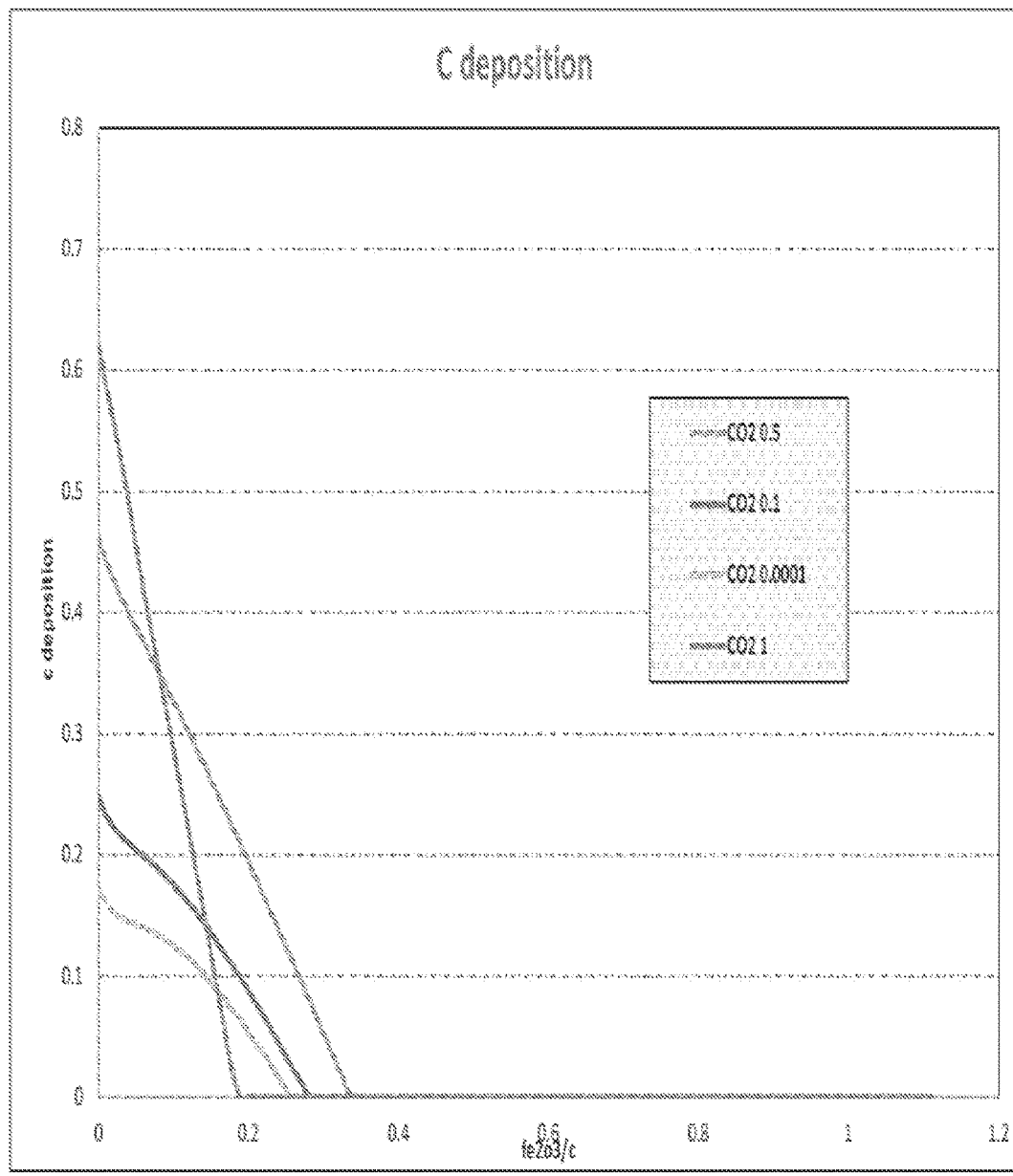
FIG. 33b illustrates the Carbon deposition as a function of $Fe_2O_3/C$ ratio variation for a 50% HHV input of methane and PRB coal for the reducer reactor; for varying amount of $CO_2$ recycle with steam injection.
Figure 34A:
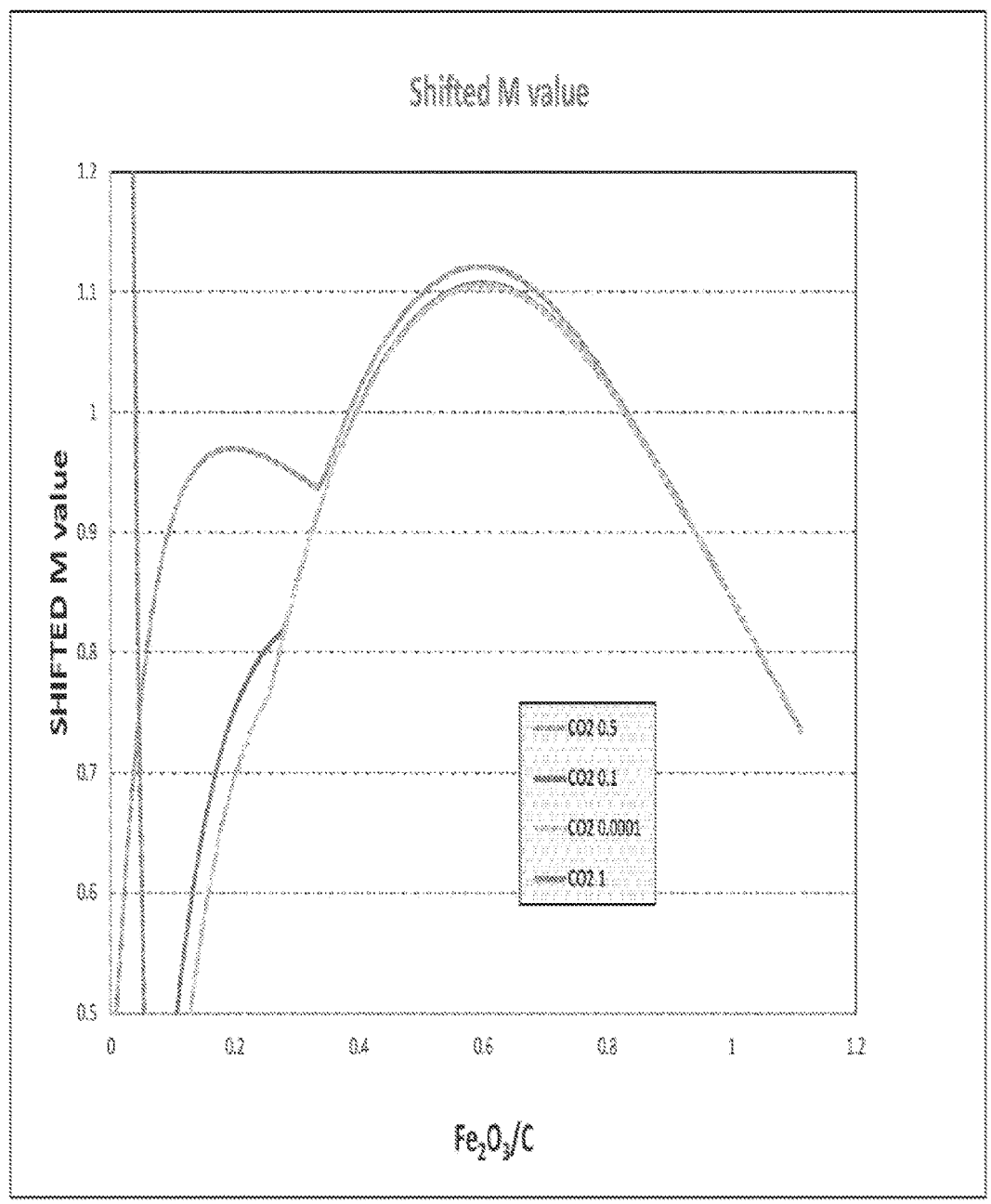
FIG. 34a shows the shifted M value (($H_2$—$CO_2$(NET))/($CO+CO_2$(NET))) in the syngas coming out of reducer reactor produced as a function of $Fe_2O_3/C$ ratio variation for a 50% HHV input of methane and PRB coal for the reducer reactor for varying amount of $CO_2$ recycle with steam injection.
Figure 34B:
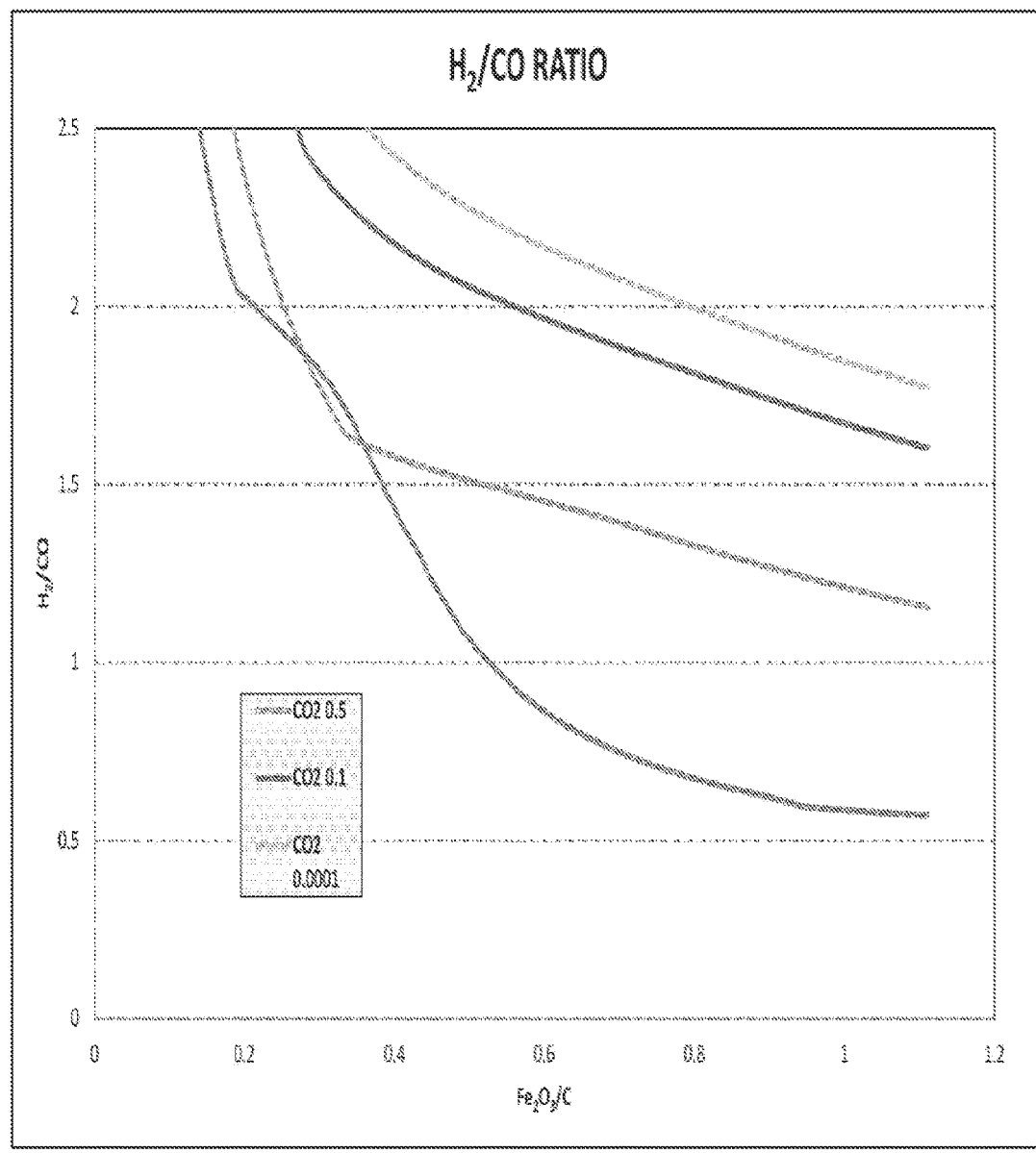
FIG. 34b shows the variation in the $H_2/CO$ ratio in the syngas coming out of reducer reactor produced as a function of $Fe_2O_3/C$ ratio variation for a 50% HHV input of methane and PRB coal for the reducer reactor for varying amount of with $CO_2$ recycle with steam injection.

In a different configuration, illustrated in FIG. 32 the $CO_2$ separated from the post-combustion capture can be recycled with after moisture removal. The $CO_2$ recycle is to improve the condition to suppress the Carbon deposition, satisfying the heat-balance conditions at a lower circulation rate. Another advantage of this recycle $CO_2$ injection is to suppress the CO conversion to $CO_2$. FIG. 33 and FIG. 34 show the system performance with different levels of $CO_2$ injection at a steam to fuel carbon molar ratio of 0.5. The figures illustrate that the addition of a small amount of $CO_2$ helps suppress the Carbon deposition to a higher extent. Higher addition has no significant benefits as shown in FIGS. 32 and 33. A small addition of $CO_2$ as disclosed in this configuration, in combination with the unique operating condition disclosed earlier for maximizing the oxygen transfer has some benefits over in cases where $CO_2$ can be recycled feasibly.

Figure 35A:
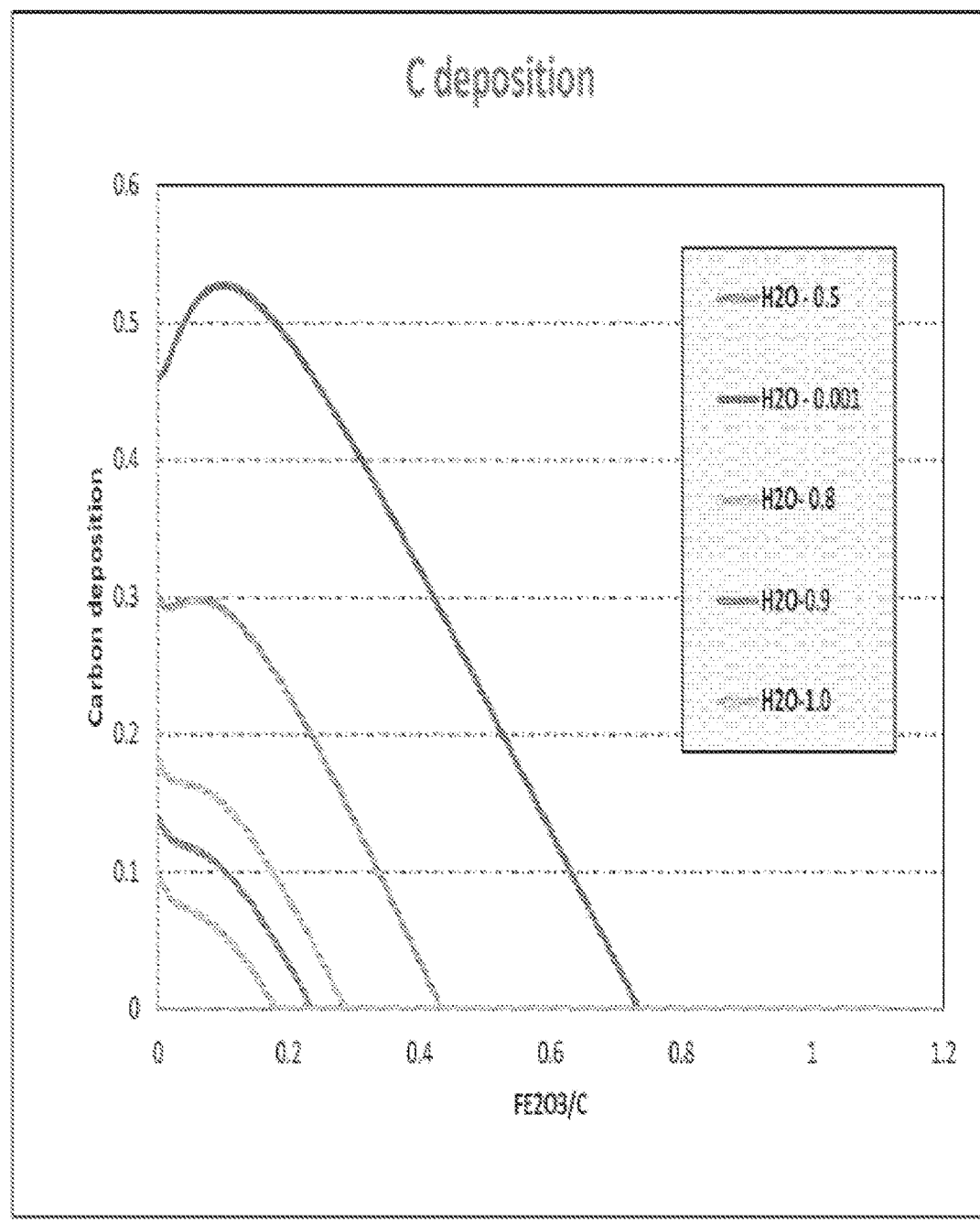
FIG. 35a shows the variation in the Carbon deposition in the solids coming out of reducer reactor produced as a function of $Fe_2O_3$/C ratio variation for a 50% HHV input of methane and PRB coal for the reducer reactor for varying amount of steam injection.
Figure 35B:
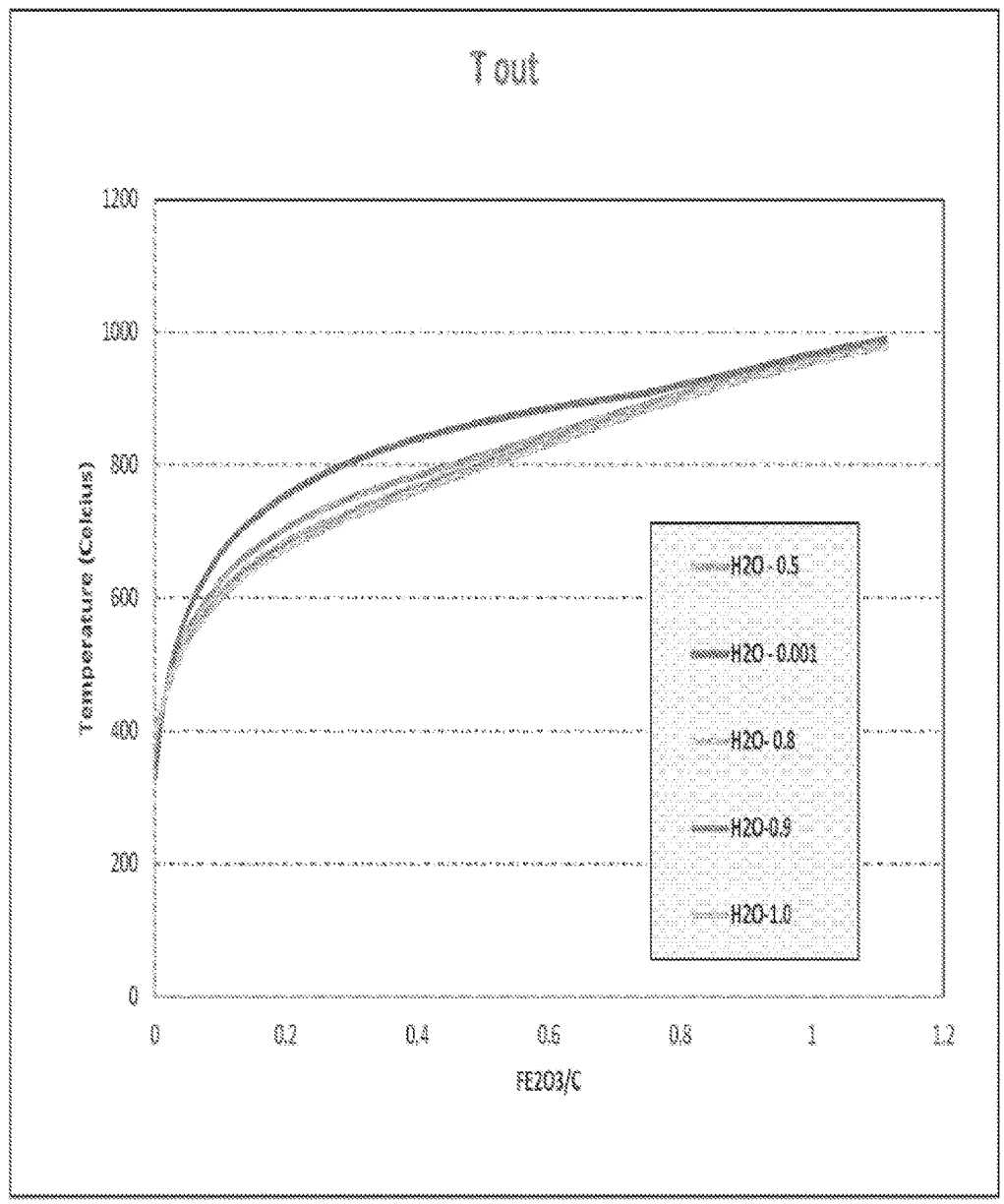
FIG. 35b shows the variation in the Temperature of the solids coming out of reducer reactor produced as a function of $Fe_2O_3$/C ratio variation for a 50% HHV input of methane and PRB coal for the reducer reactor for varying amount of steam injection.
Figure 36A:
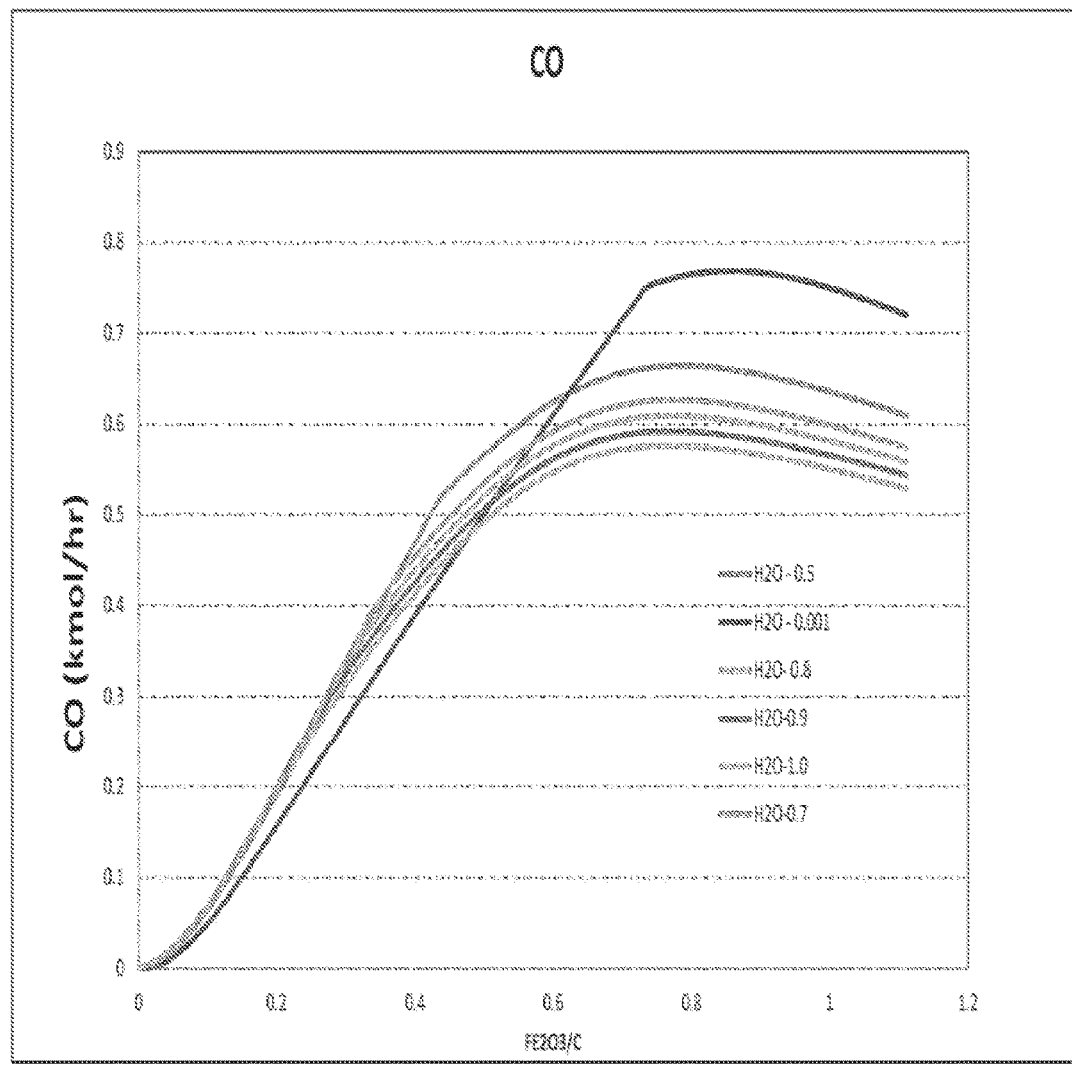
FIG. 36a shows the variation in the CO content of syngas coming out of reducer reactor produced as a function of $Fe_2O_3$/C ratio variation for a 50% HHV input of methane and PRB coal for the reducer reactor for varying amount of steam injection.
Figure 36B:
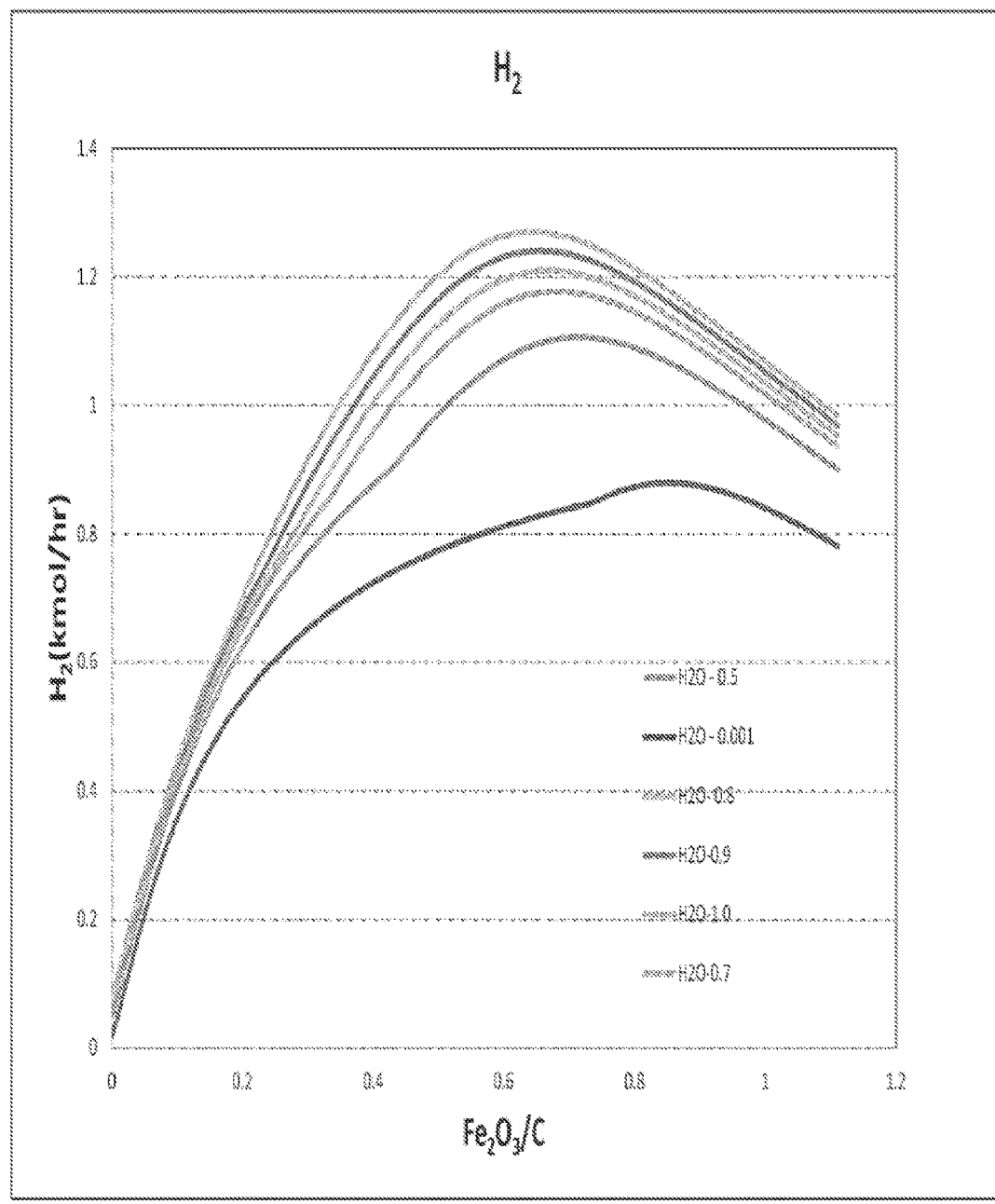
FIG. 36b shows the variation in the $H_2$ content of syngas coming out of reducer reactor produced as a function of $Fe_2O_3$/C ratio variation for a 50% HHV input of methane and PRB coal for the reducer reactor for varying amount of steam injection.
Figure 36C:
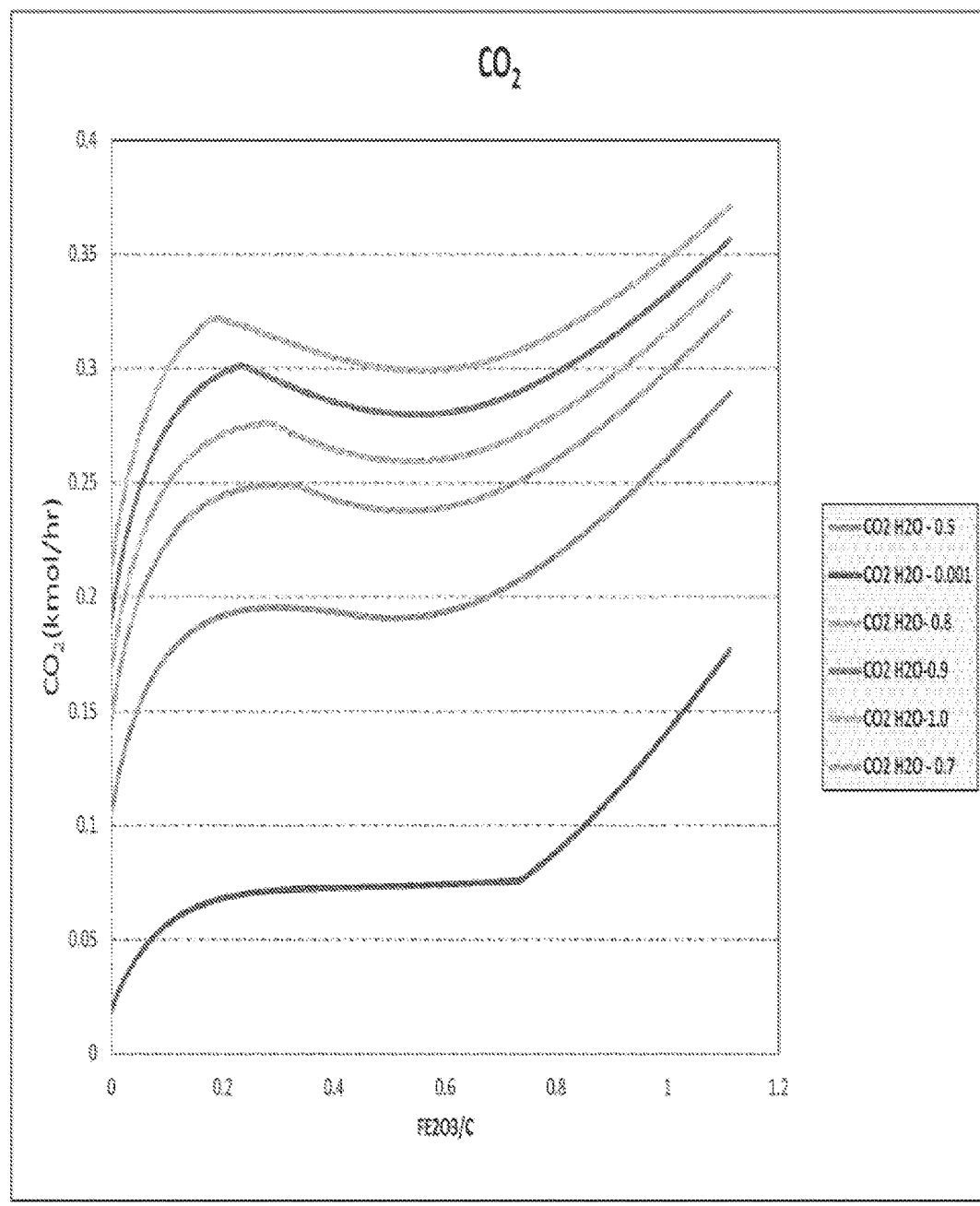
FIG. 36c shows the variation in the $CO_2$ content of syngas coming out of reducer reactor produced as a function of $Fe_2O_3$/C ratio variation for a 50% HHV input of methane and PRB coal for the reducer reactor for varying amount of steam injection.
Figure 37A:
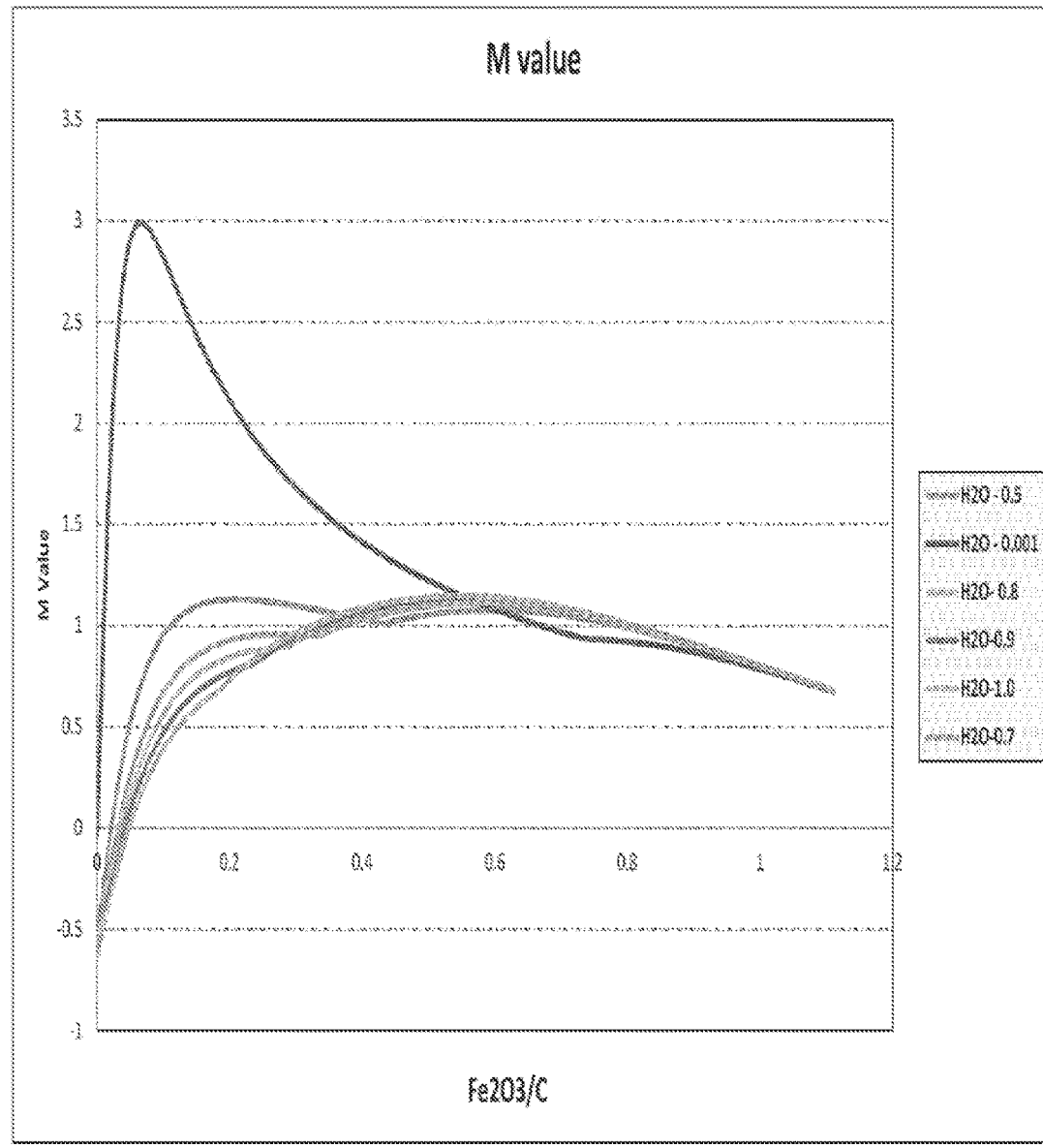
FIG. 37a shows the variation in the M value (($H_2$—$CO_2$)/(CO+$CO_2$)) of syngas coming out of reducer reactor produced as a function of $Fe_2O_3$/C ratio variation for a 50% HHV input of methane and PRB coal for the reducer reactor for varying amount of steam injection.
Figure 37B:
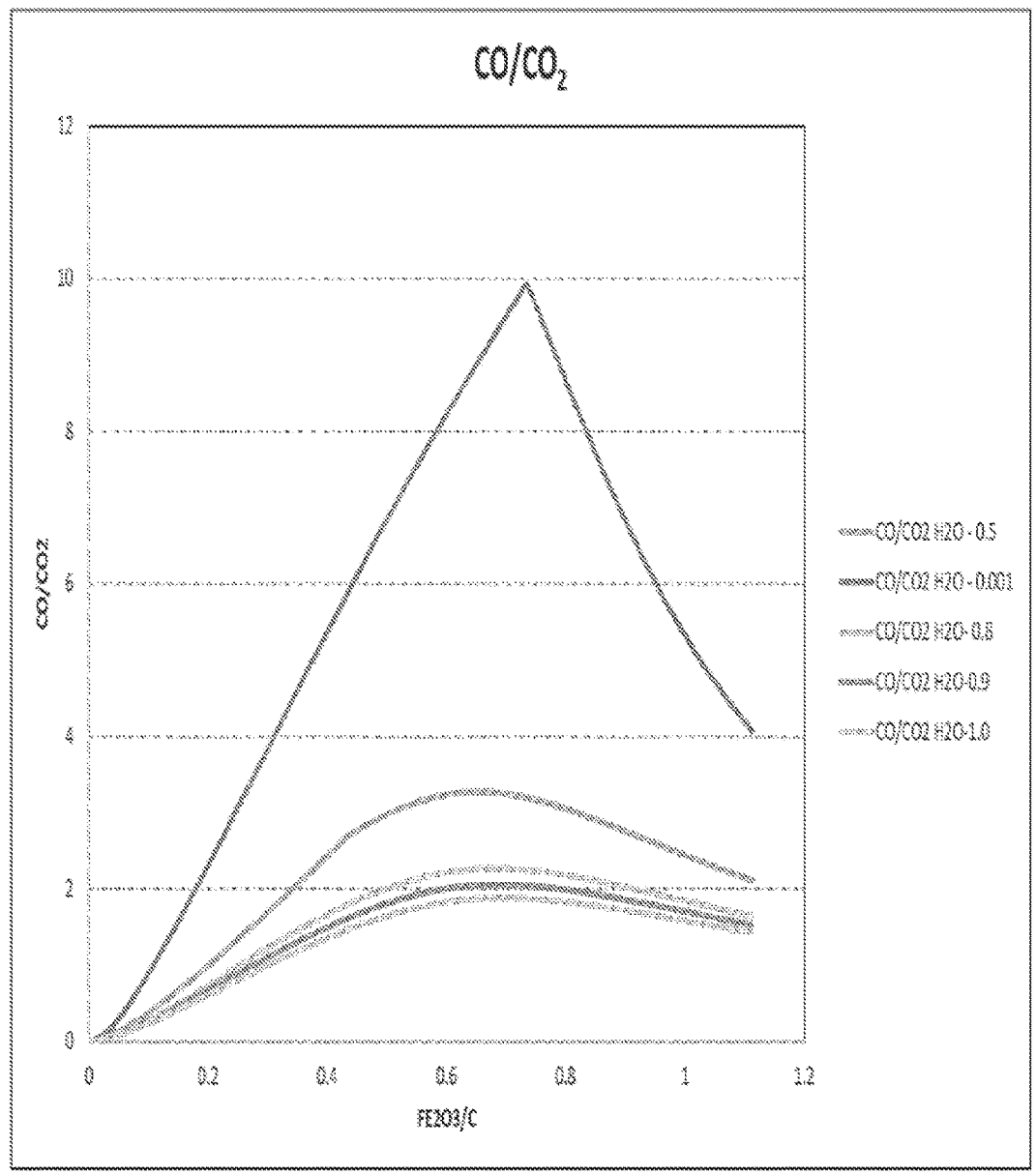
FIG. 37b shows the variation in the CO/$CO_2$ value of syngas coming out of reducer reactor produced as a function of $Fe_2O_3$/C ratio variation for a 50% HHV input of methane and PRB coal for the reducer reactor for varying amount of steam injection.
Figure 37C:
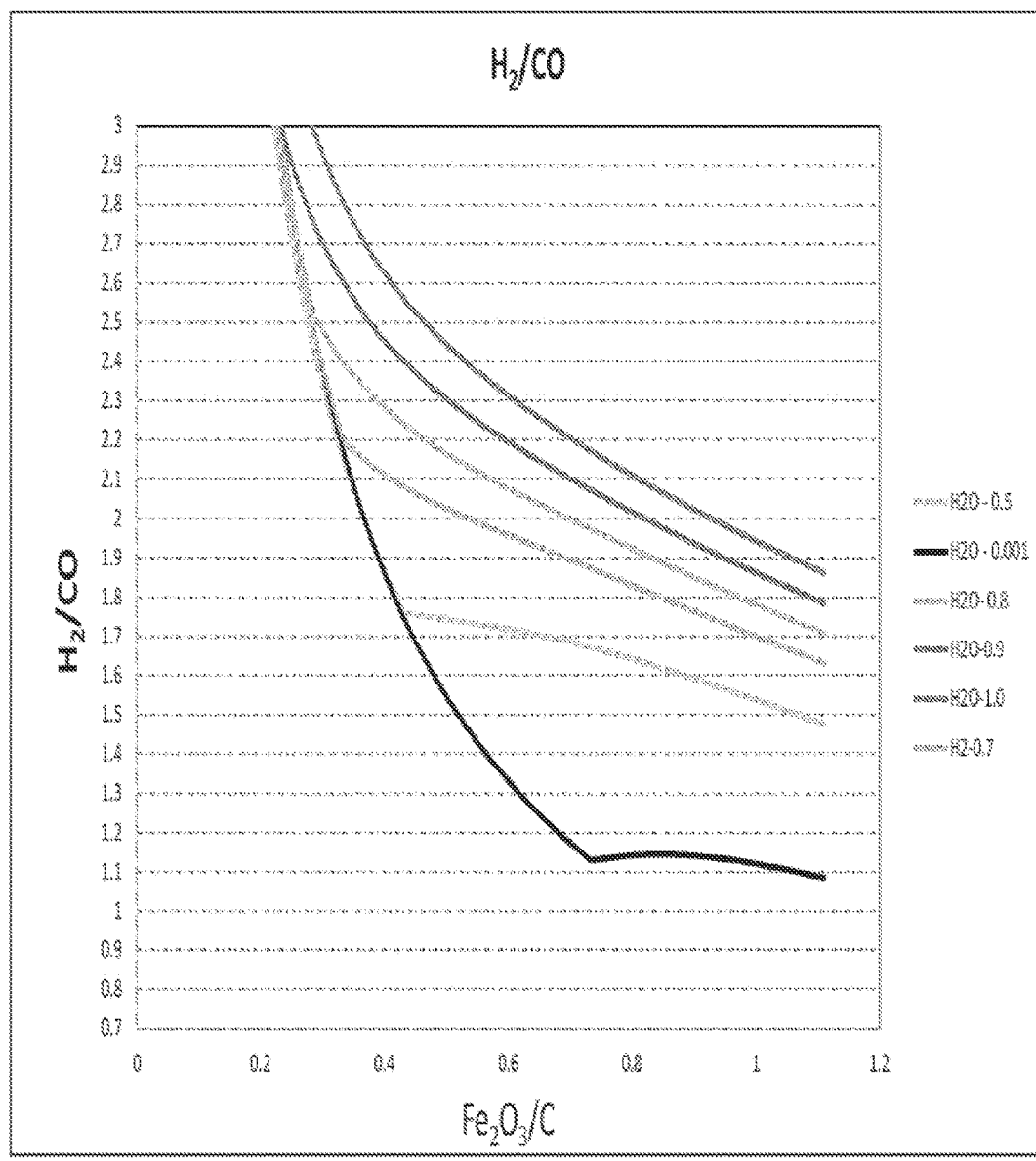
FIG. 37c shows the variation in the $H_2$/CO value of syngas coming out of reducer reactor produced as a function of $Fe_2O_3$/C ratio variation for a 50% HHV input of methane and PRB coal for the reducer reactor for varying amount of steam injection.
Figure 38:
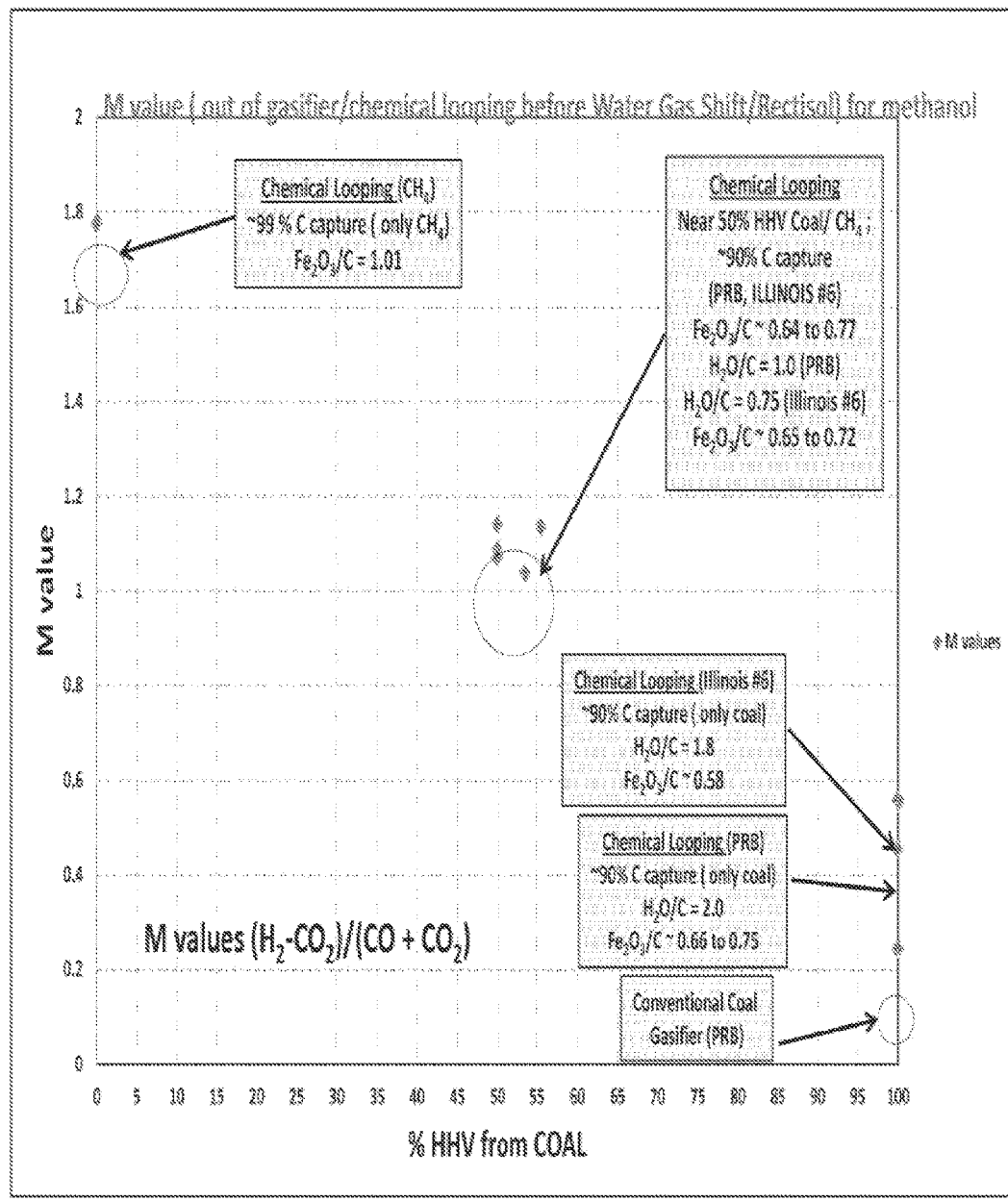
FIG. 38 shows the M value out of the reactor configuration proposed as a function of varying the % HHV of coal types and methane.

FIG. 35 and FIG. 36 show a case where a different amount of natural gas and coal is added. The case essentially demonstrates the fact that the specific operating condition can be claimed for different combination of various fuels claimed. The metal-oxide composition used is $Fe_2O_3$—$Al_2O_3$. In this case the coal HHV contribution to the fuel mix is 45%. The trends shown are similar to those analyzed for the base case above. The areas for no carbon deposition are isolated (FIG. 35) and the corresponding performance ratios for the systems are analyzed. A similar behavior for the oxygen transfer from the oxygen carrier is observed. Initially at low steam injections, the oxygen transfer from the oxygen carrier is dominant. Later, the oxygen transfer from steam starts to dominate. This case shows the specific operating condition to be present at a lower steam flow-rate than the 50% HHV case. This is attributed to the fact that the $CH_4$ amount decreases per mole of carbon which leads to a drop in intrinsic $H_2$ content from the fuel mixture. A syngas composition which is suitable for downstream application is obtained at a higher solids flow and lower steam injection requirement. This case shows that using a combination of any of the oxygen carriers disclosed earlier and the unique control offered by a co-current downward moving bed reactor can be applied with a specific amount of steam injection to derive the claimed specific condition for syngas production. This case shows that a similar behavior can be expected for different combinations of fuel injections with the critical point being present at differing operating conditions depending on the coal type, fuel type and the intrinsic $H_2$ content of the fuel.

example. This case is analyzed to verify the claim of a different metal-oxide being used for the operating condition. It should be seen that presence of a $H_2$-rich co-injection fuel helps improve the carbon utilization of the system by minimizing the steam usage. A scan of different HHV'S ratios of coal and methane fuel injection is analyzed. Application of the given condition can improve the carbon utilization significantly while maintaining the syngas quality and eliminating the need for molecular oxygen transport from an air-separation unit. The application of the specific condition is true for all the fuel feedstock, oxygen carrier compositions specified.

Figure 41:
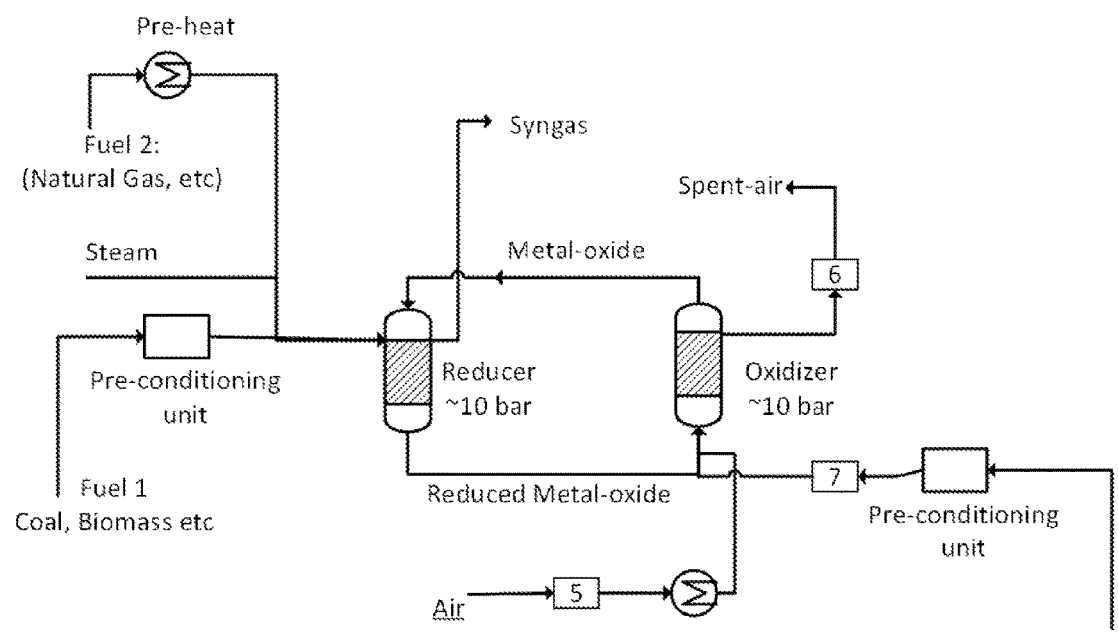
FIG. 41 illustrates a reactor configuration which includes fuel injection in the oxidizer for satisfying the heat balance while getting a higher quality of syngas.

FIG. 41 shows a configuration in which the reducer is operated with fuel injection. The general principle for operating an oxygen carrier based looping unit is the fact that it should be auto-thermal in operation. If carbon capture from a chemical looping with heat-balance is considered, it leads to two design configurations. One configuration has a part of fuel burned in the oxidizer reactor to attain the auto-thermal operating condition. This configuration can operate at a lower solids circulation rate, which improves the syngas yield near the critical point of steam injection. The configuration may require dilute $CO_2$ capture from the oxidizer exhaust stream. An alternative configuration avoids this dilute $CO_2$ capture, by increasing the solids circulation rate for heat-balance purposes. This ensures that the excess $CO_2$ is obtained as a part of the $CO_2$ rich syngas stream, reducing the cost of separation of $CO_2$.

Figure 42:
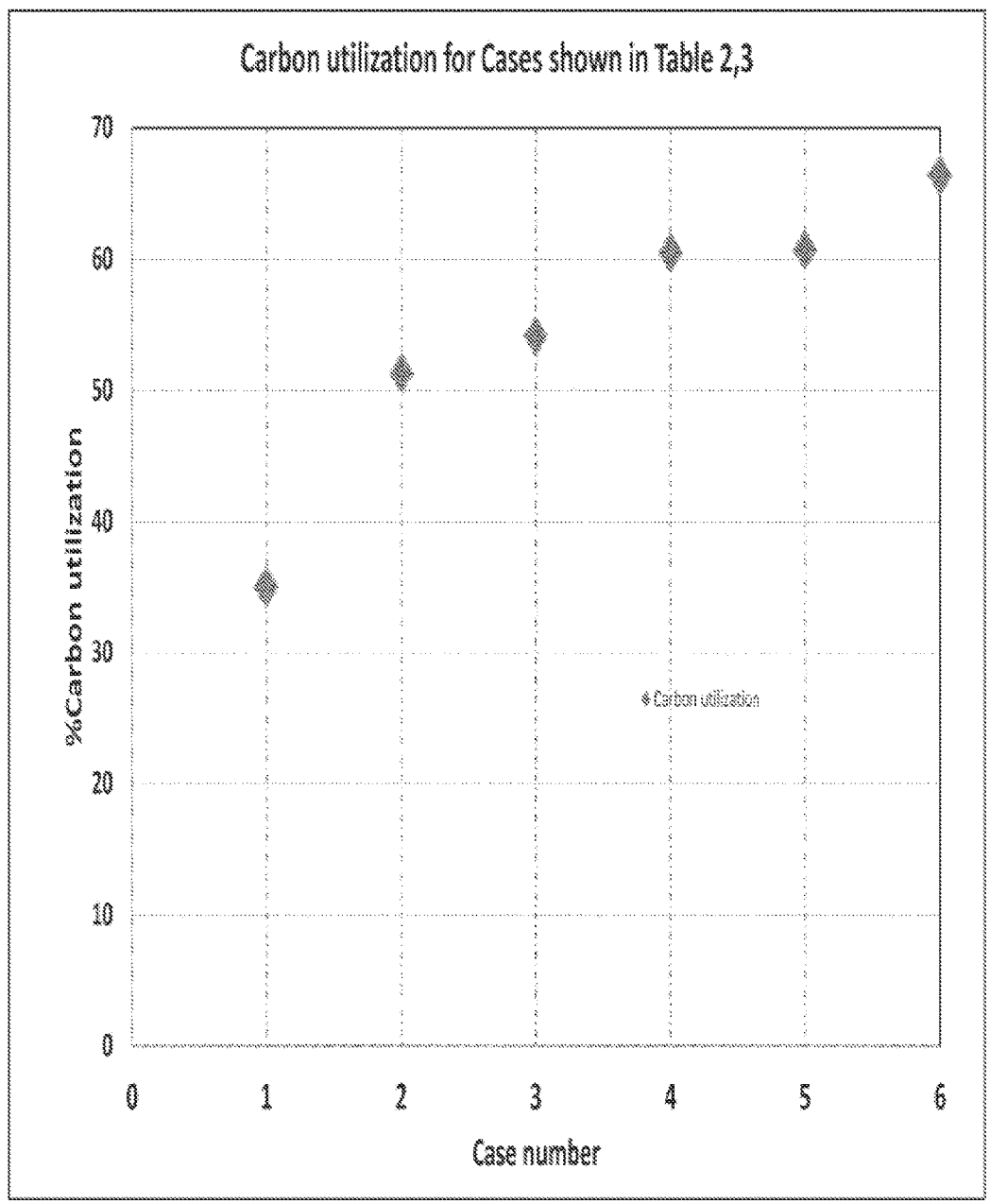
FIG. 42 shows the percentage carbon utilization for the cases shown in Table 19 and Table 20.

FIG. 42 shows the application of the heat balance concept and its effect on syngas capacity using $Fe_2O_3$—$Al_2O_3$ particles as an example. The $Fe_2O_3$—$Al_2O_3$ particles have shown equivalent performance to the $TiO_2$ particles used in earlier examples for this specific application. The tables 19 and 20 show the conditions investigated as demonstrations for applying the heat balance concept while burning some amount of a fuel like natural gas for electricity production.

TABLE 19

Carbon utilization per mole of C input to the system shown in FIG. 42

| Case | CO | Carbon utilization | % C capture | C total | Coal reducer | $CH_4$ reducer | Coal Oxidizer | $CH_4$ NGCC | $H_2O$ reducer | M value after rectisol |
|---|---|---|---|---|---|---|---|---|---|---|
| 1 | 0.35 | 35 | 90 | 1 | 0.9 | 0 | 0 | 0.1 | 2 | 2.01 |
| 2 | 0.564 | 51. | 81.8190 | 1.11 | 0.55 | 0.35 | 0.1 | 0.1 | 1 | 2.01 |
| 3 | 0.564 | 54.12 | 90 | 1 | 0.65 | 0.25 | 0 | 0.1 | 1.1 | 2.01 |
| 4 | 0.611 | 60.47 | 90 | 1 | 0.65 | 0.25 | 0 | 0.1 | 1.1 | 1.7 |
| 5 | 0.6 | 60.72 | 95 | 1 | 0.65 | 0.3 | 0 | 0.05 | 1 | 2.01 |
| 6 | 0.66 | 66.41 | 96 | 1 | 0.65 | 0.3 | 0 | 0.05 | 0.7 | 1.7 |

TABLE 20

Material balance for 1 mole of C input to the system shown in FIG. 42

| Case No | $Fe_2O_3$ | $Al_2O_3$ | CO | $CO_2$ | $H_2$ | $H_2O$ | $CH_4$ | $T_{out}$ | $H_2/CO$ | M | $H_2O/C$ |
|---|---|---|---|---|---|---|---|---|---|---|---|
| 3 | 0.848 | 5.31 | 0.528 | 0.369 | 1.065 | 1.111 | 0.0018 | 944.146385 | 2.01 | 0.774 | 1.099 |
| 4 | 0.806 | 5.05 | 0.594 | 0.300 | 1.028 | 0.742 | 0.0050 | 927.508098 | 1.73 | 0.813 | 0.727 |
| 5 | 0.848 | 5.31 | 0.5928 | 0.352 | 1.18 | 0.982 | 0.0050 | 919.259518 | 2.01 | 0.884 | 1.04 |
| 6 | 0.750 | 4.70 | 0.664 | 0.265 | 1.151 | 0.5879 | 0.020 | 889.774144 | 1.734 | 0.954 | 0.66 |

Figure 39:
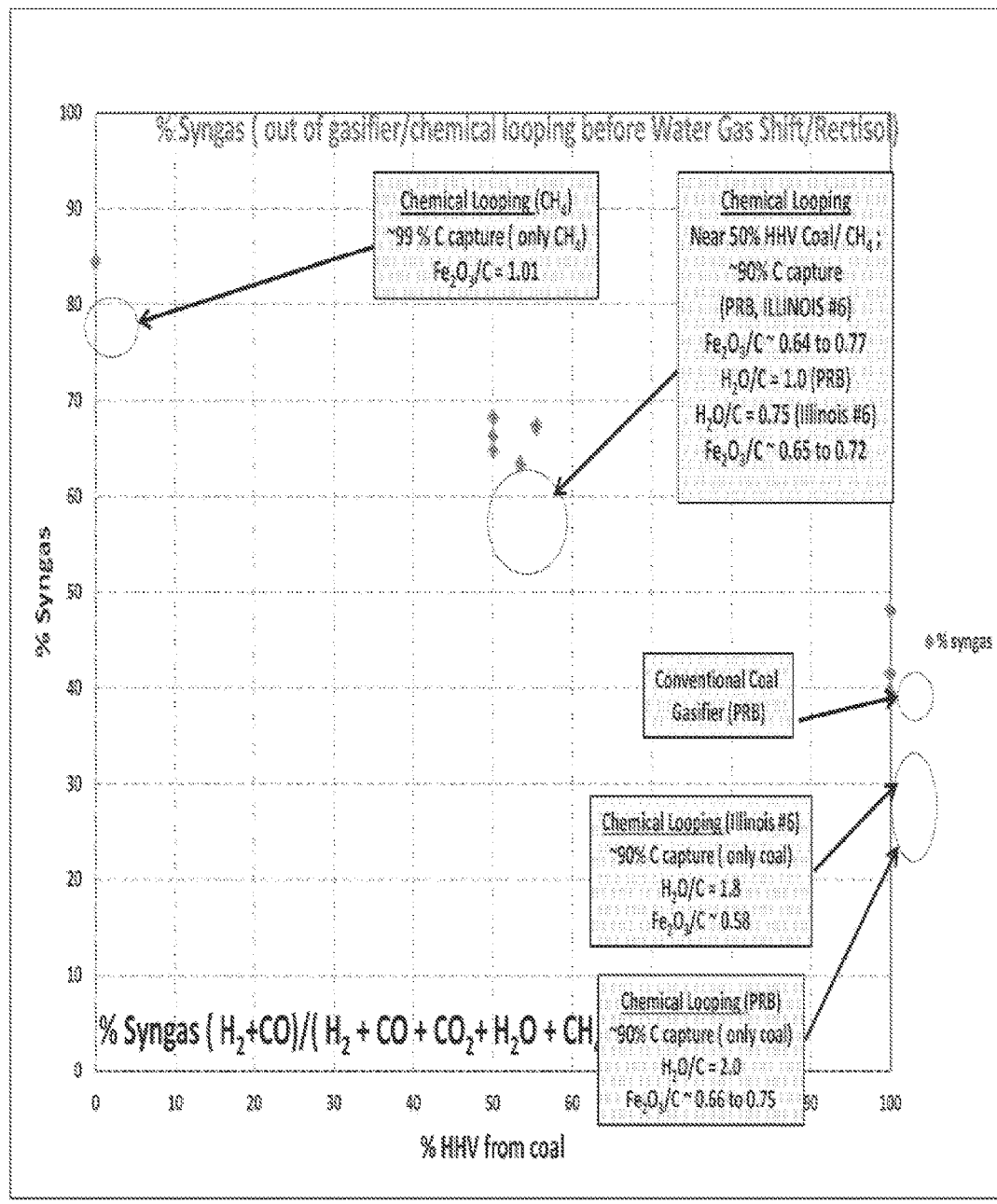
FIG. 39 shows the % Syngas (% (CO+$H_2$)) out of the reactor configuration proposed as a function of varying the % HHV of coal types and methane.
Figure 40:
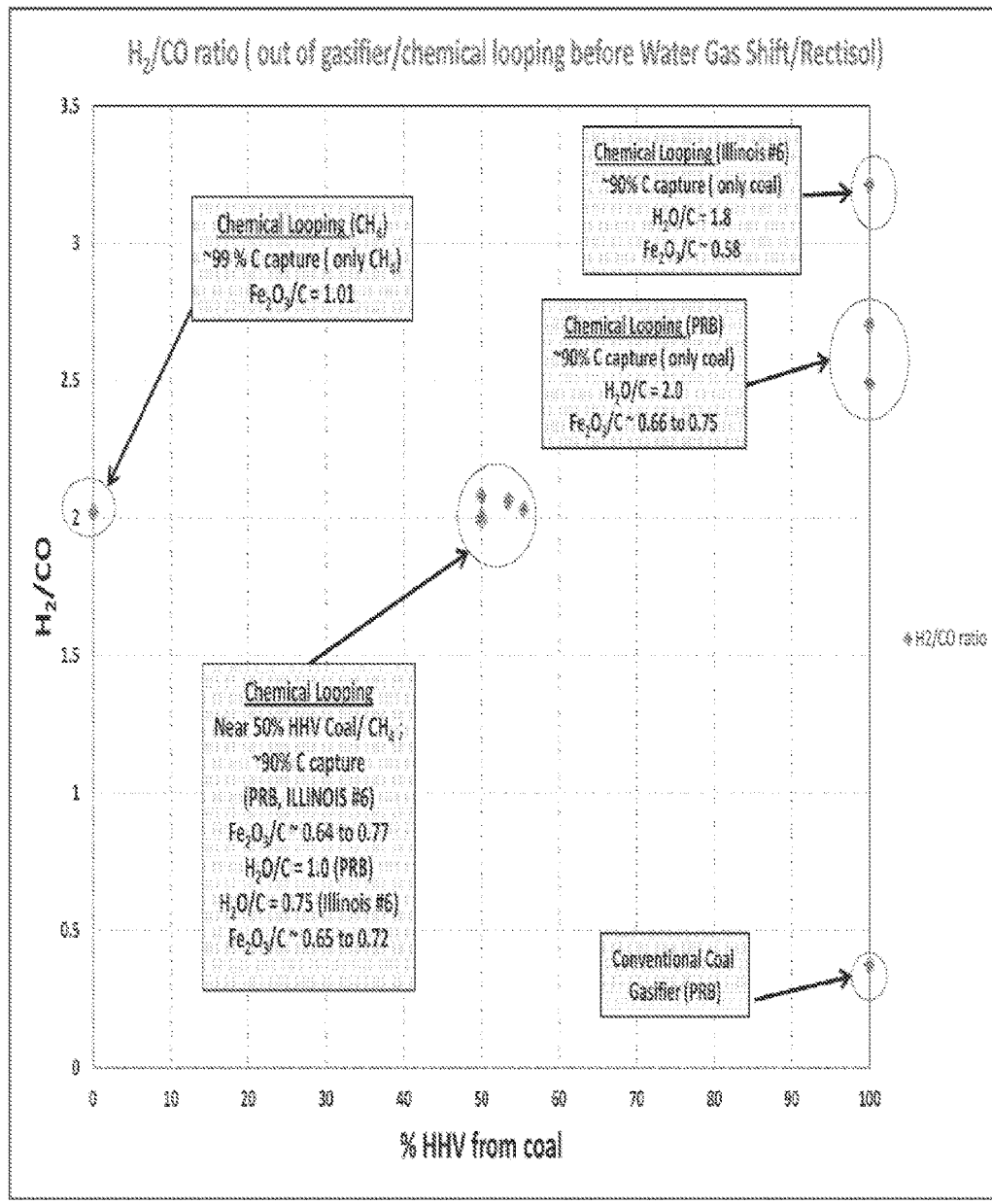
FIG. 40 shows the $H_2$/CO ratio in the syngas coming out of the reactor configuration proposed as a function of varying the % HHV of coal types and methane.

FIGS. 39 and 20 show the overall performance curve using Illinois #6 and PRB coals in combination with methane input at the unique operating conditions for the optimal steam injection using the $Fe_2O_3$—$TiO_2$ based particles as The M values and the $H_2/CO$ values are similar to those produced by conventional gasification systems. The carbon utilization is higher because of application of the specific operating condition. FIG. 42 shows the increase of syngas production per mole of total carbon in the system over the baseline coal gasification technology. A similar performance was obtained for combinations of other $H_2$ deficient fuels which need some steam injection for increasing the $H_2/CO$ ratio.

Figure 43:
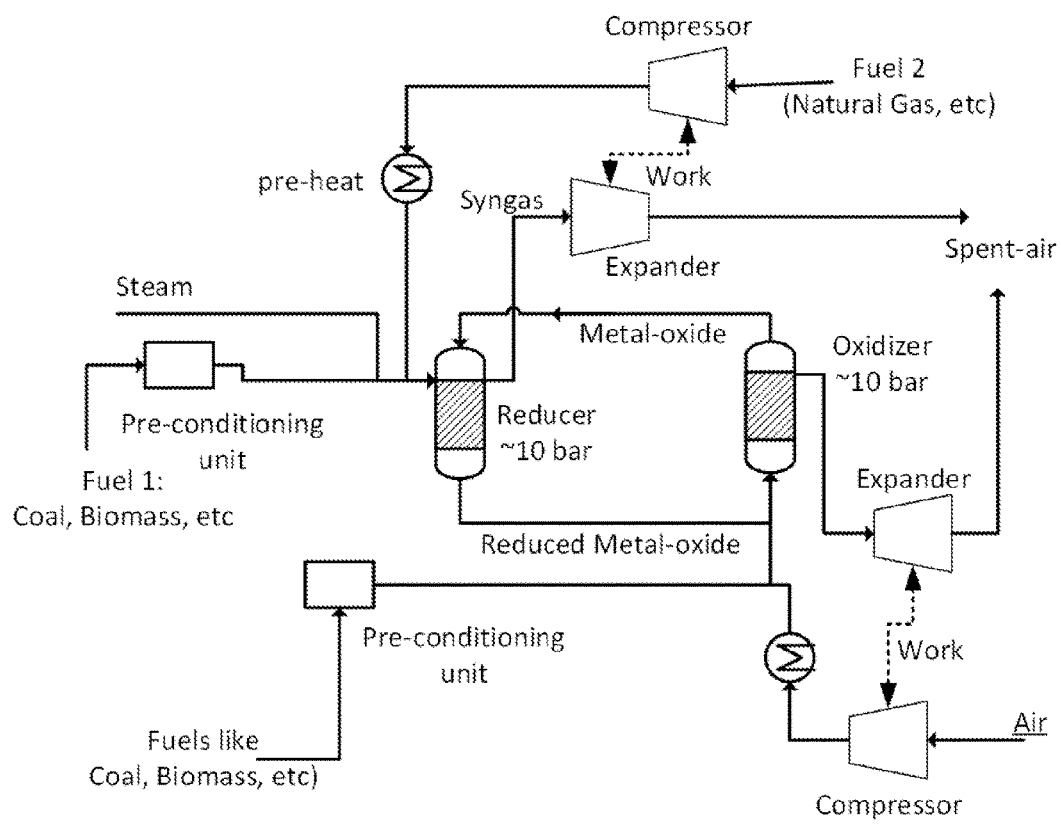
FIG. 43 shows an illustration of the methodology used in conjunction with the configurations disclosed for reducing the net operating energy of the system.
Figure 44:
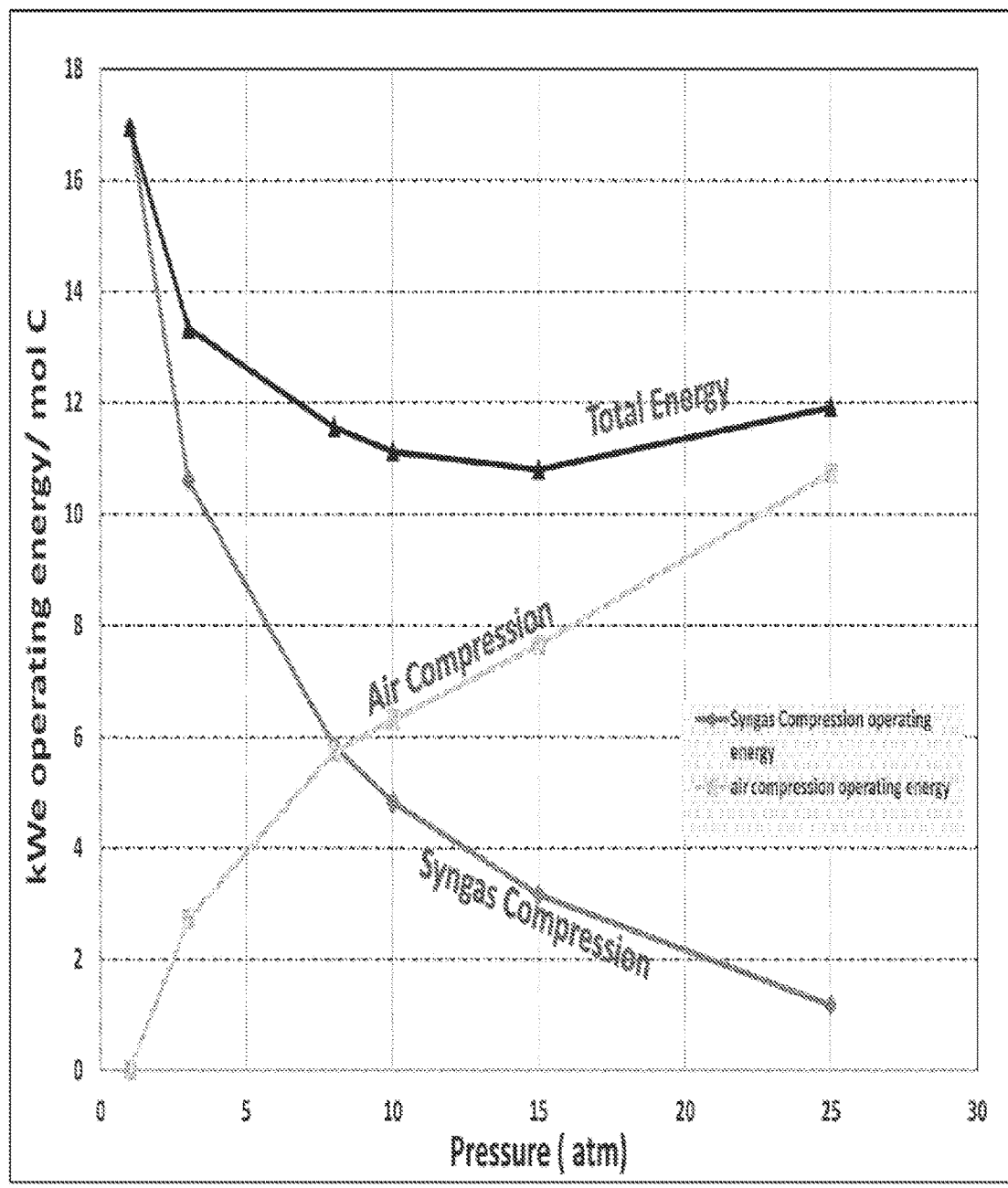
FIG. 44 shows an illustration of the application of the methodology in FIG. 43 for a specific case.

FIG. 43 shows a methodology to reduce the operating energy requirements of a chemical looping unit. The example shown illustrates the application of the methodology in conjunction with the special operating condition used. The methodology is used with the configurations disclosed above for reducing the operating energy requirement wherever applicable. This methodology involves coupling the air streams and the natural gas streams used for power generation purposes. The typical downstream syngas processing units operate at a pressure between 30 and 80 atm. The chemical looping unit has two main reactors namely the reducer and the oxidizer. The reducer produces the syngas which needs to be compressed to the requisite downstream processing pressure. The following methodology disclosed in FIGS. 43 and 44 shows a way to analyze the looping problem and identify the optimal pressure for reducing the operating energy. The disadvantage of operating at a pressure close to the downstream syngas processing system is that the air has to be compressed to that high value while the syngas compression cost diminishes. On the other hand, operating at pressure close to atmospheric will diminish the cost of air-compression while significantly increasing the cost of syngas compression. It is expected that the actual minima would lie somewhere in middle of the pressure range scanned.

The methodology of coupling the air stream and the syngas stream with incoming natural gas stream is unique and has certain intrinsic advantages. The air is initially compressed and a large volume of air remains unreacted. The options for recovery of air from this stream include the heat extraction from a rankine-cycle type steam cycle coupled with a Brayton-cycle type gas turbine. The gas-turbine may have a certain let-down which can be designed to offset some of the inlet compressor duty. The net compressor duty would then be the excess remaining to be supplied by the air compressor in terms of an effective net-duty. A similar analysis for offsetting some of the load on syngas compressor will include coupling of the high-pressure fuel stream and the syngas stream coming out at the operating pressure of the chemical looping unit. This will intrinsically offset some of the requirement for syngas compression, with the net compression energy being the balance requirement for the syngas compression. Note the intrinsic difference in coupling on the reducer streams and the oxidizer streams. The reducer side streams let-down the pressure on the inlet lines. It uses that to offset some of the syngas compression requirements on the outlet side. The let-down process itself follows the Joule-Thomson cooling effect and requires some pre-heating of the inlet fuel to offset for the temperature loss. Depending on the reactor operating pressure, the oxygen carrier composition, it may be chosen to add an additional heater to heat-up the fuel entering in the reducer. The oxidizer works in a reverse way as the let-down is on a high-temperature air-stream. This intrinsically heats the inlet air-stream and depending on the reactor operation it could be heated further.

FIG. 44 shows a model example sample of results for the net operating energy requirement as a function of operating pressure of the unit. It assumes that the natural gas input is at 30 atm to the unit, while the final syngas pressure is required to be 31 atm for a model chemical synthesis process (e.g., methanol, F-T etc). As predicted, the net syngas compression cost becomes lower as the operating pressure of the system increases. Correspondingly the net air compression cost increases as the operating pressure of the system increases. The net-effect is a total-net operating energy curve for the chemical looping system which passes through minima for the 10 atm to 15 atm range. This can be chosen as a suitable operating pressure for the looping system for identifying the critical point of steam injection beyond which the maximum oxygen transfer from the oxygen carrier to the fuel occurs.

6. EXEMPLARY EMBODIMENTS

In one aspect, disclosed is a system for producing syngas from one or more carbon-based fuels using oxidation-reduction of metal oxides. The system can be configured for partially or fully oxidizing a fuel in a first reactor, optionally to serve as an enhancing gas in a second reactor. The metal oxide can undergo an oxidation-reduction swing in the second reactor (e.g., a reduced metal oxide entering the second reactor can undergo oxidation, with $CO_2$ or $H_2O$ for example, and subsequently undergo reduction, with a carbon-based fuel for example). The flow pattern in the first reactor can be counter-current or co-current, preferably counter-current. The flow pattern in the second reactor can be counter-current or co-current. The system can include a third reactor to regenerate the reduced metal-oxide, using air for example. The first reactor can use a recycled light hydrocarbon stream, from a Fischer-Tropsch or methanol synthesis system for example. The enhancing gas used in the second reactor can be derived from the first reactor, the third reactor, or one or more additional reactors through oxidation of a fuel with a metal oxide or through a combustion process (e.g., natural gas combustion).

In another aspect, disclosed is a system for producing syngas from one or more carbon-based fuels using oxidation-reduction of metal oxides. The system can be configured to oxidize a fuel in a first reactor to produce syngas. A second reactor in communication with the first reactor can produce a gaseous product (e.g., $CO_2/H_2O$) that can be used in the first reactor for gasifying the fuel in the first reactor (e.g., gasifying a solid fuel such as coal or biomass). The system can include a third reactor to regenerate the reduced metal-oxide, using air for example. Gaseous product for gasifying the fuel in the first reactor can also be derived from the third reactor, or one or more additional reactors through oxidation of a fuel with a metal oxide or through a combustion process (e.g., natural gas combustion).

In another aspect, disclosed is a system for producing sequester-ready $CO_2$. A second reactor can process solid fuel and optionally gaseous fuel to produce syngas. The unconverted solid fuel can be separated in a high-temperature separation device to recycle the char to the top of the first reactor to produce sequester-ready $CO_2$.

In another aspect, disclosed is a method for reducing the operating energy and cost requirements for a chemical system converting fuel to a product, operating at different pressures. The method can employ expander-compressor coupling to recuperate energy used for compression of gaseous fuel, gaseous product, or a combination thereof.

In another aspect, disclosed is a specific unique operating condition configuration for producing high-quality syngas from a flexible solid fuel feedstock like coal, biomass amongst others. The specific operating condition requires a unique combination of the oxygen carrier, the support percentage in the oxygen carrier, effective heat-management strategy, a specific amount of steam injection and a co-current downward flowing moving bed system. The operating reactor configurations can be selected to maximize the oxygen transfer from the oxygen carrier to the fuel, maximize the steam oxygen transfer to the oxygen carrier while minimizing the steam oxygen transfer to the fuel to produce the exact syngas specifications that are required for a downstream application.

In certain embodiments, disclosed is a system configuration which includes fuel addition to the oxidizer to satisfy the auto-thermal operating condition of the reactor system. The trade-off is dependent on the permissible carbon emissions and the carbon-capture mechanism used. A higher carbon utilization of the fuel can be achieved by adhering to a lower oxygen carrier flow-rate which will satisfy the heat balance. An alternative configuration with a higher solids flow rate can be used for additional carbon capture through the syngas, coupled with higher oxygen carrier flow rates and higher carbon utilization.

In certain embodiments, disclosed is a system methodology for minimizing the operating energy requirement of the reactor system and choosing the reactor pressure for the configurations disclosed. The methodology can be applied to any combination of fuels processed, the oxygen carrier used and the downstream standard technologies used for any of the disclosed reactor configurations.

For reasons of completeness, various aspects of the disclosure are set out in the following numbered clauses:

Clause 1. A system for the production of syngas, comprising: a first reactor comprising a plurality of oxygen carrying particles comprising a first metal oxide, wherein the first reactor is configured to provide a counter-current contact mode between the first metal oxide and a first fuel to reduce the first metal oxide to a second metal oxide; a second reactor in communication with the first reactor, the second reactor configured to oxidize the second metal oxide to a third metal oxide, and further configured to reduce the third metal oxide to a fourth metal oxide with a second fuel to provide a partially or fully oxidized gaseous fuel comprising one or more of CO, $CO_2$, $H_2$, and $H_2O$, wherein the second metal oxide is oxidized to the third metal oxide using an enhancing gas of $CO_2$ and $H_2O$, the partially or fully oxidized gaseous fuel, or a combination thereof, to generate syngas; and a third reactor in communication with the second reactor, the third reactor configured to regenerate the first metal oxide by oxidizing the fourth metal oxide with an oxygen source.

Clause 2. The system of clause 1, wherein the counter-current contact mode between the first metal oxide and the first fuel is such that the first metal oxide moves downward and the first fuel moves upward.

Clause 3. The system of clause 1 or clause 2, wherein the first metal oxide is introduced to the top of the first reactor, and the first fuel is introduced to the bottom of the first reactor.

Clause 4. The system of any one of clauses 1-3, wherein the second reactor is configured to provide a counter-current contact mode between the second metal oxide and the enhancing gas, and a counter-current contact mode between the third metal oxide and the second fuel.

Clause 5. The system of clause 4, wherein the second metal oxide is introduced to the top of the second reactor, the enhancing gas is introduced to the middle of the second reactor, and the second fuel is introduced to the bottom of the second reactor.

Clause 6. The system of any one of clauses 1-3, wherein the second reactor is configured to provide a co-current contact mode between the second metal oxide and the enhancing gas, and a co-current contact mode between the third metal oxide and the second fuel.

Clause 7. The system of clause 6, wherein the second metal oxide is introduced to the top of the second reactor, the enhancing gas is introduced to the middle of the second reactor, and the second fuel is introduced to the top of the second reactor.

Clause 8. The system of clause 6, wherein the second metal oxide is introduced to the top of the second reactor, the enhancing gas is introduced to the top of the second reactor, and the second fuel is introduced to the top or the middle of the second reactor.

Clause 9. The system of any one of clauses 1-8, wherein at least a portion of the enhancing gas is derived from the first reactor resulting from the reduction of the first metal oxide with the first fuel.

Clause 10. The system of any one of clauses 1-9, wherein at least a portion of the enhancing gas is derived from oxidation of a carbon-containing or hydrogen-containing source in the third reactor, a fourth reactor, or a combination thereof.

Clause 11. The system of any one of clauses 1-10, wherein the third reactor is communication with the first reactor, wherein at least a portion of the second metal oxide is circulated directly to the third reactor, and oxidation of a carbon-containing or hydrogen-containing source with an oxygen source in the third reactor generates a stream of enhancing gas, wherein at least a portion of the enhancing gas generated in the third reactor is used in the second reactor as an enhancing gas.

Clause 12. The system of any one of clauses 1-11, comprising a fourth reactor in communication with the first reactor, configured to generate a stream of enhancing gas comprising $CO_2$ and $H_2O$.

Clause 13. The system of clause 12, wherein at least a portion of the enhancing gas generated in the fourth reactor is used in the second reactor as an enhancing gas.

Clause 14. The system of any one of clauses 1-13, wherein the first fuel is a solid fuel (e.g., biomass, coal, pet-coke, solid hydrocarbon-based waste products, or a combination thereof).

Clause 15. The system of any one of clauses 1-13, wherein the first fuel is a gaseous fuel (e.g., natural gas, gasified coal, a light hydrocarbon off-gas stream, or a combination thereof).

Clause 16. The system of any one of clauses 1-15, wherein the second fuel is a solid fuel (e.g., biomass, coal, pet-coke, solid hydrocarbon-based waste products, or a combination thereof).

Clause 17. The system of any one of clauses 1-15, wherein the second fuel is a gaseous fuel (e.g., natural gas, gasified coal, a light hydrocarbon off-gas stream, or a combination thereof).

Clause 18. The system of any one of clauses 1-17, wherein the second reactor is in communication with a Fischer-Tropsch or methanol synthesis system that produces a light hydrocarbon tail-gas, wherein the second reactor provides syngas to the Fischer-Tropsch or methanol synthesis system and the light hydrocarbon tail-gas is optionally recycled to first reactor, the second reactor, or a combination thereof.

Clause 19. The system of any one of clauses 1-18, wherein the first metal oxide has formula $FeO_aTi_x$ or $FeO_aAl_x$, the second metal oxide has formula $FeO_bTi_x$ or $FeO_bAl_x$, the third metal oxide has formula $FeO_cTi_x$ or $FeO_cAl_x$, and the fourth metal oxide has formula $FeO_bTi_x$ or $FeO_dAlx$, wherein 1.5>a>b, b<c>d, 1.5>c, and x is 0.01 to 5.

Clause 20. The system of any one of clauses 1-19, wherein the first metal oxide has formula $FeO_aTiO_2$ or $FeO_aAl_2O_3$, the second metal oxide has formula $FeO_bTiO_2$ or $FeO_bAl_2O_3$, the third metal oxide has formula $FeO_cTiO_2$ or $FeO_cAl_2O_3$, and the fourth metal oxide has formula $FeO_dTiO_2$ or $FeO_dAl_2O_3$, wherein 1.5>a>b, b<c>d, and 1.5>c.

Clause 21. The system of any one of clauses 1-20, wherein the third metal oxide produced in the second reactor is the same as the first metal oxide.

Clause 22. The system of any one of clauses 1-20, wherein the third metal oxide produced in the second reactor is different from the first metal oxide.

Clause 23. The system of any one of clauses 1-22, wherein the fourth metal oxide produced in the second reactor is the same as the second metal oxide.

Clause 24. The system of any one of clauses 1-22, wherein the fourth metal oxide produced in the second reactor is different from the second metal oxide.

Clause 25. A system for the production of syngas, comprising: a first reactor comprising a plurality of oxygen carrying particles comprising a first metal oxide, wherein the first reactor is configured to provide a co-current contact mode between the first metal oxide and a first fuel to reduce the first metal oxide to a second metal oxide and to generate syngas; a second reactor in communication with the first reactor, the second reactor configured to reduce the second metal oxide to a third metal oxide with a second fuel; and a third reactor in communication with the second reactor, the third reactor configured to regenerate the first metal oxide by oxidizing the third metal oxide with an oxygen source; wherein a gaseous product comprising $CO_2$ and $H_2O$ is used in the first reactor to gasify the first fuel.

Clause 26. The system of clause 25, wherein at least a portion of the gaseous product used in the first reactor is derived from a gaseous product produced in the second reactor resulting from the reduction of the second metal oxide with the second fuel.

Clause 27. The system of clause 25 or clause 26, wherein the co-current contact mode between the first metal oxide and the first fuel is such that the first metal oxide moves downward and the first fuel moves downward.

Clause 28. The system of any one of clauses 25-27, wherein the first metal oxide is introduced to the top of the first reactor, the first fuel is introduced to the top of the first reactor at a level below the metal oxide introduction, and the gaseous product is introduced to the top of the first reactor.

Clause 29. The system of any one of clauses 25-28, wherein the second reactor is configured to provide a counter-current contact mode between the second metal oxide and the second fuel.

Clause 30. The system of any one of clauses 25-29, wherein the second metal oxide is introduced to the top of the second reactor, and the second fuel is introduced to the bottom of the second reactor.

Clause 31. The system of any one of clauses 25-30, wherein at least a portion of the gaseous product is derived from oxidation of a carbon-containing or hydrogen-containing source in the third reactor, a fourth reactor, or a combination thereof.

Clause 32. The system of any one of clauses 25-31, wherein the third reactor is communication with the first reactor, wherein at least a portion of the second metal oxide is circulated directly to the third reactor, and oxidation of a carbon-containing or hydrogen-containing source with an oxygen source in the third reactor generates a gaseous product, wherein at least a portion of the gaseous product generated in the third reactor is used in the first reactor to gasify the first fuel.

Clause 33. The system of any one of clauses 25-32, comprising a fourth reactor in communication with the first reactor, configured to generate a stream of gaseous product comprising $CO_2$ and $H_2O$.

Clause 34. The system of clause 33, wherein the gaseous product generated in the fourth reactor is used in the first reactor to gasify the first fuel.

Clause 35. The system of any one of clauses 25-34, wherein the first fuel is a solid fuel (e.g., biomass, coal, pet-coke, solid hydrocarbon-based waste products, or a combination thereof).

Clause 36. The system of any one of clauses 25-35, wherein the second fuel is a gaseous fuel (e.g., natural gas, gasified coal, a light hydrocarbon off-gas stream, or a combination thereof).

Clause 37. The system of any one of clauses 25-36, wherein the first reactor is in communication with a Fischer-Tropsch or methanol synthesis system that produces a light hydrocarbon tail-gas, wherein the first reactor provides syngas to the Fischer-Tropsch or methanol synthesis system and the light hydrocarbon tail-gas is optionally recycled to first reactor, the second reactor, or a combination thereof.

Clause 38. The system of any one of clauses 25-37, wherein the first metal oxide has formula $FeO_aTi_x$ or $FeO_aAl_x$, the second metal oxide has formula $FeO_bTix$ or $FeO_bAl_x$, and the third metal oxide has formula $FeO_cTi_x$ or $FeO_cAl_x$, wherein 1.5≥a>b>c>0.2, and x is 0.01 to 5.

Clause 39. The system of any one of clauses 25-38, wherein the first metal oxide has formula $FeO_aTiO_2$ or $FeO_aAl_2O_3$, the second metal oxide has formula $FeO_bTiO_2$ or $FeO_bAl_2O_3$, and the third metal oxide has formula $FeO_cTiO_2$ or $FeO_cAl_2O_3$, and wherein 1.5≥a>b>c>0.2.

Clause 40. A system for producing sequester-ready $CO_2$, comprising: a first reactor comprising a plurality of oxygen carrying particles comprising a first metal oxide, wherein the first reactor is configured to provide a co-current contact mode or counter-current contact mode between the first metal oxide and a devolatilized solid fuel to reduce the first metal oxide to a second metal oxide and to generate product stream comprising sequester-ready $CO_2$; a second reactor in communication with the first reactor, the second reactor configured to reduce the second metal oxide to a third metal oxide with a solid fuel and a gaseous fuel to generate syngas and a devolatilized solid fuel; and a third reactor in communication with the second reactor, the third reactor configured to regenerate the first metal oxide by oxidizing the third metal oxide with an oxygen source.

Clause 41. The system of clause 40, wherein the oxygen carrying particles are separated from devolatilized solid with a solid-fine separation device prior to the particles entering the third reactor.

Clause 42. The system of clause 40 or clause 41, wherein at least a portion of the product gas stream from the first reactor is used to separate the devolatilized fuel from the oxygen carrying particles in the solid-fine separation device and to convey the devolatilized fuel to the first reactor.

Clause 43. The system of any one of clauses 40-42, wherein at least a portion of the product gas stream from the first reactor is recycled to the second reactor.

Clause 44. The system of any one of clauses 40-43, wherein the first metal oxide is FeOx; the second metal oxide is FeOy; and the third metal oxide is FeOz; wherein 1.5>x>y>0.75, and y>z>0.01.

Clause 45. The system of any one of clauses 1-44, comprising at least one expander-compressor coupling (e.g., coupled such that the work extracted from the expander (e.g., used to expand a pre-heated gaseous fuel) is used to compress the syngas product from the first reactor or second reactor; or coupled to recuperate at least a portion of the energy used for compressing the oxygen-containing gas in the third reactor).

Clause 46. A system for producing syngas, comprising: a first reactor comprising a plurality of oxygen carrying particles, wherein the first reactor is configured to reduce the oxygen carrying particles with a gaseous fuel to generate syngas and reduced oxygen carrying particles; a second reactor in communication with the first reactor, the second reactor configured to oxidize the reduced oxygen carrying particles with an oxygen-containing gas to regenerate to the oxygen carrying particles and produce a spent gas; and (i) a first expander configured to subject the gaseous fuel to an expansion after pre-heating and prior to entering the first reactor, and a first compressor configured to compress the syngas from the first reactor, wherein the first expander and the first compressor are coupled such that the work extracted from the expander is used to compress the syngas; or (ii) a second expander configured to subject the spent gas from the second reactor to an expansion, and a second compressor configured to provide compressed oxygen-containing gas to the second reactor, wherein the second expander and the second compressor are coupled such that the second expander recuperate at least a portion of the energy used for compressing the oxygen-containing gas.

Clause 47. The system of clause 46, wherein the system comprises both (i) and (ii).

Clause 48. The system of clause 46 or clause 47, further comprising a condenser between the first reactor and the first compressor.

Clause 49. The system of any one of clauses 1-48, wherein the metal oxide undergoes a swing of oxidation state (e.g., oxidation followed by reduction) within the first reactor, within the second reactor, or both the first reactor and the second reactor.

Clause 50. The system of any one of clauses 1-49, where the first reactor, the second reactor, and the third reactor are each independently selected from a packed moving bed reactor, a rotary kiln, a down-comer, a fluidized bed reactor, a fixed bed reactor, or any combination thereof.

Clause 51. The system of any one of clauses 1-50, wherein the first fuel, the second fuel, or both the first fuel and the second fuel are pre-heated prior to entering the first reactor or the second reactor.

Clause 52. The system of any one of clauses 1-51, wherein the first metal oxide is $FeO_aTiO_2$ with 80 wt % $TiO_2$.

Clause 53. The system of any one of clauses 1-52, wherein the system has an operating pressure of 1-100 atm (e.g., 20 atm).

Clause 54. The system of any one of clauses 1-53, wherein the air and gaseous fuels are pre-heated to about 600 C.

Clause 55. The system of any one of clauses 1-54, wherein the first reactor has an operating temperature of 1200 C to 900 C.

Clause 56. The system of any one of clauses 1-55, wherein the second reactor has an operating temperature of 100 C to 700 C.

Clause 57. The system of any one of clauses 1-56, wherein the third reactor has an operating temperature of 700 C to 1300 C.

Clause 58. The system of any one of clauses 1-57, wherein the $H_2$/CO ratio of the generated syngas is from 1:1 to 4:1.

Clause 59. The system of any one of clauses 1-58, wherein the carbon efficiency of the system is 90% or greater.

Clause 60. The system of any one of clauses 1-59, wherein the generated syngas has a combined $CO_2$, $H_2O$ content of less than or equal to 15%.

Clause 61. The system of any one of clauses 1-60, wherein the third reactor uses ambient air, oxygen derived from an air separation unit, or oxygen-enhanced air (e.g., pure oxygen from an air-separation unit, vacuum distillation unit, or oxygen tanks), or a combination thereof to regenerate the first metal oxide.

Clause 62. The system of any one of clauses 1-61, wherein the heat is extracted from the third reactor for satisfying parasitic energy consumption in the system.

Clause 63. The system of any one of clauses 1-62, wherein the first metal oxide is a fully oxidized metal oxide (e.g., $Fe_2O_3$).

Clause 64. The system of any one of clauses 1-62, where the second metal oxide is a reduced metal (e.g., Fe) or reduced metal oxide (e.g., FeO, $Fe_3O_4$).

Clause 65. The system of any one of clauses 1-24, clause 63, or clause 64, wherein the third metal oxide is a metal oxide intermediate (e.g., $Fe_2O_3$, $Fe_3O_4$).

Clause 66. The system of any one of clauses 1-24, or clauses 63-65, wherein the fourth metal oxide is a reduced metal (e.g., Fe) or reduced metal oxide (e.g., FeO, $Fe_3O_4$).

Clause 67. The system of any one of clauses 25-39, wherein the third metal oxide is a reduced metal (e.g., Fe) or reduced metal oxide (e.g., FeO).

Clause 68. The system of any one of clauses 1-67, wherein the third reactor generates heat, and said heat is used to satisfy endothermic requirements of one or more of the first or second reactors.

Clause 69. The system of any one of clauses 1-68, wherein the system operates under autothermal conditions.

Clause 70. A method of reducing the operating energy of a system for converting fuel, the system comprising at least one reactor comprising a plurality of oxygen carrying particles, wherein the reactor is configured to reduce the oxygen carrying particles with a gaseous fuel to generate syngas and reduced oxygen carrying particles; at least one reactor configured to oxidize the reduced oxygen carrying particles with an oxygen-containing gas to regenerate to the oxygen carrying particles and produce a spent gas; and at least one expander configured to expand a gas stream, and at least one compressor configured to compress a gas stream, wherein the expander and the compressor are coupled, the method comprising: using the expander to recuperate at least a portion of the energy used for compressing a gas stream; or using the work extracted from a high-pressure Joule-Thomson expansion in the expander to compress a gas stream with the compressor.

It is to be understood that the first, second, third, and fourth metal oxides referred to herein may be produced and moved through the reactor systems in combination with other metal oxides (e.g., FeO/Fe can be reduced metal oxides that are produced and traverse one or more reactors). For example, conversion of a first metal oxide to a second metal oxide may be incomplete, and thus, a first metal oxide and a second metal oxide may be communicated to a second reactor.

It is understood that the foregoing detailed description and accompanying examples are merely illustrative and are not to be taken as limitations upon the scope of the invention, which is defined solely by the appended claims and their equivalents.

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the invention, may be made without departing from the spirit and scope thereof.

What is claimed is:

1. A method of producing syngas, the method comprising:
providing a counter-current contact mode between a first metal oxide and a first fuel in a first reactor to reduce the first metal oxide to a second metal oxide, wherein the first reactor comprises a plurality of oxygen carrying particles and wherein the plurality of oxygen carrying particles comprises the first metal oxide;
oxidizing the second metal oxide to a third metal oxide in a second reactor, and reducing the third metal oxide to a fourth metal oxide with a second fuel to provide a partially or fully oxidized gaseous fuel comprising one or more of CO, $CO_2$, $H_2$, and $H_2O$, wherein the second metal oxide is oxidized to the third metal oxide using an enhancing gas of $CO_2$ and $H_2O$, the partially or fully oxidized gaseous fuel, or a combination thereof, to generate syngas and wherein the second reactor is in communication with the first reactor; and
regenerating the first metal oxide by oxidizing the fourth metal oxide with an oxygen source in a third reactor, wherein the third reactor is in communication with the second reactor.

2. The method of claim 1, wherein the counter-current contact mode between the first metal oxide and the first fuel is such that the first metal oxide moves downward and the first fuel moves upward.

3. The method of claim 1, wherein the method further comprises introducing the first metal oxide to the top of the first reactor, and introducing the first fuel to the bottom of the first reactor.

4. The method of claim 1, wherein the method further comprises providing a counter-current contact mode between the second metal oxide and the enhancing gas in the second reactor, and providing a counter-current contact mode between the third metal oxide and the second fuel in the second reactor.

5. The method of claim 4, wherein the method further comprises introducing the second metal oxide to the top of the second reactor, introducing the enhancing gas to the middle of the second reactor, and introducing the second fuel to the bottom of the second reactor.

6. The method of claim 1, wherein the method further comprises providing a co-current contact mode between the second metal oxide and the enhancing gas in the second reactor, and providing a co-current contact mode between the third metal oxide and the second fuel in the second reactor.

7. The method of claim 6, wherein the method further comprises introducing the second metal oxide to the top of the second reactor, introducing the enhancing gas to the middle of the second reactor, and introducing the second fuel to the top of the second reactor.

8. The method of claim 6, wherein the method further comprises introducing the second metal oxide to the top of the second reactor, introducing the enhancing gas to the top of the second reactor, and introducing the second fuel to the top or the middle of the second reactor.

9. The method of claim 1, wherein at least a portion of the enhancing gas is derived from the first reactor resulting from the reduction of the first metal oxide with the first fuel.

10. The method of claim 1, wherein at least a portion of the enhancing gas is derived from oxidation of a carbon-containing or hydrogen-containing source in the third reactor, a fourth reactor, or a combination thereof.

11. The method of claim 1, wherein the third reactor is in communication with the first reactor, wherein at least a portion of the second metal oxide is circulated directly to the third reactor, and oxidation of a carbon-containing or hydrogen-containing source with an oxygen source in the third reactor generates a stream of enhancing gas, and wherein at least a portion of the enhancing gas generated in the third reactor is used in the second reactor as an enhancing gas.

12. The method of claim 1, wherein the method further comprises generating a stream of enhancing gas comprising $CO_2$ and $H_2O$ in a fourth reactor, and wherein the fourth reactor is in communication with the first reactor.

13. The method of claim 12, wherein at least a portion of the enhancing gas generated in the fourth reactor is used in the second reactor as an enhancing gas.

14. The method of claim 1, wherein the first fuel is a solid fuel selected from biomass, coal, pet-coke, solid hydrocarbon-based waste products, or a combination thereof.

15. The method of claim 1, wherein the first fuel is a gaseous fuel selected from natural gas, gasified coal, a light hydrocarbon off-gas stream, or a combination thereof.

16. The method of claim 1, wherein the second fuel is a solid fuel selected from biomass, coal, pet-coke, solid hydrocarbon-based waste products, or a combination thereof.

17. The method of claim 1, wherein the second fuel is a gaseous fuel selected from natural gas, gasified coal, a light hydrocarbon off-gas stream, or a combination thereof.

18. The method of claim 1, wherein the second reactor is in communication with a Fischer-Tropsch or methanol synthesis system that produces a light hydrocarbon tail-gas, wherein the second reactor provides syngas to the Fischer-Tropsch or methanol synthesis system and the light hydrocarbon tail-gas is optionally recycled to first reactor, the second reactor, or a combination thereof.

19. The method of claim 1, wherein
the first metal oxide has formula $FeO_aTi_x$ or $FeO_aAl_x$,
the second metal oxide has formula $FeO_bTi_x$ or $FeO_bAl_x$,
the third metal oxide has formula $FeO_cTi_x$ or $FeO_bAl_x$, and
the fourth metal oxide has formula $FeO_dTi_x$ or $FeO_dAl_x$,
wherein $1.5>a>b$, $b<c>d$, $1.5>c$, and x is 0.01 to 5.

20. The method of claim 1, wherein
the first metal oxide has formula $FeO_aTiO_2$ or $FeO_aAl_2O_3$,
the second metal oxide has formula $FeO_bTiO_2$ or $FeO_bAl_2O_3$,
the third metal oxide has formula $FeO_cTiO_2$ or $FeO_cAl_2O_3$, and
the fourth metal oxide has formula $FeO_dTiO_2$ or $FeO_dAl_2O_3$,
wherein $1.5>a>b$, $b<c>d$, and $1.5>c$.

* * * * *